(12) United States Patent
Franks et al.

(10) Patent No.: US 8,915,374 B2
(45) Date of Patent: Dec. 23, 2014

(54) FLOTATION AIDS AND PROCESSES FOR USING THE SAME

(75) Inventors: George Vincent Franks, Eltham (AU); Haihong Li, Edmonton (CA)

(73) Assignee: The University of Melbourne, Parkville, Victoria (AU)

(*) Notice: Subject to any disclaimer, the term of this patent is extended or adjusted under 35 U.S.C. 154(b) by 1197 days.

(21) Appl. No.: 12/812,850

(22) PCT Filed: Sep. 19, 2008

(86) PCT No.: PCT/AU2008/001391
§ 371 (c)(1),
(2), (4) Date: Oct. 11, 2010

(87) PCT Pub. No.: WO2009/089570
PCT Pub. Date: Jul. 23, 2009

(65) Prior Publication Data
US 2011/0017676 A1    Jan. 27, 2011

(30) Foreign Application Priority Data
Jan. 14, 2008   (AU) .............................. 2008900158

(51) Int. Cl.
| | |
|---|---|
| *B03D 1/02* | (2006.01) |
| *B03D 1/016* | (2006.01) |
| *B03D 1/008* | (2006.01) |
| *B03D 1/01* | (2006.01) |
| *B03D 1/012* | (2006.01) |
| *B03D 1/06* | (2006.01) |
| *C02F 1/24* | (2006.01) |
| *B01D 17/02* | (2006.01) |

(52) U.S. Cl.
CPC .............. *B03D 1/016* (2013.01); *B03D 1/012* (2013.01); *B03D 1/008* (2013.01); *B03D 1/06* (2013.01); *B03D 1/01* (2013.01); *C02F 1/24* (2013.01); *B01D 17/0202* (2013.01); *B03D 1/02* (2013.01)
USPC ............................ 209/166; 210/705; 210/734

(58) Field of Classification Search
USPC ........................... 209/164, 166; 210/705, 734
See application file for complete search history.

(56) References Cited

FOREIGN PATENT DOCUMENTS

| | | |
|---|---|---|
| AU | 2002300483 A | 6/2003 |
| CN | 1043086 | 7/1993 |
| JP | 7222919 | 8/1995 |
| RU | 2390382 C2 * | 5/2010 |
| SU | 1311778 A1 | 5/1987 |
| WO | WO 2005/021129 A1 * | 3/2005 |

OTHER PUBLICATIONS

International Search Report from PCT/AU2008/001391 dated Dec. 8, 2008, 5 pages.

* cited by examiner

*Primary Examiner* — Thomas M Lithgow
(74) *Attorney, Agent, or Firm* — Melissa M. Hayworth; E. Joseph Gess

(57) ABSTRACT

This invention relates to particulate and/or liquid droplet separation processes from liquids containing the same and the use of specific chemical additives to control surface wetting, hydrophobicity and surface forces in such processes.

9 Claims, 39 Drawing Sheets

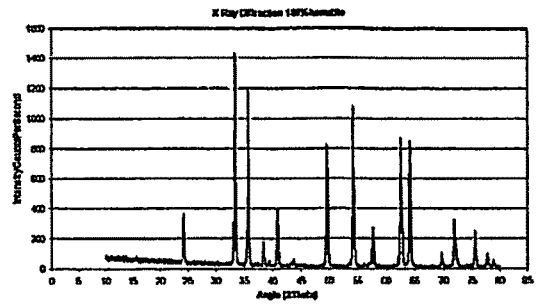
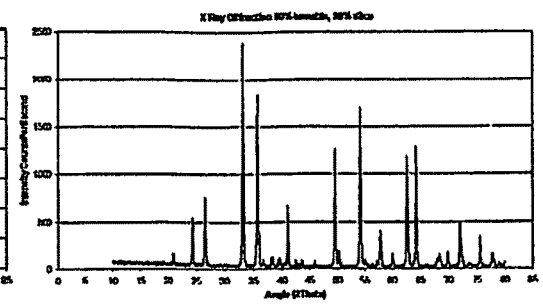
Figure 32a    Figure 32b
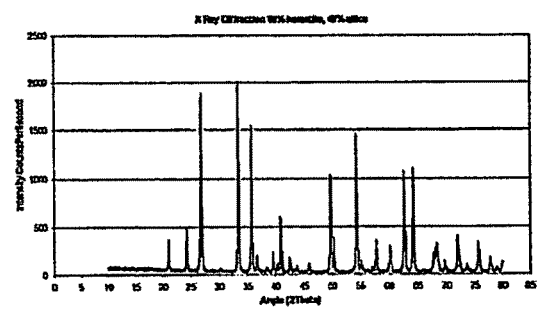
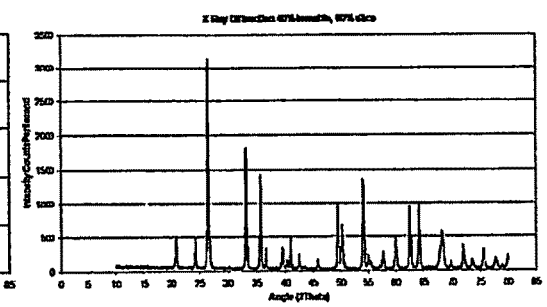
Figure 32c    Figure 32d
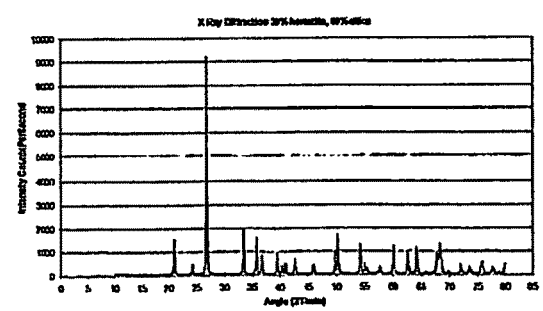
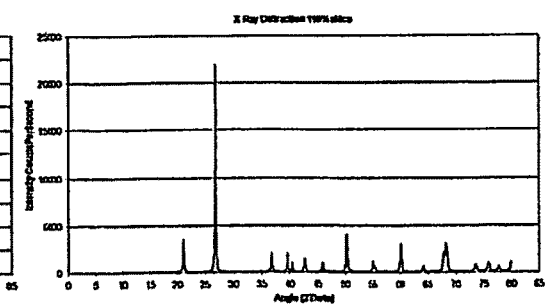
Figure 32e    Figure 32f
Figure 32.

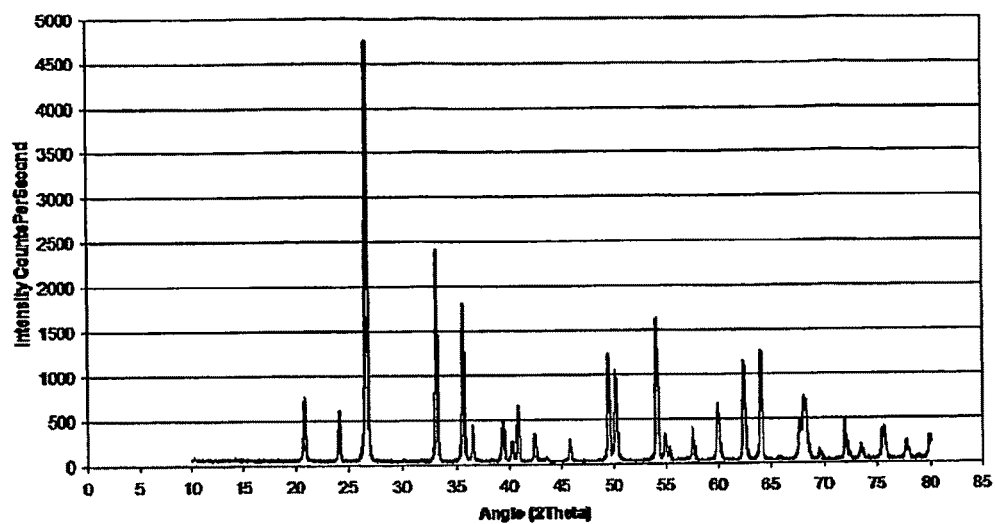
Figure 33a
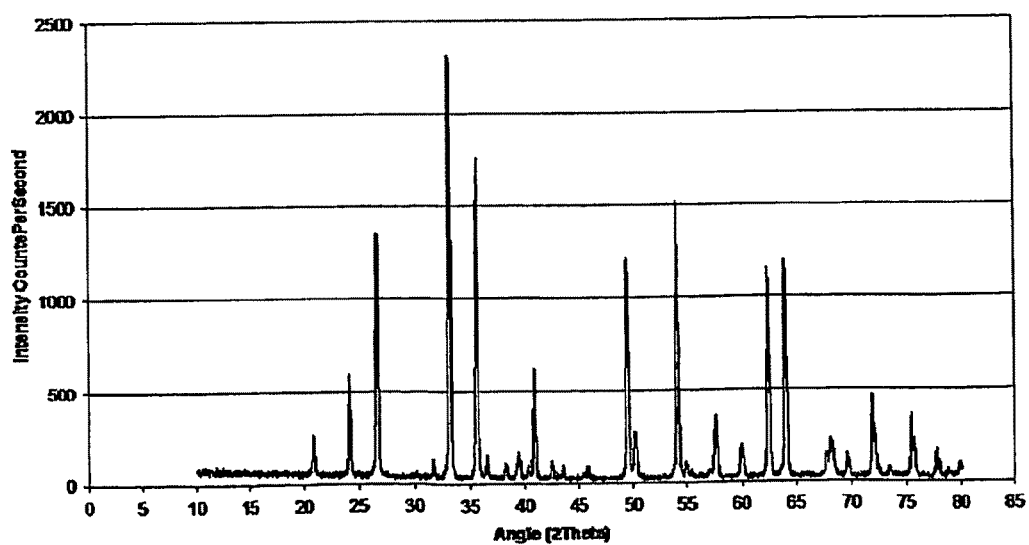
Figure 33b
Figure 33.

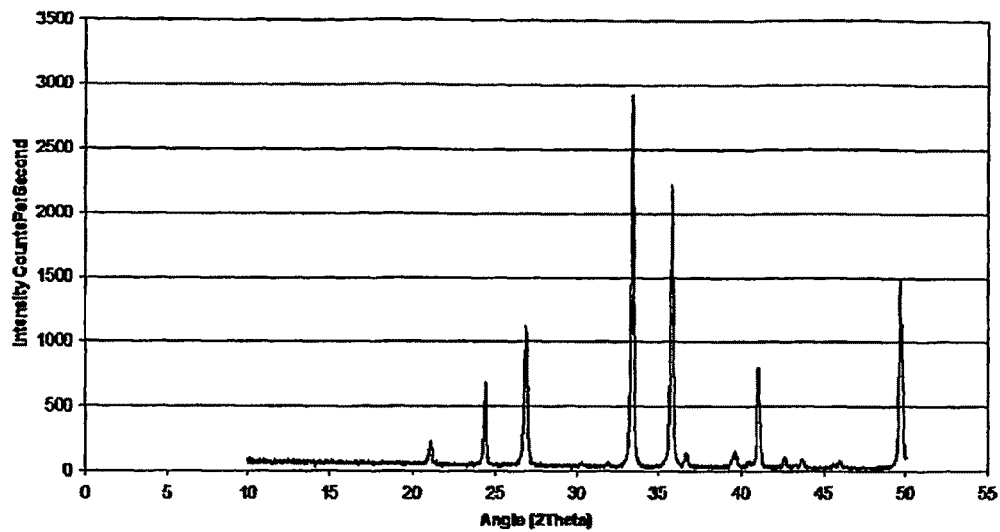
Figure 34a
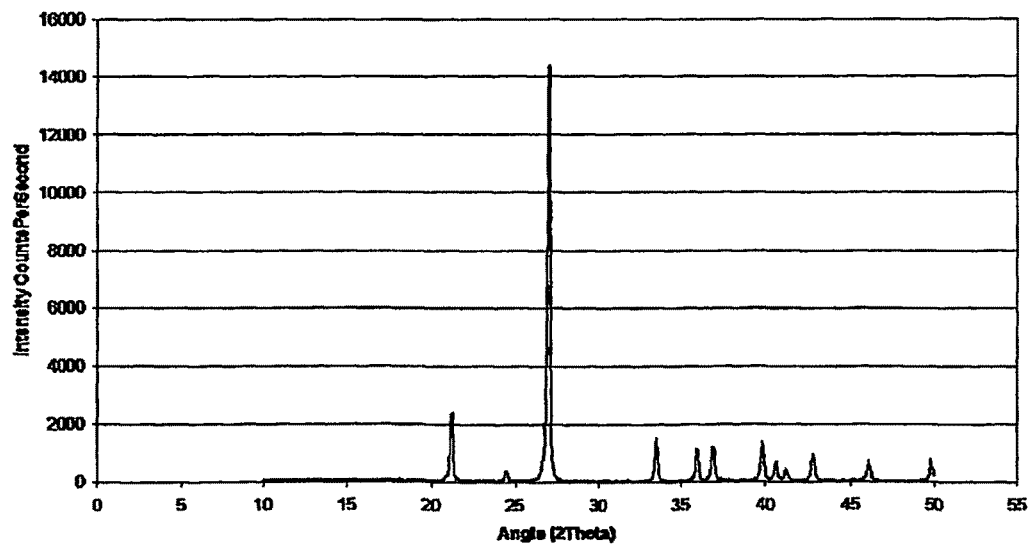
Figure 34b
Figure 34.

FLOTATION AIDS AND PROCESSES FOR USING THE SAME

This application is a National Stage Application of PCT/AU2008/001391, filed 19 Sep. 2008, which claims benefit of Application No. 2008-900158, filed 14 Jan. 2008 in Australia and which applications are incorporated herein by reference. To the extent appropriate, a claim of priority is made to each of the above disclosed applications.

FIELD OF THE INVENTION

This invention relates to particulate and/or liquid droplet separation processes from liquids containing the same and the use of specific chemical additives to control surface wetting, hydrophobicity and surface forces in such processes. More particularly the invention relates to flotation processes which incorporate specific chemical additives as flotation aids. The processes described herein may be used, for instance, in the mineral/coal/oil industries to enhance solids extraction and extracted solids processing.

BACKGROUND OF THE INVENTION

Froth flotation is one of the most widely used technologies for mineral extraction/separation from mined mineral-bearing ores, such as base metals, ferrous metals, industrial minerals, coal and oil sands (tar sands) prior to further refinement (processing). As early as in 1869, William Haynes first patented a flotation process for separating sulfide minerals from gangue (waste material) with oil. In 1905, the froth flotation process was simultaneously invented by A. H. Higgins in England and by G. A. Chapman in Australia with the use of mostly naturally occurring chemicals, such as fatty acids and oils as flotation aids. Since then, efforts have been made to improve this process technology in the areas of flowsheets, flotation aids and equipment.

Froth flotation is a selective process or separating different finely divided materials, especially valuable minerals, from waste or unwanted materials. The process generally consists of agitating a mixture of the materials with water and additive chemicals (slurry). This slurry is then introduced to a flotation cell which is aerated, creating bubbles as separating media. Hydrophobic particles stick to the bubbles and the hydrophilic particles remain in the aqueous phase. So flotation involves the hydrophobic material particles (e.g., minerals) being carried by air bubbles to the slurry surface, forming a foam layer (froth layer). Accordingly, the process involves a partitioning between the "floated" particles and the non-floated particles which remain in the slurry. The froth (containing the floated material) is separated as a concentrate that is further processed (refined). In normal flotation, the slurry left in the flotation cell is called tailings and typically needs to be further treated in a solid-liquid separation step to reuse the water and consolidate the solids to be discharged as waste "gangues" (in minerals extraction) or "ash" (in coal processing). Since most of the valuable minerals and waste materials are naturally hydrophilic, chemical reagents are typically added which enhance or increase the hydrophobicity of the valuable mineral. Alternatively, the reagents may be added to increase the hydrophobicity of the waste material (e.g., gangue) in reverse flotation. With the aid of such selective additives (flotation aids) selective flotation separation between, for instance, valuable mineral and gangue, is possible. The differential wetting (hydrophobic or hydrophilic) of valuable particles relative to unwanted particles needs to be achieved to a sufficient extent to allow differential attachment to bubbles. Generally, the flotation process is called normal flotation if the valuable particles are floated; otherwise, it is named reverse flotation with the unwanted particles (e.g., gangue) being floated. Flotation aids are mainly classified into the following three following categories: dispersants/depressants, collectors, and frothers.

Dispersant/depressant: The purpose of using dispersant is to eliminate the heterocoagulation between two different particles (for instance, mineral particles) or liquid droplets via increasing the repulsive interactions between them (electrical double layer repulsive forces, hydration force, steric force). The most commonly used dispersants in mineral flotation include water glass, sodium hexametaphosphate (Calgon), dextrin, sodium fluorosilicate, CMC (carboxymethyl cellulose), gums, polysaccharides, tannic acid, lignosulfonates, and some small molecular weight polymers etc. When added into the slurry, the dispersant adsorbs onto the particles' surfaces and leads to a very high repulsive potential energy barrier to prevent the particles attaching to each other, making the ore slurry a well dispersed suspension of individual particles. At the same time, the dispersant also plays the role as a depressant, which is supposed to make the gangue minerals more hydrophilic and difficult to attach to the air bubbles, because the dispersant/depressant reagent adsorption layers on the solid surfaces are usually hydrophilic. For example, both natural and synthetic polymers have been used to depress talc in known flotation processed. It is believed that the polymer's mode of action involves the polymer adsorbing onto the gangue particle surface via one or more of several binding mechanisms which makes the gangue particles more hydrophilic due to the existence of polymer functional groups thus preventing bubble-particle attachment.

Collector: There is almost no driving force for material particle-air bubble attachment in water if the material particles are hydrophilic. (Hydrophilic in this sense means that there is a low contact angle of the air-water-solid interface, where contact angle is measured from inside the water. Hydrophobic surfaces are on the other hand those where the contact angle between the air-water-solid interface as measured from inside the water is high.) The efficiency of flotation separation is strongly dependent on the degree of hydrophobicity of the particles to be floated. The hydrophobicity of particles can be enhanced by the addition of a collector into the slurry which adsorbs onto the particles surface. The degree of particle hydrophobicity depends on the type and amount of additive adsorbed onto the solid particle surface, and is known to increase the material flotation recovery. For mineral flotation, some organic molecules are used as collectors depending on the ore types. For example, alkyl xanthates are commonly used as collectors for sulphide mineral flotation; for the flotation of oxide ores (hematite, silica, etc.) there are more reagent choices like dodecanoic (lauric) acid, dodecanoic hydroxamate, sodium dodecyl sulphate (SDS), sodium dodecyl benzyl sulphonate (SDBS) and dodecylamine salts. For coal, oils like diesel and kerosene are used as collectors.

Frother: The primary purpose of using frother in flotation is to create air bubbles in suitable numbers (preferably many) and sizes (preferably small and uniform) to facilitate the mineral particle-bubble attachment and consequently the recovery of minerals. Frothers also help stabilize the froth (foam) at the top of the flotation cell so that it may be separated from the aqueous suspension often called the pulp. Frothers can essentially be divided into four groups. The first is aromatic alcohol types, such as aliphatic-cresol and 2,3-xylenol. The second is alkoxy types such as triethoxy butane (TEB). The third is aliphatic alcohol types such as 2-ethyl hexanol, diacetone and methyl isobutyl carbinol (MIBC), which is the most commonly used single frother today as it is relatively inexpensive and has good performance with different ores. The fourth is synthetic frothers consisting of PEO (polyethylene oxide), PPO (polypropylene oxide) and PBO (polybutylene oxide) types.

Flocculants are a further reagent sometimes used in conjunction with flotation aids in flotation processes. A flocculant induces attraction between particles so that they aggregate into larger more massive aggregates called flocs. Typically the use of flocculants is aggregation in solid/liquid separation (e.g., in the treatment of raw water in order to produce potable water). Both natural and synthetic polymers can be used as flocculants, such as starch and polyacrylamide based polymers that are very effective to destabilize the fine particle suspension.

Flocculants may be used in a hydrophilic flocculation-flotation process. Such a process is used in the case of hematite/silica separation. The fine hematite particles are first selectively flocculated by starch making them hydrophilic and increase their settling rate and then the silica particles are activated by a silica collector and floated through reverse flotation.

Another use of water soluble high molecular weight polymeric flocculants is to aid solid-liquid separation in tailings treatment (or product consolidation) after mineral separations such as flotation. The action mechanism of conventional polymeric flocculants is believed to be that the polymer induces inter-particle attractive forces by adsorbing onto and bridging between multiple particles. This is thought to lead to an increase in the effective particle diameter and mass, in turn leading to an increase in the rate of solid settling and more efficient solid-liquid separation. Unfortunately, conventional polymeric flocculants produce sediments and filter cakes which do not consolidate well. They typically contain high amounts of residual liquid because of the open, strong floc structure that results from bridging flocculation.

In conventional mineral processing applications, the flotation aids mentioned above are usually added one at a time in such a sequence such as dispersant/depressant, collector, and frother. Therefore the characteristics of the conventional approach to mineral flotation and tailings treatment are not optimized. The following brief description illustrates this point.

In an overall mineral flotation process, typically as many as three or four types of reagents are used, which results in high reagent purchase cost, high production cost for preparing and adding these reagents, deteriorated recycle water chemistry (harmful ions or components remain in the water), adverse effect on the following tailings treatment due to the high dose addition of dispersants, and adverse effect on the environment if the aid additives used in flotation are discharged as waste. For example, there has been environmental concern with regard to the low flash point temperature and high vaporization rate of MIBC that produces an unpleasant odor in warmer climates.

Second, during the tailings treatment (solid-liquid separation) that includes solids aggregation/settling and sediment consolidation, the polymeric flocculants that are used to help the fine solid particle settling down quickly are not optimized for sediment consolidation. Although conventional poly acrylamide (PAM) based polymers work well in helping solids settling, a large amount of water is actually trapped in the flocs formed by conventional polymeric flocculants. This has an adverse effect on the water release during the stage of sediment consolidation. The polymer action mechanism for bridging flocculation is adsorption of large MW polymer onto multiple particle surfaces which results in the formation of large and loose flocs. The strong attraction that results, accounts for this type of polymer's performance during dewatering. Efficient solids dewatering is urgently required to meet the challenges of water supplies and environment protection.

Finally and most importantly, conventional flotation and tailings treatment processes are considered in isolation of each other when considering the selection and application of reagents. A typical example is the application of a dispersant in mineral flotation and flocculant addition for tailings treatment. The strong dispersion of fine particles in the flotation brings difficulty for fines flocculation in the tailings treatment, because the strong inter-particle repulsive forces induced by the dispersant during flotation needs to be changed to attractive forces during solid-liquid separation. This usually means that additional flocculant is required to induce the polymer bridging effect.

Based on the above one can appreciate the need to develop more efficient flotation extraction and processing methodologies as well as develop more versatile flotation aids.

SUMMARY OF THE INVENTION

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

As used herein the term "flotation step" refers to a process step(s) in an overall flotation process which involves (i) increasing the repulsive interactions between particles (or liquid droplets) to minimise coagulation or heterocoagulation; and/or (ii) enhancing the hydrophobicity of particles (or liquid droplets) and/or hydrophobic aggregation; and/or (iii) creating and/or stabilising gas bubbles (froth). It will be appreciated that the flotation step also requires aeration by a gas (typically air). Accordingly, it will be appreciated that the flotation step as used herein may benefit by the addition of dispersants/depressants, collectors, and frothers which are referred to herein as "flotation aids". The "flotation step" according to the present invention should not be confused with a "flotation process" which includes a "flotation step". The overall "flotation process" may include further steps such as flotation tailings processing and further processing of the floated material (e.g., solid dewatering and consolidation).

Particular aspects of the present invention provide the following:
(1) A process for separating finely divided particulate matter and/or liquid droplets from a liquid containing the same including:
(i) a flotation step in which an amount of a stimulus-sensitive polymer is added to the liquid containing the finely divided particulate matter and/or liquid droplets for a time and under conditions sufficient to partition a portion of the finely divided particulate matter;
(ii) a separation step in which a portion of the partitioned finely divided particulate matter and/or liquid droplets is separated from step (i).

(2) A process according to (1) wherein the flotation step is conducted under first conditions such that there is repulsion between particles of the finely divided particulate matter and/or liquid droplets and then second conditions such that there is attraction between some particles of the finely divided particulate matter and/or liquid droplets.

(3) A process according to (1) or (2) wherein the liquid is aqueous.

(4) A process according to (3) wherein the flotation step is conducted under first conditions such that the stimulus-sensitive polymer is substantially hydrophilic and then second conditions such that the stimulus-sensitive polymer is substantially hydrophobic.

(5) A process according to (4) wherein the first conditions are such that the substantially hydrophilic stimulus-sensitive polymer minimises heterocoagulation between two different types of finely divided particulate matter and/or liquid droplets.

(6) A process according to (5) wherein the second conditions are such that the substantially hydrophobic stimulus-sensitive polymer absorbs preferentially to one type of finely divided particulate matter or liquid droplets to induce hydrophobic aggregation of said one type of finely divided particulate matter or liquid droplets.

(7) A process according to any one of (1) to (6) wherein the flotation step is conducted at a first temperature such that there is repulsion between particles of the finely divided particulate matter or liquid droplets and then at a second temperature such that there is attraction between some particles of the finely divided particulate matter or liquid droplets said second temperature being different from said first temperature.

(8) A process according to (7) wherein said second temperature is greater than said first temperature.

(9) A process according to (7) wherein said first temperature is greater than said second temperature.

(10) A process according to any one of (1) to (9) for separating finely divided solid particulate matter.

(11) A process according to any one of (1) to (6) wherein the stimulus-sensitive polymer is sensitive to temperature, pH, or electromagnetic radiation.

(12) A process according to (11) wherein the stimulus-sensitive polymer is sensitive to pH.

(13) A process according to (11) wherein the pH sensitive polymer is a polyelectrolyte.

(14) A process according to (13) wherein the polyelectrolyte is selected from one or more of the following chitosan, polyacrylic acid, polyacrylamides and derivatives thereof, polymethacrylic acid, polystyrene sultanate, polysulfanamide poly(2-vinylpyridine), poly sodium acrylate, poly (vinylpyridinium bromide), poly(diallyldimethylammonium chloride)(DADMAC), poly(dimethylamino ethyl acrylate quaternary chloride), poly(diethylamine), poly (epichlorohydrin), polymers of quarternised dimethylaminoethyl acrylates, polymers of quarternised dimethylaminoethyl acrylamides, poly(ethyleneimine), polyglucose amines, and polysaccharides such as xanthan, carragenan, agarose, agar, pectin, guar gum, starches, alginic acid.

(15) A process according to (11) wherein the stimulus-sensitive polymer is sensitive to electromagnetic radiation selected from UV and visible light.

(16) A process according to (15) wherein the light sensitive polymer includes a photosensitive unit.

(17) A process according to (15) wherein the light sensitive polymer is selected from one or more of the following: polypeptides, polyelectrolytes, polyNIPAM, poly dimethylacrylamide/N-4-phenylazophenylacrylamide (DMAAm) and poly dimethylacrylamide/4-phenylazophenylacryate (DMAA).

(18) A process according to (16) wherein the photosensitive unit is selected from spyropyran, spyrooxazine, benzoindolino pyranospiran (BIPS), benzoindolino spyrooxazine (BISO), naphthalenoindolino spyrooxazine (NISO), quinolinylindolino spyrooxazine (QISO), triphenyl methane and derivatives, and azo benzenes.

(19) A process according to any one of (1) to (11) wherein the stimulus-sensitive polymer is sensitive to temperature.

(20) A process according to (19) wherein the temperature sensitive polymer is selected from one or more of the following homopolymers and co-polymers: poly(N-isopropylacrylamide) (polyNIPAM), N-alkyl(meth)acrylamides such as N-isopropyl(meth)acrylamide, N-propyl (meth)acrylamide, N,N-diethyl(meth)acrylamide, N-cyclopropyl(meth)acrylamide, N,N-ethylmethyl(meth) acrylamide, and copolymers thereof with monomers containing functional groups such as carboxyl, amino, hydroxysuccimido, thiol, imino and epoxy groups; polyethylene oxide, poly propylene oxide, methylcellulose, ethyl hydroxyethyl cellulose, carboxymethyl cellulose, hydroxy propyl cellulose, hydrophobically modified ethyl hydroxyethyl cellulose, poly dimethylacrylamide/N-4-phenylazophenylacrylamide (DMAAm) and poly dimethylacrylamide/4-phenylazophenylacryate (DMAA), co-polymers of poly NIPAM with other polymers such as polyacrylic acid, poly(dimethylamino ethyl acrylate quaternary chloride), poly(dimethylaminopropylacrylamide) or poly(diallyldimethylammonium chloride) (DADMAC), and co-polymers containing xanthate functionality.

(21) A process according to (19) wherein the temperature sensitive polymer is substantially soluble in aqueous solution at elevated temperatures and forms a gel upon cooling.

(22) A process according to (20) wherein the temperature sensitive polymer is selected from one or more of the following: gelatin, agarose, amylase, agar, pectin, carragenan, xanthan gum, guar gum, locust bean gum, hyaluronate, dextran, starches, and alginic acid.

(23) A process according to any one of (1) to (22) wherein the stimulus-sensitive polymer has a molecular weight greater than 1 Million Da.

(24) A process according to any one of (1) to (11) wherein the stimulus-sensitive polymer is polyNIPAM or copolymers of polyNIPAM with other polymers such as polyacrylic acid, poly(dimethylamino ethyl acrylate quaternary chloride), poly (dimethylaminopropylacryl-amide) or poly (diallyldimethylammonium chloride) (DADMAC), polyethylene oxide, poly propylene oxide, methylcellulose, ethyl hydroxyethyl cellulose, carboxymethyl cellulose, hydrophobically modified ethyl hydroxyethyl cellulose, poly dimethylacrylamide/N-4-plienylazoplienylacrylamide (DMAAm) and poly dimethylacrylamide/4-phenylazophenylacryate (DMAA) and other related polymers, gelatine, agarose, amylase, agar, pectin, carragenan, xanthan gum, guar gum, locust bean gum, hyaluronate, dextran, starches, alginic acid and co-polymers containing xanthate functionality.

(25) A process according to (24) wherein the stimulus-sensitive polymer is polyNIPAM.

(26) A process according to any one of (1) to (9) wherein the liquid droplets are viscous liquid droplets derived from tar sands.

(27) A process according to any one of (1) to (25) wherein the finely divided particulate matter is a finely divided mineral ore.

(28) A process according to (27) wherein the mineral ore is selected from a sulphide, silicate, or oxide ore.

(29) A process according to (28) wherein the mineral ore is a non-sulphide ore selected from fluorite, tungsten, lithium, tantalum, tin, and coal.

(30) A process for separating a finely divided particulate matter and/or liquid droplets from a liquid containing same, including:
(i) adding an amount of a stimulus-sensitive polymer to the liquid containing the finely divided particulate matter and/or liquid droplets under first conditions sufficient to disperse the finely divided particulate matter;
(ii) stimulating the stimulus-sensitive polymer under second conditions sufficient to cause at least some of the finely divided particulate matter and/or liquid droplets to aggregate;
(iii) floating a portion of the aggregated finely divided particulate matter and/or liquid droplets; and
(iv) separating the floated finely divided particulate matter and/or liquid droplets from the liquid.

(31) A process according to (30) wherein the liquid is aqueous.

(32) A process according to (31) wherein under the first conditions the stimulus-sensitive polymer is hydrophilic and then under the second conditions the stimulus-sensitive polymer is hydrophobic.

(33) A process according to (30) wherein the liquid is organic.

(34) A process according to (33) wherein under the first conditions the stimulus-sensitive polymer is hydrophobic and then under the second conditions the stimulus-sensitive polymer is hydrophilic.

(35) A process according to any one of (30) to (34) wherein the step of stimulating the stimulus-sensitive polymer comprises changing the temperature of the liquid comprising the stimulus-sensitive polymer.

(36) A process according to (35) wherein the step of stimulating the stimulus-sensitive polymer comprises increasing the temperature of the liquid comprising the stimulus-sensitive polymer.

(37) A process according to any one of (30) to (36) for separating a finely divided particulate matter.

(38) A process according to (30) wherein the stimulus-sensitive polymer is selected selected from one or more of the following homopolymers and co-polymers: poly(N-isopropylacrylamide) (polyNIPAM), N-alkyl(meth)acrylamides such as N-isopropyl(meth)acrylamide, N-propyl(meth)acrylamide, N,N-diethyl(meth)acrylamide, N-cyclopropyl(meth)acrylamide, N,N-ethylmethyl(meth)acrylamide, and copolymers thereof with monomers containing functional groups such as carboxyl, amino, hydroxysuccimido, thiol, imino and epoxy groups; polyethylene oxide, poly propylene oxide, methylcellulose, ethyl hydroxyethyl cellulose, carboxymethyl cellulose, hydroxy propyl cellulose, hydrophobically modified ethyl hydroxyethyl cellulose, poly dimethylacrylamide/N-4-phenylazophenyl acryl amide (DMAAm) and poly dimethyl acrylamide/4-phenylazophenylacryate (DMAA), co-polymers of poly NIPAM with other polymers such as polyacrylic acid, poly(dimethylamino ethyl acrylate quaternary chloride), poly(dimethylaminopropylacrylamide) or poly(diallyldimethylammonium chloride) (DADMAC), and co-polymers containing xanthate functionality.

(39) A process according to (38) wherein the stimulus-sensitive polymer is polyNIPAM or a co-polymer of polyNIPAM.

(40) A process for separating finely divided particulate matter from an aqueous liquid comprising a first and second type of finely divided particulate matter, said process including:
(i) a flotation step comprising:
(a) adding an amount of a temperature sensitive polymer to said liquid comprising a first and second type of finely divided particulate matter for a time and at a temperature such that the temperature sensitive polymer is substantially hydrophilic whereby heterocoagulation between the first and second type of finely divided particulate matter is minimised; and
(b) adjusting the temperature of said liquid comprising a first and second type of finely divided particulate matter for a time and at a temperature such that the temperature sensitive polymer becomes substantially hydrophobic whereby the polymer absorbs preferentially to the first type of finely divided particulate matter sufficient to partition at least a portion of the first type of finely divided particulate matter from the second type of finely divided particulate matter,
(ii) a separation step in which a portion of the first type of partitioned finely divided particulate matter is separated from step (i) (b).

(41) A process according to (40) wherein the temperature sensitive polymer has molecular weight greater than 1 million Da.

(42) A process according to (40) or (41) wherein the temperature sensitive polymer is selected from one or more of the following homopolymers and co-polymers: poly(N-isopropylacrylamide) (polyNIPAM), N-alkyl(meth)acrylamides such as N-isopropyl(meth)acryl amide, N-propyl(meth)acrylamide, N,N-diethyl(meth)acrylamide, N-cyclopropyl(meth)acrylamide, ethylmethyl(meth)acrylamide, and copolymers thereof with monomers containing functional groups such as carboxyl, amino, hydroxysuccimido, thiol, imino and epoxy groups; polyethylene oxide, poly propylene oxide, methylcellulose, ethyl hydroxyethyl cellulose, carboxymethyl cellulose, hydroxy propyl cellulose, hydrophobically modified ethyl hydroxyethyl cellulose, poly dimethylacrylamide/N-4-phenylazophenylacrylamide (DMAAm) and poly dimethylacrylamide/4-phenylazophenylacryate (DMAA), co-polymers of poly NIPAM with other polymers such as polyacrylic acid, poly(dimethylamino ethyl acrylate quaternary chloride), poly(dimethylaminopropylacrylamide) or poly(diallyldimethylammonium chloride) (DADMAC), and co-polymers containing xanthate functionality.

(43) A process according to any one of (40) to (42) wherein the temperature sensitive polymer is polyNIPAM or a copolymer of polyNIPAM.

(44) A process according to (40) wherein the temperature in step (i) (a) is maintained within the range of 10-50° C.

(45) A process according to (44) wherein the temperature range is 15-38° C.

(46) A process according to (45) wherein the temperature range is 20-25° C.

(47) A process according to (44) wherein the temperature is about 22° C.

(48) A process according to any one of (40) to (47) wherein the temperature in step (i) (b) is maintained within the range of 35-80° C.

(49) A process according to (48) wherein the temperature range is 40-60° C.

(50) A process according to (49) wherein the temperature range is 47-53° C.

(51) A process according to (48) wherein the temperature is about 50° C.

(52) A process according to any one of (40) to (51) wherein the finely divided particulate matter is a finely divided mineral ore.

(53) A process according to (52) wherein the mineral ore is selected from a sulphide, silicate, or oxide ore.

(54) A process according to (52) wherein the mineral ore is a non-sulphide ore selected from fluorite, tungsten, lithium, tantalum, tin, and coal.

(55) A process for separating a finely divided mineral from an aqueous suspension containing a mineral ore comprising said finely divided mineral and finely divided waste particulate matter, said process including:
- (i) a flotation step comprising:
  - (a) adding an amount of a temperature sensitive polymer to said aqueous suspension containing a mineral ore comprising said finely divided mineral and finely divided waste particulate matter for a time and at a temperature such that the temperature sensitive polymer is substantially hydrophilic whereby heterocoagulation between the finely divided mineral and finely divided waste particulate matter is minimised; and
  - (b) adjusting the temperature of said aqueous suspension containing a mineral ore comprising said finely divided mineral and finely divided waste particulate matter for a time and at a temperature such that the temperature sensitive polymer becomes substantially hydrophobic whereby the polymer absorbs preferentially to the finely divided mineral sufficient to partition at least a portion of the finely divided mineral from the finely divided waste particulate matter,
- (ii) a separation step in which a portion of the partitioned finely divided mineral is separated from step (i) (b).

(56) A process for separating a finely divided waste particulate matter from an aqueous suspension containing a mineral ore comprising said finely divided waste particulate matter and finely divided mineral said process including:
- (i) a flotation step comprising:
  - (a) adding an amount of a temperature sensitive polymer to said aqueous suspension containing a mineral ore comprising said finely divided waste particulate matter and finely divided mineral for a time and at a temperature such that the temperature sensitive polymer is substantially hydrophilic whereby heterocoagulation between the finely divided waste particulate matter and finely divided mineral is minimised; and
  - (b) adjusting the temperature of said aqueous suspension containing a mineral ore comprising said finely divided waste particulate matter and finely divided mineral for a time and at a temperature such that the temperature sensitive polymer becomes substantially hydrophobic whereby the polymer absorbs preferentially to the finely divided waste particulate matter sufficient to partition at least a portion of the finely divided waste particulate matter from the finely divided mineral,
- (ii) a separation step in which a portion of the partitioned finely divided waste particulate matter is separated from step (i) (b).

(57) A process according to (55) or (56) wherein the temperature sensitive polymer has a molecular weight greater than 1 million Da.

(58) A process according to (57) wherein the temperature sensitive polymer is polyNIPAM or a polyNIPAM copolymer.

(59) A process according to any one of (55) to (58) wherein the temperature in step (i) (a) is maintained within the range of 20-25° C.

(60) A process according to (59) wherein the temperature is about 22° C.

(61) A process according to any one of (55) to (60) wherein the temperature in step (i) (b) is maintained within the range of 47-53° C.

(62) A process according to any one of (55) to (61) wherein the temperature is about 55° C.

(63) A process for separating finely divided particulate matter and/or liquid droplets from a liquid containing the same including:
- (i) a flotation step in which an amount of a stimulus-sensitive polymer is added to the liquid containing the finely divided particulate matter and/or liquid droplets for a time and under conditions sufficient to partition a portion of the finely divided particulate matter and/or liquid droplets;
- (ii) a flocculation step in which an amount of a stimulus-sensitive polymer is added to the liquid containing the finely divided particulate matter and/or liquid droplets for a time and under conditions sufficient to aggregate a portion of the finely divided particulate matter and/or liquid droplets; and
- (iii) a separation step in which a portion of the partitioned finely divided particulate matter (and/or partitioned liquid droplets) and/or aggregated finely divided particulate matter (and/or aggregated liquid droplets) is separated from step (i) and/or step (ii).

(64) A process according to (63) wherein the stimulus-sensitive polymer is oppositely charged in step (ii) from the stimulus-sensitive polymer in step (i).

(65) A process according to (63) wherein an additional quantity of the stimulus-sensitive polymer is added prior to performing step (ii).

(66) A process according to any one of (63) to (65) wherein the flotation step is conducted under first conditions such that there is repulsion between particles of the finely divided particulate matter and/or liquid droplets and then second conditions such that there is attraction between some particles comprising the finely divided particulate matter and/or liquid droplets.

(67) A process according to any one of (63) to (66) wherein the liquid is aqueous.

(68) A process according to (67) wherein the flotation step is conducted under first conditions such that the stimulus-sensitive polymer is substantially hydrophilic and then second conditions such that the stimulus-sensitive polymer is substantially hydrophobic.

(69) A process according to (68) wherein the first conditions are such that the substantially hydrophilic stimulus-sensitive polymer minimises heterocoagulation between two different types of finely divided particulate matter or liquid droplets.

(70) A process according to (69) wherein the second conditions are such that the substantially hydrophobic stimulus-sensitive polymer absorbs preferentially to one type of finely divided particulate matter or liquid droplet to induce hydrophobic aggregation of said one type of finely divided particulate matter or liquid droplet

(71) A process according to any one of (63) to (70) wherein the flotation step is conducted at a first temperature such that there is repulsion between particles of the finely divided particulate matter or between liquid droplets and then at a second temperature such that there is attraction between some particles of the finely divided particulate matter or some liquid droplets said second temperature being different from said first temperature.

(72) A process according to (71) wherein said second temperature is greater than said first temperature.

(73) A process according to (72) wherein said first temperature is greater than said second temperature.

(74) A process according to any one of (63) to (73) wherein the stimulus-sensitive polymer is sensitive to temperature, pH, or electromagnetic radiation.

(75) A process according to (74) wherein the stimulus-sensitive polymer is sensitive to pH.

(76) A process according to (74) wherein the pH sensitive polymer is a polyelectrolyte.

(77) A process according to (76) wherein the polyelectrolyte is selected from one or more of the following chitosan, polyacrylic acid, polyacrylamides and derivatives thereof, polymethacrylic acid, polystyrene sultanate, polysulfanamide poly(2-vinylpyridine), poly sodium acrylate, poly (vinylpyridinium bromide), poly(diallyldimethylammonium chloride)(DADMAC), poly(dimethylamino ethyl acrylate quaternary chloride), poly(diethylamine), poly (epichlorohydrin), polymers of quarternised dimethylaminoethyl acrylates, polymers of quarternised dimethylaminoethyl acrylamides, poly(ethyleneimine), polyglucose amines, and polysaccharides such as xanthan, carragenan, agarose, agar, pectin, guar gum, starches, alginic acid.

(78) A process according to (74) wherein the stimulus-sensitive polymer is sensitive to electromagnetic radiation selected from UV and visible light.

(79) A process according to (78) wherein the light sensitive polymer includes a photosensitive unit.

(80) A process according to (79) wherein the light sensitive polymer is selected from one or more of the following: polypeptides, polyelectrolytes, polyNIPAM, poly dimethylacrylamide/N-4-phenylazophenylacrylamide (DMAAm) and poly dimethylacrylamide/4-phenylazophenylacryate (DMAA).

(81) A process according to (80) wherein the photosensitive unit is selected from spyropyran, spyrooxazine, benzoindolino pyranospiran (BIPS), benzoindolino spyrooxazine (BISO), naphthalenoindolino spyrooxazine (NISO), quinolinylindolino spyrooxazine (QISO), triphenyl methane and derivatives, and azo benzenes.

(82) A process according to any one of (63) to (81) wherein the stimulus-sensitive polymer is sensitive to temperature.

(83) A process according to (82) wherein the temperature sensitive polymer is selected from one or more of the following homopolymers and co-polymers: poly(N-isopropylacrylamide) (polyNIPAM), N-alkyl(meth)acrylamides such as N-isopropyl(meth)acrylamide, N-propyl (meth)acrylamide, N,N-diethyl(meth)acrylamide, N-cyclopropyl(meth)acrylamide, N,N-ethylmethyl(meth) acrylamide, and copolymers thereof with monomers containing functional groups such as carboxyl, amino, hydroxysuccimido, thiol, imino and epoxy groups; polyethylene oxide, poly propylene oxide, methylcellulose, ethyl hydroxyethyl cellulose, carboxymethyl cellulose, hydroxy propyl cellulose, hydrophobically modified ethyl hydroxyethyl cellulose, poly dimethylacrylamide/N-4-phenylazophenylacrylamide (DMAAm) and poly dimethylacrylamide/4-phenylazophenylacryate (DMAA), co-polymers of poly NIPAM with other polymers such as polyacrylic acid, poly(dimethylamino ethyl acrylate quaternary chloride), poly(dimethylaminopropylacrylamide) or poly(diallyldimethylammonium chloride) (DADMAC), and co-polymers containing xanthate functionality.

(84) A process according to (83) wherein the temperature sensitive polymer is substantially soluble in aqueous solution at elevated temperatures and forms a gel upon cooling.

(85) A process according to (84) wherein the temperature sensitive polymer is selected from one or more of the following: gelatin, agarose, amylase, agar, pectin, carragenan, xanthan gum, guar gum, locust bean gum, hyaluronate, dextran, starches, and alginic acid.

(86) A process according to any one of (63) to (85) wherein the stimulus-sensitive polymer has a molecular weight greater than 1 million Da.

(87) A process according to any one of (63) to (86) wherein the stimulus-sensitive polymer is polyNIPAM or copolymers of polyNIPAM with other polymers such as polyacrylic acid, poly(dimethylamino ethyl acrylate quaternary chloride), poly (dimethylaminopropylacryl-amide) or poly (diallyldimethylammonium chloride) (DADMAC), polyethylene oxide, poly propylene oxide, methylcellulose, ethyl hydroxyethyl cellulose, carboxymethyl cellulose, hydrophobically modified ethyl hydroxyethyl cellulose, poly dimethylacrylamide/N-4-plienylazoplienylacrylamide (DMAAm) and poly dimethylacrylamide/4-phenylazophenylacryate (DMAA) and other related polymers, gelatine, agarose, amylase, agar, pectin, carragenan, xanthan gum, guar gum, locust bean gum, hyaluronate, dextran, starches, alginic acid and co-polymers containing xanthate functionality.

(88) A process according to (87) wherein the stimulus-sensitive polymer is polyNIPAM or polyNIPAM copolymer.

(89) A process according to (64) wherein the stimulus-sensitive polymer in step (ii) is cationic polyNIPAM or cationic polyNIPAM copolymer and the stimulus sensitive polymer for step (i) is anionic PolyNIPAM or anionic polyNIPAM copolymer.

(90) A process according to any one of (63) to (88) wherein the finely divided particulate matter is a finely divided mineral ore.

(91) A process according to (84) wherein the mineral ore is selected from a sulphide, silicate, or oxide ore.

(92) A process according to (90) wherein the mineral ore is a non-sulphide ore selected from fluorite, tungsten, lithium, tantalum, tin, and coal.

(93) A process for separating a finely divided mineral from an aqueous suspension containing a mineral ore comprising said finely divided mineral and finely divided waste particulate matter, said process including:
  (i) a flotation step in which an amount of a stimulus-sensitive polymer is added to the aqueous suspension containing the mineral ore for a time and under conditions sufficient to partition a portion of the finely divided mineral from the finely divided waste particular matter;
  (ii) a flocculation step in which an amount of a stimulus-sensitive polymer is added to the aqueous suspension containing the mineral ore for a time and under conditions sufficient to aggregate a portion of the finely divided waste particulate matter; and
  (iii) a separation step in which a portion of the partitioned finely divided mineral is separated from step (i).

(94) A process according to (93) wherein the stimulus-sensitive polymer is oppositely charged in step (ii) from the stimulus-sensitive polymer in step (i).

(95) A process according to (93) wherein an additional quantity of the stimulus-sensitive polymer is added prior to performing step (ii).

(96) A process according to any one of (93) to (95) wherein the flotation step is conducted under first conditions such that there is repulsion between particles of the finely divided mineral and waste particulate matter and then second conditions such that there is attraction between some particles comprising the finely divided mineral.

(97) A process according to (96) wherein the flotation step is conducted under first conditions such that the stimulus-sensitive polymer is substantially hydrophilic and then second conditions such that the stimulus-sensitive polymer is substantially hydrophobic.

(98) A process according to (97) wherein the first conditions are such that the substantially hydrophilic stimulus-sensitive polymer minimises heterocoagulation between the finely divided mineral and finely divided particulate matter.

(99) A process according to (98) wherein the second conditions are such that the substantially hydrophobic stimulus-sensitive polymer absorbs preferentially to the finely divided mineral to induce hydrophobic aggregation of said finely divided mineral.

(100) A process according to any one of (93) to (99) wherein the flotation step is conducted at a first temperature such that there is repulsion between particles of the finely divided mineral and particulate matter and then at a second temperature such that there is attraction between some particles of the finely divided mineral said second temperature being different from said first temperature.

(101) A process according to (100) wherein said second temperature is greater than said first temperature.

(102) A process according to any one of (93) to (101) wherein the stimulus-sensitive polymer is sensitive to temperature.

(103) A process according to (102) wherein the temperature sensitive polymer is selected from one or more of the following homopolymers and co-polymers: poly(N-isopropylacrylamide) (polyNIPAM), N-alkyl(meth)acrylamides such as N-isopropyl(meth)acrylamide, N-propyl (meth)acrylamide, N,N-diethyl(meth)acrylamide, N-cyclopropyl(meth)acrylamide, N,N-ethylmethyl(meth) acrylamide, and copolymers thereof with monomers containing functional groups such as carboxyl, amino, hydroxysuccimido, thiol, imino and epoxy groups; polyethylene oxide, poly propylene oxide, methylcellulose, ethyl hydroxyethyl cellulose, carboxymethyl cellulose, hydroxy propyl cellulose, hydrophobically modified ethyl hydroxyethyl cellulose, poly dimethylacrylamide/N-4-phenylazophenylacrylamide (DMAAm) and poly dimethylacrylamide/4-phenylazophenylacryate (DMAA), co-polymers of poly NIPAM with other polymers such as polyacrylic acid, poly(dimethylamino ethyl acrylate quaternary chloride), poly(dimethylaminopropylacrylamide) or poly(diallyldimethylammonium chloride) (DADMAC), and co-polymers containing xanthate functionality.

(104) A process according to any one of (93) to (103) wherein the stimulus-sensitive polymer has a molecular weight greater than 1 million Da.

(105) A process according to any one of (93) to (104) wherein the stimulus-sensitive polymer is polyNIPAM or copolymers of polyNIPAM with other polymers such as polyacrylic acid, poly(dimethylamino ethyl acrylate quaternary chloride), poly (dimethylaminopropylacryl-amide) or poly (diallyldimethylammonium chloride) (DADMAC), polyethylene oxide, poly propylene oxide, methylcellulose, ethyl hydroxyethyl cellulose, carboxymethyl cellulose, hydrophobically modified ethyl hydroxyethyl cellulose, poly dimethylacrylamide/N-4-plienylazoplienylacrylamide (DMAAm) and poly dimethylacrylamide/4-phenylazophenylacryate (DMAA) and other related polymers, gelatine, agarose, amylase, agar, pectin, carragenan, xanthan gum, guar gum, locust bean gum, hyaluronate, dextran, starches, alginic acid and co-polymers containing xanthate functionality.

(106) A process according to (93) wherein the stimulus-sensitive polymer is polyNIPAM or copolymer of polyNIPAM.

(107) A process according to (94) wherein the stimulus-sensitive polymer in step (ii) is cationic polyNIPAM or cationic polyNIPAM copolymer and the stimulus sensitive polymer for step (i) is anionic PolyNIPAM or anionic polyNIPAM copolymer.

(108) A process according to (93) wherein the mineral ore is selected from a sulphide, silicate, or oxide ore.

(109) A process for separating finely divided waste particulate matter from an aqueous suspension containing a mineral ore comprising said finely divided waste particulate matter and finely divided mineral, said process including:
(i) a flotation step in which an amount of a stimulus-sensitive polymer is added to the aqueous suspension containing the mineral ore for a time and under conditions sufficient to partition a portion of the finely divided waste particular matter from the finely divided mineral;
(ii) a flocculation step in which an amount of a stimulus-sensitive polymer is added to the aqueous suspension containing the mineral ore for a time and under conditions sufficient to aggregate a portion of the finely divided mineral; and
(iii) a separation step in which a portion of the aggregated finely divided mineral is separated from step (ii).

(110) A process according to (109) wherein the stimulus-sensitive polymer is oppositely charged in step (ii) from the stimulus-sensitive polymer in step (i).

(111) A process according to (109) wherein an additional quantity of the stimulus-sensitive polymer is added prior to performing step (ii).

(112) A process according to any one of (109) to (111) wherein the flotation step is conducted under first conditions such that there is repulsion between particles of the finely divided mineral and waste particulate matter and then second conditions such that there is attraction between some particles comprising the finely divided mineral.

(113) A process according to (112) wherein the flotation step is conducted under first conditions such that the stimulus-sensitive polymer is substantially hydrophilic and then second conditions such that the stimulus-sensitive polymer is substantially hydrophobic.

(114) A process according to (113) wherein the first conditions are such that the substantially hydrophilic stimulus-sensitive polymer minimises heterocoagulation between the finely divided mineral and finely divided particulate matter.

(115) A process according to (114) wherein the second conditions are such that the substantially hydrophobic stimulus-sensitive polymer absorbs preferentially to the finely divided waste particulate matter to induce hydrophobic aggregation of said finely divided waste particulate matter.

(116) A process according to any one of (109) to (115) wherein the flotation step is conducted at a first temperature such that there is repulsion between particles of the finely divided mineral and particulate matter and then at a second temperature such that there is attraction between some particles of the finely divided mineral said second temperature being different from said first temperature.

(117) A process according to (116) wherein said second temperature is greater than said first temperature.

(118) A process according to any one of (109) to (117) wherein the stimulus-sensitive polymer is sensitive to temperature.

(119) A process according to (118) wherein the temperature sensitive polymer is selected from one or more of the following homopolymers and co-polymers: poly(N-isopropylacrylamide) (polyNIPAM), N-alkyl(meth)acrylamides such as N-isopropyl(meth)acrylamide, N-propyl (meth)acrylamide, N,N-diethyl(meth)acrylamide, N-cyclopropyl(meth)acrylamide, N,N-ethylmethyl(meth) acrylamide, and copolymers thereof with monomers containing functional groups such as carboxyl, amino, hydroxysuccimido, thiol, imino and epoxy groups; polyethylene oxide, poly propylene oxide, methylcellulose, ethyl hydroxyethyl cellulose, carboxymethyl cellulose, hydroxy propyl cellulose, hydrophobically modified ethyl hydroxyethyl cellulose, poly dimethylacrylamide/N-4-phenylazophenylacrylamide (DMAAm) and poly dimethylacrylamide/4-phenylazophenylacryate (DMAA), co-polymers of poly NIPAM with other polymers such as polyacrylic acid, poly(dimethylamino ethyl acrylate quaternary chloride), poly(dimethylaminopropylacrylamide) or poly(diallyldimethylammonium chloride) (DADMAC), and co-polymers containing xanthate functionality.

(120) A process according to any one of (109) to (119) wherein the stimulus-sensitive polymer has a molecular weight greater than 1 million Da.

(121) A process according to any one of (109) to (120) wherein the stimulus-sensitive polymer is polyNIPAM or copolymers of polyNIPAM with other polymers such as polyacrylic acid, poly(dimethylamino ethyl acrylate quaternary chloride), poly (dimethylaminopropylacrylamide) or poly (diallyldimethylammonium chloride) (DADMAC), polyethylene oxide, poly propylene oxide, methylcellulose, ethyl hydroxyethyl cellulose, carboxymethyl cellulose, hydrophobically modified ethyl hydroxyethyl cellulose, poly dimethylacrylamide/N-4-plienylazoplienylacrylamide (DMAAm) and poly dimethylacrylamide/4-phenylazophenylacryate (DMAA) and other related polymers, gelatine, agarose, amylase, agar, pectin, carragenan, xanthan gum, guar gum, locust bean gum, hyaluronate, dextran, starches, alginic acid and co-polymers containing xanthate functionality.

(122) A process according to (109) wherein the stimulus-sensitive polymer is polyNIPAM or copolymer of polyNIPAM, (123) A process according to (110) wherein the stimulus-sensitive polymer in step (ii) is cationic polyNIPAM or cationic polyNIPAM copolymer and the stimulus sensitive polymer for step (i) is anionic polyNIPAM or anionic polyNIPAM copolymer.

(124) A process according to (109) wherein the mineral ore is selected from a sulphide, silicate, or oxide ore.

(125) A process for separating a finely divided mineral from an aqueous suspension containing a mineral ore which comprising said finely divided mineral and finely divided waste particulate matter, said process including the following sequence of steps:
 (i) a flotation step in which an amount of a stimulus-sensitive polymer is added to the aqueous suspension containing the mineral ore for a time and under conditions sufficient to partition a portion of the finely divided mineral from the finely divided waste particular matter;
 (ii) a separation step in which a portion of the partitioned finely divided mineral is separated from step (i); and
 (iii) a flocculation step in which an amount of a stimulus-sensitive polymer is added to the aqueous suspension containing the mineral ore for a time and under conditions sufficient to aggregate a portion of the finely divided waste particulate matter.

(126) A process for separating a finely divided mineral from an aqueous suspension containing a mineral ore comprising said finely divided mineral and finely divided waste particulate matter, said process including the following sequence of steps:
 (i) a flocculation step in which an amount of a stimulus-sensitive polymer is added to the aqueous suspension containing the mineral ore for a time and under conditions sufficient to aggregate a portion of the finely divided waste particulate matter;
 (ii) a separation step in which a portion of the aggregated finely divided mineral is separated from step (i);
 (iii) a flotation step in which an amount of a stimulus-sensitive polymer is added to the aqueous suspension containing the mineral ore for a time and under conditions sufficient to partition a portion of the finely divided mineral from the finely divided waste particular matter; and
 (iv) a separation step in which a portion of the partitioned finely divided mineral is separated from step (i).

(127) A process for floating finely divided particulate matter and/or liquid droplets from a liquid containing the same including a flotation step in which an amount of a stimulus-sensitive polymer is added to the liquid containing the finely divided particulate matter and/or liquid droplets for a time and under conditions sufficient to float at least a portion of said divided particulate matter and/or liquid droplets.

(128) A process according to (127) for floating a mineral ore wherein the liquid is aqueous.

(129) A process according to (127) or (128) wherein the flotation step is conducted such that the stimulus-sensitive polymer is substantially hydrophobic.

(130) A process according to any one of (127) to (129) wherein the stimulus-sensitive polymer is a temperature sensitive polymer (131) A process according to (130) wherein the flotation step is conducted at a temperature above 30° C.

(132) A process according to (130) or (131) wherein the temperature sensitive polymer is polyNIPAM or a copolymer of polyNIPAM.

(133) Use of a stimulus-sensitive polymer as a flotation aid.

(134) A use according to (133) wherein the stimulus-sensitive polymer is a thermo sensitive polymer.

(135) A use according to (133) or (134) wherein the thermo sensitive polymer is selected from polyNIPAM or copolymers of polyNIPAM with other polymers such as polyacrylic acid, poly(dimethylamino ethyl acrylate quaternary chloride), poly (dimethylaminopropylacryl-amide) or poly (diallyldimethylammonium chloride) (DADMAC), polyethylene oxide, poly propylene oxide, methylcellulose, ethyl hydroxyethyl cellulose, carboxymethyl cellulose, hydrophobically modified ethyl hydroxyethyl cellulose, poly dimethylacrylamide/N-4-plienylazoplienylacrylamide (DMAAm) and poly dimethylacrylamide/4-phenylazophenylacryate (DMAA) and other related polymers, gelatine, agarose, amylase, agar, pectin, carragenan, xanthan gum, guar gum, locust bean gum, hyaluronate, dextran, starches, alginic acid and co-polymers containing xanthate functionality.

(136) A use according to (133) wherein the polymer is polyNIPAM or a polyNIPAM copolymer.

(137) A use according to any one of (133) to (136) in a mineral ore flotation process.

(138) A use according to any one of (133) to (137) wherein the stimulus-sensitive polymer is used as a dispersant/depressant.

(139) A use according to any one of (133) to (137) wherein the stimulus-sensitive polymer is used as a collector.

(140) A use according to any one of (133) to (137) wherein the stimulus-sensitive polymer is used as a flotation frother.

(141) A method of increasing the surface hydrophobicity of particles and inducing hydrophobic aggregation of said particles in a flotation step including contacting the particles with an amount of stimulus-sensitive polymer for a time and under conditions sufficient to increase the surface hydrophobicity and induce aggregation of said particles.

(142) A method according to (141) wherein the particles are mineral particles from a mineral ore.

(143) A method according to (141) wherein the stimulus-sensitive polymer is polyNIPAM or a copolymer of polyNIPAM.

(144) A process for separating a finely divided particulate matter from a liquid containing same, including:
  (i) adding an amount of a stimulus-sensitive polymer to the liquid containing the finely divided particulate matter under first conditions sufficient to disperse the finely divided particulate matter;
  (ii) stimulating the stimulus-sensitive polymer under second conditions sufficient to enhance the surface hydrophobicity of at least some of the finely divided particulate matter;
  (iii) floating a portion of the finely divided particulate matter; and
  (iv) separating the floated finely divided particulate matter from the liquid.

(145) A process for separating a finely divided particulate matter and/or liquid droplets from a liquid containing same, including:
  (i) adding an amount of a stimulus-sensitive polymer to the liquid containing the finely divided particulate matter under first conditions sufficient to disperse the finely divided particulate matter;
  (ii) stimulating the stimulus-sensitive polymer under second conditions sufficient to enhance the surface hydrophobicity of at least some of the finely divided particulate matter and to cause said matter to aggregate;
  (iii) floating a portion of the aggregated finely divided particulate matter; and
  (iv) separating the floated finely divided particulate matter from the liquid.

(146) A process according to (144) or (145) wherein the liquid is aqueous.

(147) A process according to any of (144) to (145) wherein under the first conditions the stimulus-sensitive polymer is hydrophilic and then under the second conditions the stimulus-sensitive polymer is hydrophobic.

(148) A process according to (144) or (145) wherein the liquid is organic.

(149) A process according to (147) wherein under the first conditions the stimulus-sensitive polymer is hydrophobic and then under the second conditions the stimulus-sensitive polymer is hydrophilic.

(150) A process according to any one of (144) to (149) wherein the step of stimulating the stimulus-sensitive polymer comprises changing the temperature of the liquid comprising the stimulus-sensitive polymer.

(151) A process according to (144) or claim 145 wherein the step of stimulating the stimulus-sensitive polymer comprises increasing the temperature of the liquid comprising the stimulus-sensitive polymer.

(152) A process according to any one of (144) to (145) for separating finely divided mineral particles from mineral ore.

(153) A process according to any one of (144) to (152) wherein the stimulus-sensitive polymer is selected from one or more of the following homopolymers and co-polymers: poly(N-isopropylacrylamide) (polyNIPAM), N-alkyl(meth)acrylamides such as N-isopropyl(meth) acrylamide, N-propyl(meth)acrylamide, N,N-diethyl (meth)acrylamide, N-cyclopropyl(meth)acrylamide, N,N-ethylmethyl(meth)acrylamide, and copolymers thereof with monomers containing functional groups such as carboxyl, amino, hydroxysuccimido, thiol, imino and epoxy groups; polyethylene oxide, poly propylene oxide, methylcellulose, ethyl hydroxyethyl cellulose, carboxymethyl cellulose, hydroxy propyl cellulose, hydrophobically modified ethyl hydroxyethyl cellulose, poly dimethylacrylamide/N-4-phenylazophenylacrylamide (DMAAm) and poly dimethylacrylamide/4-phenylazophenylacryate (DMAA), co-polymers of poly NIPAM with other polymers such as polyacrylic acid, poly(dimethylamino ethyl acrylate quaternary chloride), poly(dimethylaminopropylacrylamide) or poly(diallyldimethylammonium chloride) (DADMAC), and co-polymers containing xanthate functionality.

(154) A process according to (153) wherein the stimulus-sensitive polymer is polyNIPAM or a co-polymer of polyNIPAM.

BRIEF DESCRIPTION OF THE FIGURES

The following figures which form part of the specification are included to further demonstrate certain aspects of the present invention. The invention may be better understood by reference to one or more of the figures in combination with the detailed description of particular embodiments presented herein.

FIG. 32. X-ray diffraction patterns for standard mixtures of silica and hematite powders. (a) 100% hematite, (b) 80% hematite and 20% silica, (c) 60% hematite and 40% silica, (d) 40% hematite and 60% silica, (e) 20% hematite and 80% silica, and (1) 100% silica.

FIG. 33. (a) X-ray diffraction pattern for froth floated at 20° C. for 5 mins flotation with 250 ppm APNIPAM. (b) X-ray diffraction pattern for residue from flotation at 20° C. for 5 mins flotation, 250 ppm APNIPAM.

FIG. 34. (a) X-ray diffraction pattern for froth floated at 50° C. for 5 mins flotation, 250 ppm APNIPAM. (B)-ray diffraction pattern for residue from flotation at 50° C. for 5 mins flotation, 250 ppm APNIPAM.

DETAILED DESCRIPTION OF THE INVENTION

Figure 1:
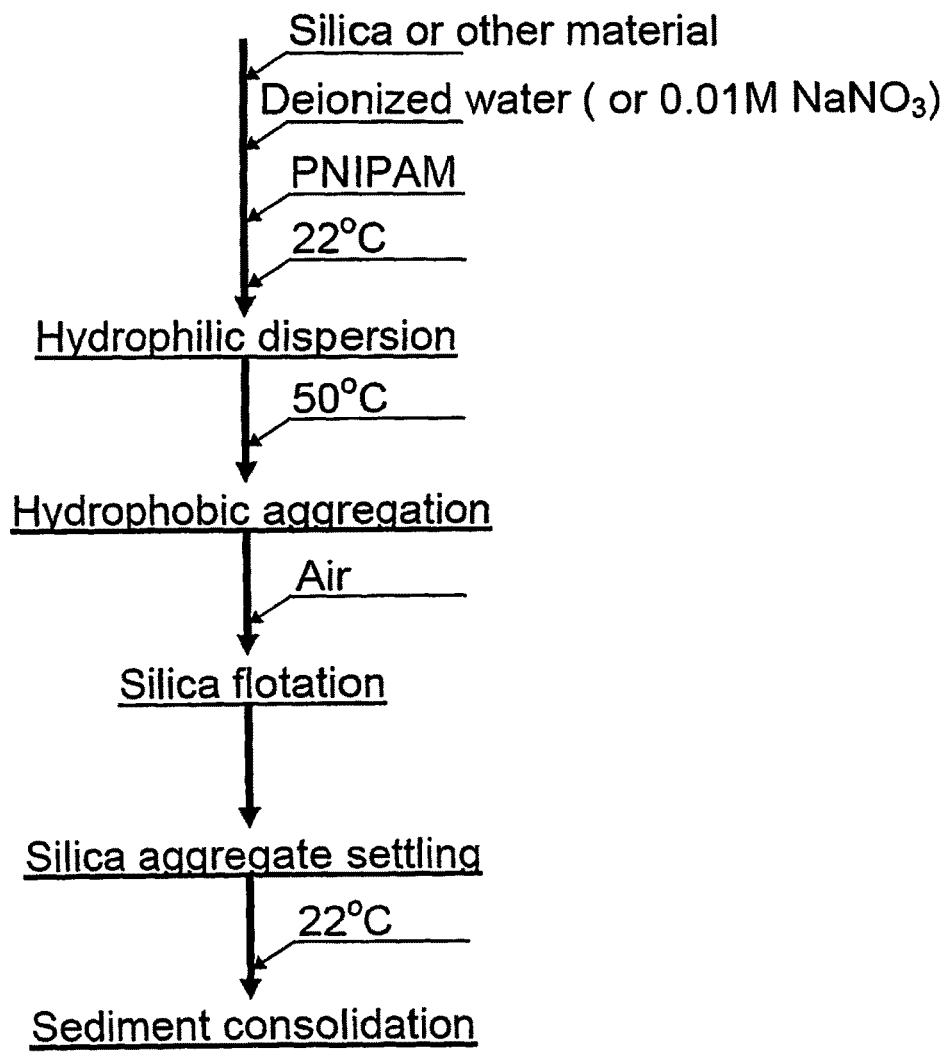
FIG. 1. A schematic process flow diagram of a material flotation and solid dewatering process with a temperature-sensitive polymer, poly(N-isopropylacrylamide) (PNIPAM), used as a multiple-function process aid.

As can be observed from the aforementioned aspects the present invention relates to separation processes that use stimuli-sensitive polymers to control surface hydrophobicity, wetting and/or surface forces.

Without wanting to be bound by any particular theory the present invention is predicated on the following:

Environmental conditions can be used as a switch to control the solution behavior of the stimuli-sensitive polymers or molecules. The change in solution behavior may be related to solubility, molecular conformation, intermolecular force and/or other factors. The change in solution behavior can have an influence on the properties of surfaces in contact with the solution. Thus, the stimuli-sensitive polymers may be used to induce a change in surface properties of surfaces in contact with the solution. The polymers may be used to make a hydrophobic/hydrophilic transition of a material's surface, which is useful in wetting and dewetting applications. In addition, the change of the materials surface hydrophobicity may be useful to control the inter-particle forces between surfaces. The forces may be cycled between repulsive and attractive as the stimuli are cycled between two conditions. The polymers may also be used to control the interaction between a solid particle and a liquid droplet or a gas bubble and/or between droplets and bubbles.

The present inventors have found that a polymer which is hydrophilic and soluble under one set of conditions and hydrophobic and poorly soluble under another set of conditions can be used to induce repulsion between surfaces and particles in water under the first set of conditions and attraction between the surfaces and particles under the second set of conditions. If the solvent is polar (such as water) the first set of conditions may induce repulsion between surfaces of particles suspended in the liquid while the second set of conditions may result is attraction between surface of particles. If the solvent is non-polar (for example, an organic solvent) the first set of conditions may induce attraction between surfaces or particles suspended in the liquid while the second set of conditions may result in repulsion between surfaces or particles.

An advantage of the present invention, which will become evident upon further reading, is that the stimulant-sensitive polymers contemplated herein may be used as multiple-function process aids in replacement of two or more conventional flotation aids (including dispersants, collectors and frothers) in a flotation step. Furthermore, it has also been found that the same polymers may have additional utility as flocculants and consolidation aids for both concentration separation (for example processing of material after extraction via froth flotation) and for solid/water separation (for example tailings dewatering) in an overall flotation process. In a preferred embodiment a single stimulant-sensitive polymer may perform all of the functions necessary for separating and floating different types of finely divided materials from each other and for further processing of the separated material and tailings (e.g., solids dewatering and consolidation).

Preferably the stimuli conditions are reversibly operable so they can be applied to manipulate the performance of stimuli-sensitive polymers between two conditions. Stimuli which may be used to control the processes' performance are temperature, pH, presence or absence of radiation (such as visible, UV or infrared light), x-rays and magnetic and/or electrical field, or any combination of these. The temperature or pH may be either increased or decreased to create aggregation or dispersion.

Accordingly, "stimuli-sensitive polymers" includes polymeric compounds or agents having the characteristics of hydrophilic/hydrophobic transition (or soluble/insoluble) with the change of stimuli conditions. Namely, the behaviors of suitable stimuli-sensitive polymers may be manipulated by environmental stimulus as discussed above. These types of polymers are also often called "smart polymers".

In an embodiment, the invention may be used with two or more stimulant-sensitive polymers in combination. Preferably, the invention utilizes a single type of stimulant-sensitive polymer.

Another embodiment uses co-polymers of stimulant sensitive polymers with either other stimulant sensitive polymers or other monomers. The co-polymers may be either random, block, comb, star or other architecture.

The polymers may or may not adsorb on to the particles surface when the stimuli is in the condition that produces repulsion between surfaces. The polymer adsorbs to the surface when the stimuli is changed so that the polymer becomes poorly soluble in solution resulting in attraction.

In some cases it may be advantageous to cause the polymer to adsorb onto the surface when the stimuli is such that repulsion results. First, the polymer may aid in creating steric or electro-steric repulsion and second, the amount of polymer required may be reduced if it exists at the interface where it is needed to change the surface forces.

In other cases, it may be an advantage for the polymer not to adsorb on the particles surface when the condition of repulsion exists between the particles because it may be possible to recover the polymer for reuse if it is not adsorbed to the particles.

The use of co-polymers with groups that adsorb to specific types of particles may be advantageous when used with the invention in order to specifically adsorb to one type of particle in order to effect either selective surface hydrophobicity and/or selective separation and/or selective flocculation and or selective flotation. Co-polymers with charge sign opposite to the particles surface will tend to aid in adsorption while co-polymers with charge the same sign as the particles surface hinders adsorption of polymer onto the particles surface. For instance, co-polymers with xanthate functionality are expected to be particularly good at adsorbing onto sulphide mineral particles.

When the solvent is aqueous (as is preferred in mineral flotation), the polymers of the present invention described herein can be used to disperse a material when the material surfaces are induced by the stimuli-sensitive polymers to be hydrophilic at one stimuli condition. Whereas when the material surfaces are induced to be hydrophobic under another stimuli condition hydrophobic aggregation takes place as discussed below.

As a further advantage material flotation can be enhanced when hydrophobicity and aggregation is induced by the stimuli-sensitive polymers. In this way the polymers may be thought of as acting as collectors. Hydrophobic aggregation during flotation is particularly beneficial for the recovery of fine material particles that have low floatability. Accordingly, as a further advantage the present invention provides both an enhanced hydrophobic surface to said material particles while also inducing aggregation of said particles with the use of a single stimulus-sensitive polymer as a flotation aid.

In addition, little or no extra frother may be needed for the flotation of the hydrophobic aggregates induced by stimuli-sensitive polymers as these polymers have also been found to have frothing ability.

As still a further advantage of the present invention, the solids dewatering efficiency can be improved in both solids settling rate and sediment consolidation by the application of the stimuli-sensitive polymers as described by Franks and co-workers (WO 2005/021129, incorporated herein by reference) compared to conventional flocculants. First, the settling rate of fine solid particles can be considerably increased with the hydrophobic aggregation. Since the aggregates are hydrophobic, less water is trapped in the aggregate structure and denser sediments (containing less water) can be formed than that formed by conventional flocculants. Second, the attractive inter-particle force within the sediment can be changed to repulsive to allow for additional consolidation of the sediment. As a result, the sediment volume is reduced and more water is released. In addition the dewatered produce (underflow) has a reduced viscosity and/or yield stress so the material may be more easily pumped to another location. Conventional flocculants do not have such function to allow more water to be released from the sediment during consolidation.

As such another advantage of the present process is that one single stimuli-sensitive polymer can be used for both material flotation and also in the treatment of the tailings.

Initially the stimuli-sensitive polymer added into slurry may produce a hydrophilic dispersion of particles in the slurry. The stimulus may then be changed to make the polymer hydrophobic (or poorly soluble) so that it adsorbs to the particle's surface and induces hydrophobic aggregation. This aids in flotation of the material, in which the particles stick to the air bubbles and are removed when they rise into a froth phase and are separated from the pulp. Afterwards, in solids dewatering, a rapid settling rate may be achieved by maintaining the condition in the state which produces hydrophobic attraction between the particles. Finally, the sediment consolidation may also be improved by changing the stimuli to that which produces well soluble hydrophilic polymers and repulsive particle interactions. Therefore, the reagent types and dosages used for flotation and solids dewatering can be reduced to provide a better method for increasing production efficiency and pollution minimisation.

Accordingly, the present invention is useful in recovering materials (minerals, coal, oil sands, oil, algae, and food waste (example, from abattoirs) and for solids dewatering when the stimulant sensitive polymer additive is used as a multifunctional process aid. In one embodiment the process comprises contacting the materials (either as finely divided particulate matter or liquid droplets) with a stimuli-sensitive polymer and the stimuli adjusted to produce hydrophobic particles. The particles or liquid droplets can then be separated from other materials by flotation. The floated material can then be separated from the liquid (such as water) by keeping the stimuli in the condition that produces hydrophobic aggregation so that the aggregates rapidly settle down, the sediment moisture can then be minimized by returning the stimulus to condition resulting in repulsion between particle such that additional consolidation occurs and liquid (water) is released from the sediment.

Preferably, the material flotation is carried out in the presence of water and a flotation. The key factor for the flotation and these solids dewatering is to control the material surface wetting properties with stimuli-sensitive polymers that can adsorb on the material surface. The material-polymer contact most preferably occurs before or during the flotation in order to increase material flotation recovery as well as solids dewatering efficiency.

Preferably the wettability of the material surface after contact with the stimuli-sensitive polymers varies correspondingly to the change of stimulus, and the surface or inter-particle forces change accordingly. When the particle surface in water is induced to be hydrophilic, the inter-particle forces are usually repulsive with adequate polymer molecular weight and dosage, whereas when the particle surface is hydrophobic, the inter-particle forces are attractive.

When the conditions are such that the inter-particle forces are repulsive, the material is dispersed in a liquid (e.g., aqueous) and coagulation or hetero-coagulation of two different types of materials is eliminated, which is beneficial to material selective flotation.

When the conditions are such that the inter-particle forces are hydrophobic and attractive, hydrophobic aggregates are formed, which have much larger size than fine particles. The material flotation is therefore improved due to both increases in surface hydrophobicity and increased aggregate size and the flotation recovery of fine size particles is particularly increased due to the improved flotation rate. At same time, the adequate size and distribution of air bubbles are provided and controlled by the existence of the stimuli-sensitive polymers in the liquid, which is also helpful to the particle-bubble collision and material flotation rate. The stimulant responsive polymer can also act as a frother as demonstrated in FIG. 20 in Example 10.

In addition to enhancing the efficiency of the material flotation step, stimuli-sensitive polymers may additionally provide extra benefits of solids dewatering due to the hydrophobic aggregation, both in concentrate dewatering and tailings dewatering. This aggregation may result in faster settling of solids and improved recovery of water as discussed previously.

Moreover in solids dewatering, a further benefit of sediment consolidation may be provided by the use of stimuli-sensitive polymers as described herein. After the settling of hydrophobic flocs, the stimuli-sensitive polymer can be used to change the hydrophobic attractive inter-particle forces into hydrophilic repulsive forces by changing the condition. This will result in further water release from the sediment and reduced sediment volume.

In respect of the various aspects described above one or more of the following may apply:

In one embodiment the stimuli-sensitive polymer is a polyelectrolyte.

A polyelectrolyte is a charged polymer. A weak polyelectrolyte is one whose charge depends upon the pH of the solution. Polyelectrolytes or combinations of polyelectrolytes can be used herein as stimulant responsive polymers particularly when pH is the stimulus. For example, either one or any combination of the following polymers may be used: chitosan, polyacrylic acid, polyacrylamides and derivatives thereof, polymethacrylic acid, polystyrene sultanate, polysulfanamide poly(2-vinylpyridine), poly sodium acrylate, poly(vinylpyridinium bromide), poly(diallyldimethylammonium chloride)(DADMAC), poly(diethylamine), poly(epichlorohydrin), polymers of quarternised dimethylaminoethyl acrylates, polymers of quarternised dimethylaminoethyl acrylamides, poly(ethyleneimine), polyglucose amine, poly(dimethylamino ethyl acrylate quaternary chloride) and the like, polysaccharides such as xanthan, carragenan, agarose, agar, pectin, guar gum, starches, alginic acid and the like.

In another embodiment the stimuli-sensitive polymer responds to changes in temperature. Such stimuli-sensitive polymers are called thermo-sensitive or temperature-sensitive polymers. They have been recognized to have a rapid temperature reaction point at which they switch from a hydrophilic state to a hydrophobic state or vice versa in solution. This point typically corresponds to a change in polymer conformation. When the polymer is soluble and hydrated at low temperature and poorly soluble and hydrophobic at higher temperature, the temperatures is called the critical solution temperature (CST). For example, a poly(N-isopropylacrylamide) homopolymer has a CST of about 32° C.

Suitable temperature sensitive polymers of this type include one or any combination of the following homopolymers and co-polymers: poly(N-isopropylacrylamide) (polyNIPAM), N-alkyl(meth)acrylamides such as N-isopropyl(meth)acrylamide, N-propyl(meth)acrylamide, N,N-diethyl(meth)acrylamide, N-cyclopropyl(meth)acrylamide, N,N-ethylmethyl(meth)acrylamide, and copolymers thereof with monomers containing functional groups such as carboxyl, amino, hydroxysuccimido, thiol, imino and epoxy groups; polyethylene oxide, poly propylene oxide, methylcellulose, ethyl hydroxyethyl cellulose, carboxymethyl cellulose, hydroxy propyl cellulose, hydrophobically modified ethyl hydroxyethyl cellulose, poly dimethylacrylamide/N-4-phenylazophenylacrylamide (DMAAm) and poly dimethylacrylamide/4-phenylazophenylacryate (DMAA), co-polymers of poly NIPAM with other polymers such as polyacrylic acid, poly(dimethylaminopropylacrylamide), poly(dimethylamino ethyl acrylate quaternary chloride) or poly(diallyldimethylammonium chloride) (DADMAC), co-polymers containing xanthate functionality and other related polymers.

In another embodiment the temperature sensitive polymer may be selected from those which are soluble at elevated temperature and gel upon cooling. Some examples include gelatin, agarose, amylase, agar, pectin, carragenan, xanthan gum, guar gum, locust bean gum, hyaluronate, dextran, starches, alginic acid and others.

A preferred temperature sensitive polymer is polyNIPAM or a polyNIPAM copolymer.

In still another embodiment, the flotation aid of the present invention may be a photosensitive molecule or polymer. Exposing photosensitive molecules to either infrared, UV or visible light causes them to change molecular configuration such that their solubility in water is either increased or reduced. Subsequent absence of light (darkness) or exposure to another wavelength of light, or heat causes the molecule to revert to its original configuration. In many cases, the water-soluble configuration of the molecule has an open form and the corresponding hydrophobic configuration has a closed form, in other cases a cis-trans transformation causes the change in solubility. Polymers containing photosensitive molecules and derivatives of photosensitive molecules are also suitable additives for creating light stimulated flotation, flocculation and consolidation. Suitable polymers for the inclusion of photosensitive units into the side chains include polypeptides, such as lysine, glutamic acid, poly acrylic acid, poly acrylamides, polyelectrolytes, poly NIPAM and other water-soluble molecules. Photosensitive units that may be included as side groups on the polymer chains include spyropyran, spyrooxazine, benzoindolino pyranospiran (BIPS), benzoindolino spyrooxazine (BISO), naphthalenoindolino spyrooxazine (NISO), quinolinylindolino spyrooxazine (QISO), triphenyl methane and derivatives, azo benzene and similar molecules. Another class of photosensitive molecules changes from the hydrophilic to the hydrophobic form in aqueous solution when the wavelength of light is changed from the visible to the ultraviolet. Polymers responsive to this sort of stimulus include poly dimethylacrylamide/N-4-phenylazophenylacrylamide (DMAAm) and poly dimethylacrylamide/4-phenylazophenylacryate (DMAA). Note that some polymers such as poly dimethylacrylamide/N-4-phenylazophenylacrylamide (DMAAm) and poly dimethylacrylamide/4-phenylazophenylacryate (DMAA) are both photo and temperature sensitive. Also suitable may be those polymers described in Irie., et al, *Pure & Appl. Chem.*, Vol. 62, No. 8, 1495-1502 (1990) incorporated herein by reference.

The concentration of stimuli-sensitive polymers required will vary according to the type and condition of the materials being processed and the flotation aid function one requires the polymer to perform. Also the amount of any particular polymer required is dependent on its molecular weight of the polymer, its chemical constituency and architecture. These parameters may be determined by those skilled in the art. For instance, in an embodiment the polymer may be added to a finely divided mineral ore in a flotation step in an amount of between 20 g/tonne-20 kg/tonne. In another embodiment the polymer may be added at 200 g/tonne to 2 kg/tonne of mineral ore.

Figure 38:
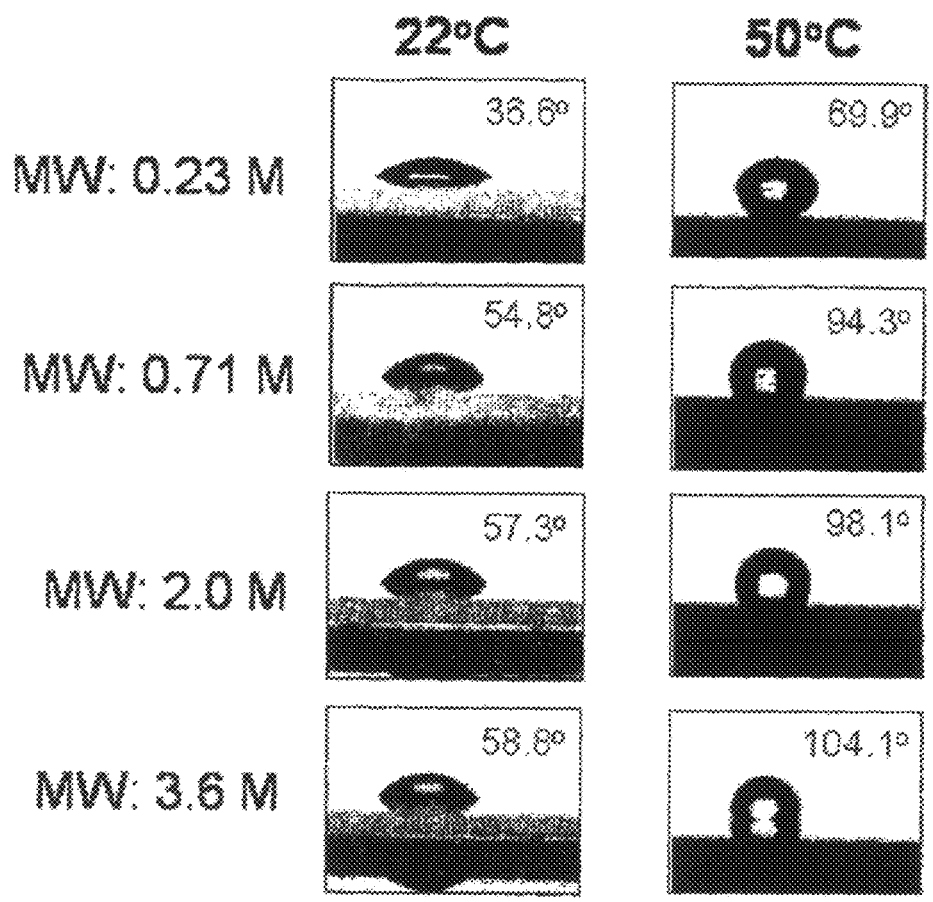
FIG. 38. Photos of contact angles measured on glass slides coated with different MW and dosage of PNIPAM coating at 22° C. and 50° C. to demonstrate the control of surface wetting with the stimulant responsive polymer PNIPAM.

In a preferred embodiment, higher molecular weight polymers (greater than about 1 million Da) produce larger changes in surface hydrophobicity and contact angle as shown in FIG. 38 and Table 7 in Example 13. The higher molecular weight polymers require a lower total amount of the polymer dosage to produce desirable flotation and dewatering performance. The higher molecular weight polymers also produce the fastest sedimentation rates (FIGS. 8 and 9) and greatest water release characteristics as shown in FIGS. 16 and 17. It should be recognized that temperature-sensitive polymers may be added in sufficient concentrations to provide improved material flotation recovery and improved consolidation of solids in the suspension.

The stimuli-sensitive polymers may be suitable for use in various material processes or find use in a variety of applications, especially where materials must be separated from each other and separated from liquid (water). It is an important discovery that stimuli-sensitive polymers will enhance the material flotation to provide improved recovery and reduce environmental hazards associated with handling solids dewatering.

FIG. 1 is a schematic process flow diagram of a material flotation and solid dewatering process. A silica mineral with certain particle size distribution is contacted with water containing an operational ion concentration (0.01 M $NaNO_3$ for example) to form a slurry. A temperature-sensitive polymer, poly(N-isopropylacrylamide) (PNIPAM) with MW=3.6M Da, is also added to the slurry. At the room temperature 22° C. (<CST), the particles are dispersed to avoid any possible hetero-coagulation (if there are two or more different mineral particles). The slurry temperature is then increased to 50° C. (>CST), and particle hydrophobic aggregation is induced to allow for recovery of a mineral or material such as silica by flotation. When air is injected into the slurry by conventional means (such as stirred flotation cells, columns, Jameson cells or dissolved air flotation), the hydrophobic flocs attach to air bubbles and are floated into froth which can be removed as product.

Later in the dewatering stage, the flocs rapidly settle down and can be separated from the water in a device such as a thickener. Finally, additional water can be recovered during the sediment consolidation by decreasing the slurry temperature to 22° C. (<CST). The flocs are broken up into individual particles and more water is released from the sediment. The sediment moisture is further reduced. This process method can be used for both material normal flotation and reverse flotation and their solids dewatering. With the use of stimuli-sensitive polymer, the improved hydrophobic floc flotation may result in higher process capacities for a given processing facility. The cost of purchasing other reagents of dispersant, flocculant, collector and frother can be saved. The efficiency of reusing the recycle water may be enhanced. Pollution minimization may be achieved with use of less chemicals and less water is required from the environment.

In another embodiment, the stimuli-sensitive polymers may be used together with other reagents for slurry behavior control, such as chemicals to adjust pH or to control ion concentrations (e.g., other known flotation aids). These parameters may affect the polymer behavior directly and/or the polymer adsorption onto different material surfaces, which is beneficial to achieving selective material flotation separation. The selective separation may be achieved by producing co-polymers tailored to specifically adsorb onto particular materials surface selectively. For example, charged constituents in the co-polymer may be used to cause the polymer to selectively adsorb only to particles with opposite charge to the polymer.

Figure 2:
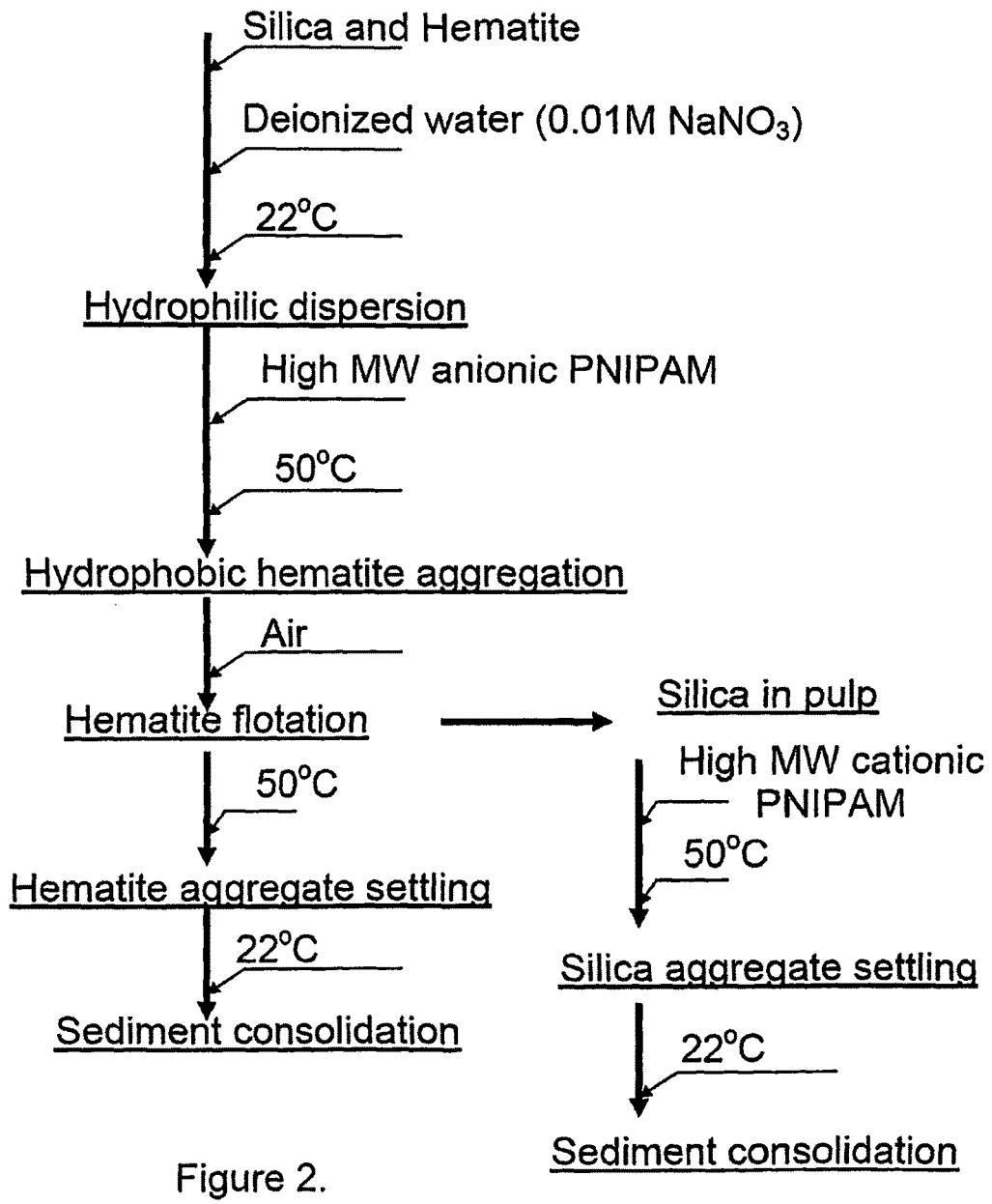
FIG. 2. A schematic process flow sheet for separating two minerals from each other (such as silica and hematite) and from the processing liquid (such as water). In this example, cationic and anionic PolyNIPAM based co-polymers are used as the stimulant responsive molecules that act as multiple function process aids.

One example of a processing scheme is as follows as shown in FIG. 2. Silica and hematite are to be separated. At intermediate pH, (between about 3 and 9) the silica is negatively charged and the hematite is positively charged. Normally they will hetero-coagulate, due to the electrical double layer attraction between them. At room temperature either a conventional low MW polymeric dispersant or responsive polymer can be added to disperse the particles (separate the silica from the hematite). Then a negatively charged temperature sensitive polymer can be added (if not already used as the dispersant). It will selectively adsorb to the hematite. The temperature can be increased and the hematite removed by flotation. Then the hematite can be rapidly separated from the water by gravity sedimentation at high temperature. After sedimentation, the hematite can be further consolidated by reducing the temperature, recovering more water. The silica remaining in the aqueous pulp phase may be flocculated at high temperature with a cationic stimulant responsive polymer resulting in rapid sedimentation allowing for separation of silica from water by gravity means. Then the silica sediment can be cooled to room temperature to allow for additional consolidation and additional water release. Alternatively, if the cationic polyNIPAM is added first, the silica could be removed from the hematite by flotation.

EXAMPLES

The present invention will now be explained in more detail with reference to the following examples which are not intended to limit the present invention. Examples of the stimuli-sensitive polymers to be used in the method according to the present invention include poly(N-isopropylacrylamide) based polymers but the invention is not limited to these polymers only.

Example 1

Polymer Synthesis

Homopolymer synthesis: Poly (N-isopropylacrylamide) (PNIPAM) was synthesized in our laboratory from N-isopropylacrylamide (NIPAM) (Waco Chemicals) using free radical polymerisation with Ammonium Persulfate (>98%, Aldrich, APS) as the initiator. NIPAM monomer was purified by dissolution in hexane and removing the inhibitor with an inhibitor-removal column (Aldrich), followed by repeated re-crystallizations. All glassware was acid-base washed using laboratory grade solutions and deionised water. In a three inlet round-bottom glass reactor, 10 g of NIPAM was dissolved in the appropriate amount of water (pH 3 +/−0.1) using a magnetic stirrer (200 RPM). The three inlets were used for Argon (High Purity, BOC) input, an addition funnel and a condensing tube. The reactor was half-immersed in a water bath to maintain a temperature of 25° C. A stock solution of APS of appropriate concentration and volume was added to the addition funnel subsequent to which both the addition funnel and the NIPAM monomer solution were degassed with Argon for 30 minutes. The polymerisation reaction was commenced after this time by addition of the initiator solution. Reactions were allowed to run for 72 hours and were halted with the addition of Hydroquinone (Aldrich). The polymers synthesized were characterized via Gel Permeation Chromatography (GPC, Shimadzu) using Tetrahydrofuran as the mobile phase with polystyrene standards. The polymer molecular weight as determined by GPC and reaction conditions used are given in Table 1.

TABLE 1

Polymer molecular weight and reaction conditions for PNIPAM homopolymer synthesis.

| Sample Mw [g mol$^{-1}$] | NIPAM Monomer Concentration [Molar] | APS Initiator Concentration [Molar] |
|---|---|---|
| $3.6 \times 10^6$ | 0.45 | $6 \times 10^{-5}$ |
| $1.32 \times 10^6$ | 0.1 | $5 \times 10^{-5}$ |

15% Anionic-copolymer Synthesis: Poly(N-isopropylacrylamide-co-acrylic acid) (APNIPAM) was synthesised in our laboratory. N-isopropylacrylamide (NIPAM) (Waco Chemicals, MW=113.16 g/mol, white crystalline solid) monomer was purified by recrystallisation from 60:40 Toluene:Hexane. Acrylic acid (Ac) (Aldrich, MW=72.06 g/mol, $\rho$=1.051 g/mL) was purified by distillation at reduced pressure at 30° C. All glassware was acid-base washed using laboratory grade solutions and deionised water. In two-necked 500 mL round bottom flask, 10 g (88.4 mmol) of NIPAM was dissolved in 200 mL of distilled water using a magnetic stirrer (200 RPM) over a period of 2 hours. Subsequently, 1.07 mL (16 mmol) acrylic acid was added. The pH of the solution was increased to ~4.5 by the dropwise addition of a 1M solution to sodium hydroxide (NaOH) with monitoring by litmus paper. A stock solution of Ammonium persulfate (APS) (>98%, Aldrich, MW=228.18 g/mol) was prepared by the addition of 2 mg of APS to 65 mL water to afford a concentration of $9 \times 10^{-4}$ g/mL. 2.7 mL ($1.0 \times 10^{-5}$ mol) of the APS stock was added to the round bottom flask. The flask was suspended in an oil bath at room temperature and fitted with a condenser. The other flask neck was stoppered with a rubber septum, through which a degassing needle was inserted. The reaction mixture was degassed over a course of 2 hours using ultra-high purity argon gas. After this period, the oil bath temperature was raised to 65° C. and the reaction was allowed to proceed over night. After roto-evaporation to reduce the reaction volume, the polymer was precipitated into diethyl ether. The precipitate was re-dissolved in water and the volume reduction/evaporation procedure was repeated and then dried in a vacuum oven. For characterisation purposes, a sample of the product was dissolved in methanol and methylated by the addition of dicyclohexylcarbodiimide. The methylated product was characterised via gel permeation chromatography with multi-angle light scattering (GPC-MALS, Shimadzu) using Tetrahydrofuran as the mobile phase. The incorporation of acrylic acid into the copolymer was checked by titration with Sodium Hydroxide. The polymer molecular weight as determined by GPC and reaction conditions used are given in Table 2.

TABLE 2

Polymer molecular weight and reaction conditions for 15% APNIPAM synthesis.

| Sample | Moles of Reagent | | |
|---|---|---|---|
| Mw (g/mol) | NIPAM | Ac | APS |
| $1.84 \times 10^6$ | 0.08834 | 0.0156 | $1.0 \times 10^{-5}$ |

15% Cationic-copolymer inverse emulsion synthesis: Poly (N-isopropylacrylamide-co-dimethylamino ethyl acrylate quaternary chloride) (CPNIPAM) was synthesised in our laboratory. N-isopropylacrylamide (NIPAM) (Waco Chemicals, MW=113.16 g/mol, white crystalline solid) monomer was purified by recrylstallisation from 60:40 Toluene:Hexane. Dimethylamino ethyl acrylate quaternary chloride (DEA) (CIBA Specialty Chemicals, 20% wt/wt monomer aqueous solution, MW=193.67 g/mol) was precipitated into cold acetone several times to afford a white crystalline solid. To a 2 L three-necked round bottom flask, suspended over a magnetic stirrer, 56.58 g (0.5 mol) NIPAM and 17.08 g (0.088 mol) DEA was dissolved in 300 mL water. $3.3 \times 10^{-5}$ mol sodium metabisulfite (SMB) (Aldrich) was added as 2.00 mL of a 3 mg/mL stock preparation. 5 mL of Triton X-100 (BASF) was added dropwise whilst the reaction mixture was stirred rapidly (500 RPM). 700 mL n-Hexane was subsequently added. After fitting a condenser to one neck, the other flask neck was stoppered with a rubber septum. A 50 mL capacity addition funnel was fitted to the third flask neck and sealed. The reaction mixture was degassed for 2 hours by sparging with ultra-high purity argon gas (BOC Australia) introduced by a needle through the rubber septum. A stock initiator solution was prepared by adding 0.122 g Cumene Hydroperoxide (CHP) (Aldrich, 88% wt/wt hexane solution, MW=152.2 g/mol) to 25 mL n-Hexane affording a $2.8 \times 10^{-5}$ mol/mL concentration. After withdrawing the gas-needle to above the level of the liquid in the flask, 1.17 mL (3.3 mol) of CHP stock was introduced drop wise to the reaction mixture over a period of 1 hour. The addition funnel was then rinsed with a further 10 mL n-hexane, which was also added drop wise to the reaction mixture. The reaction was allowed to proceed over-night. After roto-evaporation to reduce the reaction volume, the polymer was precipitated into diethyl ether. The precipitate was re-dissolved in water and the volume reduction/evaporation procedure was repeated and then dried in a vacuum oven from which a yield of 52.71 g (71.5%) was obtained. The incorporation of DEA was checked by titration of an aqueous solution of the product with silver chloride. Gel permeation chromatography with multi-angle light scattering (GPC-MALS, Shimadzu) using dimethyl formamide as the mobile phase was used to characterise the molecular weight of the polymer. The polymer molecular weight as determined by GPC and reaction conditions used are given in Table 3.

TABLE 3

Polymer molecular weight and reaction conditions for 15% CPNIPAM synthesis.

| Sample Mw (g/mol) | Moles of Reagent | | | | |
|---|---|---|---|---|---|
| | NIPAM | DEA | SMB | CHP | APS |
| $1.2 \times 10^6$ | 0.5 | 0.088 | $3.3 \times 10^{-5}$ | $3.3 \times 10^{-5}$ | $1.0 \times 10^{-5}$ |

Example 2

Polymer Behavior in Solution During a Temperature Cycle

Figure 3:
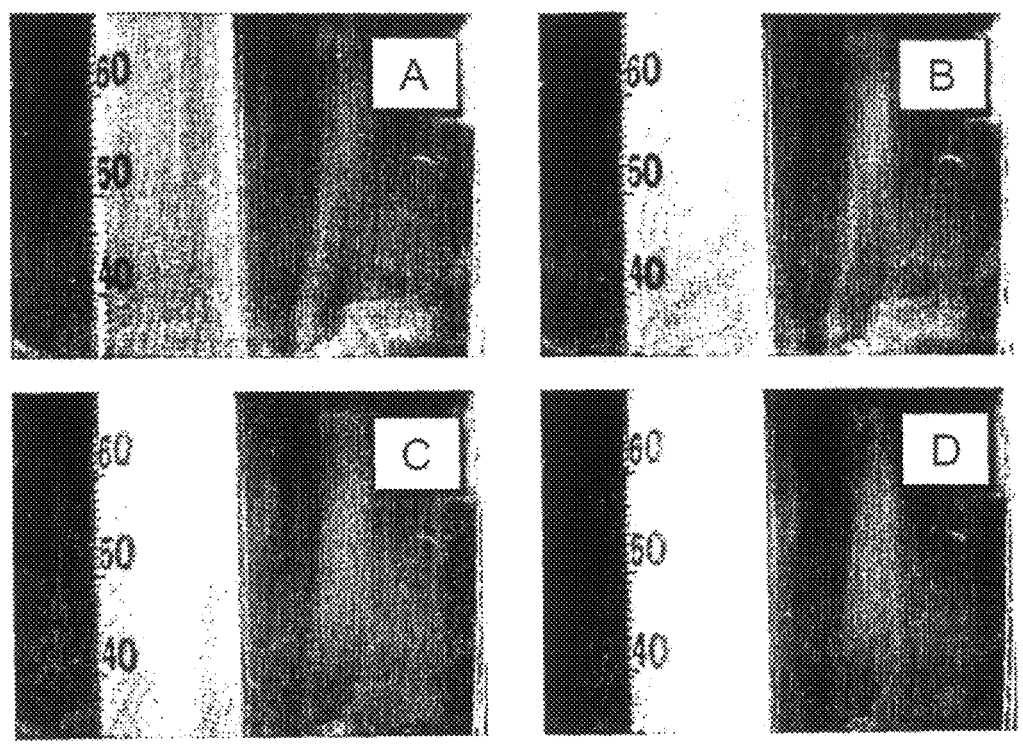
FIG. 3. Photos showing the effect of temperature on PNIPAM hydrophilic/hydrophobic transition. 0.01 wt % PNIPAM, 3.6M Da MW, without any particles. A. Below 32° C.; B and C: Around the CST at 32° C., D: Above 32° C. (32° C. is the polymer critical solution temperature).

FIG. 3 shows photographs of a solution of 3.6 M Da MW, 0.01 wt % solution of poly(N-isopropylacrylamide) (poly(NIPAM) at various temperatures as indicated in the figure. Poly NIPAM is soluble at room temperature due to the hydrating ability of water molecules. When the temperature is increased to above a certain temperature called critical solution temperature (CST), some physical changes in the hydrogen bonding of water to the polymer and the conformation of the PNIPAM chains take place. As one can see from the photos shown in FIG. 3 the polymer becomes less soluble as the temperature is increased above the critical temperature. Starting from low temperature (T<CST), the PNIPAM aqueous solution appears transparent, meaning the polymer is hydrophilic and well dissolved (FIG. 3-A). When the temperature was increased to around the CST at 32° C., the PNIPAM molecules began to phase separate from the solution. The two phase mixture appears as a white fog as observed in FIGS. 3-B and 3-C, indicating the polymer's transition to hydrophobic. Finally when the temperature was maintained higher than the CST, the whole solution became totally opaque (FIG. 3-D). The transition is reversible such that when the temperature is reduced below 32° C. the solution becomes transparent again. This example shows that temperature may be used to stimulate a change in polymer behavior reversibly, and that the nature of the polymer can be changed from hydrophilic to hydrophobic.

Example 3

Polymer Hydrophobicity in Aqueous Solution

Figure 4:
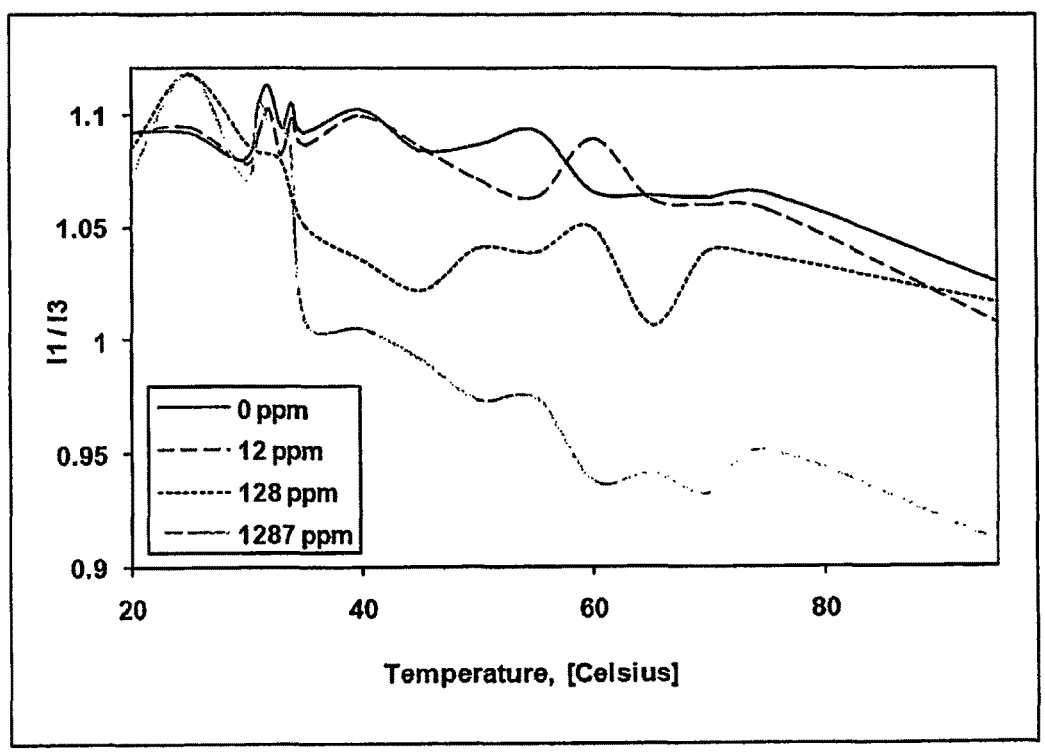
FIG. 4. I1/I3 Fluorescence intensity ratio of 3.6 M Da PNIPAM solutions with pyrene as a function of increasing temperature for different aqueous solution concentrations.

A stock solution of Pyrene (Aldrich) in ethanol was used to dose aqueous solutions of the 3.6 M Da PNIPAM synthesized as described in Example 1 to a Pyrene concentration of 5 µM. After evaporating the ethanol by bubbling Argon through the samples for 30 minutes, the fluorescence intensities of samples in 10 mm clean quartz fluorescence cuvettes was read using a Cary-Eclipse Fluorimeter with excitation at 330 nm wavelength and scanning from 335 nm to 700 nm. As established by Glushko and coworkers (Glushko et al., 1981) the intensity ratio of the first and third peaks (I1/I3) which occur at 373 nm and 384 nm respectively, decreases with increasing hydrophobic interaction. Hence, the relative degree of hydrophobic interaction occurring within solution can be determined. PNIPAM solution concentrations of 0, 12, 128, 1287 ppm were investigated. FIG. 4 shows the result of the ratio of I1 to I3 at each polymer concentration as a function of temperature. A decrease in I1/I3 indicates that the pyrene is in a more hydrophobic environment. FIG. 4 indicates that the increase in polymer concentration results in an increase in hydrophobic interaction of the polymer. The increase in hydrophobic association upon increasing concentration may be attributed to the corresponding increased interaction between temperature sensitive groups in different molecules. Similarly, it may be argued that as the molecular weight of PNIPAM increases, the number of temperature sensitive groups within a region determined by the polymer's hydrodynamic radius correspondingly increases. This effectively increases the local concentration of temperature sensitive groups. Therefore the increase in the effective concentration within the region determined by the polymer's hydrodynamic radius is expected to produce behaviour similar to an increase in bulk concentration and thereby produce an increase in hydrophobic association with increasing molecular weight.

Example 4

Polymer Adsorption onto Particles at Different Temperatures

The temperature-sensitive polymers, poly(N-isopropylacrylamide) (PNIPAM), with five molecular weights were investigated. They are all non-ionic in surface charge density. PNIPAM with a low molecular weight (25 k Da according to the manufacturer) was purchased from Sigma-Aldrich, Australia. Two PNIPAMs with medium molecular weights, ($0.4 \times 10^6$ and $1 \times 10^6$ Da according to the manufacturer), were purchased from Polymer Source Inc., Canada. Two other PNIPAMs were synthesized in our lab as described in detail in Example 1. The polymers were characterized in our laboratory via Gel Permeation Chromatography (GPC, Shimadzu) using Tetrahydrofuran as the mobile phase with polystyrene standards. The polymer molecular weights as determined by GPC are given in Table 4.

TABLE 4

Polymer Sample Weight Averaged Molecular Weights (Mw).

| Source of Polymer Sample | Mw [g mol$^{-1}$] as reported by Manufacturer | Sample Mw [g mol$^{-1}$] as initially measured in our laboratory |
|---|---|---|
| In-House | — | $3.6 \times 10^6$ |
| In-House | — | $1.32 \times 10^6$ |
| Commercial | $9.32 \times 10^5$ | $2.01 \times 10^6$ |
| Commercial | $4.32 \times 10^5$ | $7.12 \times 10^5$ |
| Commercial | $2.5 \times 10^4$ | $2.31 \times 10^5$ |

The adsorption of the polymers on a high purity α-Alumina powder (Sumitomo, AIBP-15) having a BET surface area of 7 m$^2$ g$^{-1}$, density of 3.97 g cm$^{-3}$ with an isoelectric point (iep) at pH ~9.2 was investigated. A stock suspension of 10 wt % alumina was prepared in deionised water at pH 5 and sonicated for 10 minutes at 30 Watts. The alumina has a positive and negative charge below and above the iep respectively. Sodium Chloride (0.01 M) was used as the background electrolyte (>99.9%, Aldrich).

The depletion technique was utilized to determine the experimental adsorption isotherms. This procedure involves a number of steps. A series of 5 wt % alumina suspensions using DI water (pH 5 +/−0.1) for dilution were prepared in 15 mL soda-glass vials with NaCl from a stock solution to give a background electrolyte concentration of 0.01 M. These were dosed with the appropriate quantity of previously prepared 0.5 wt % PNIPAM solution (pH 5+/−0.1). The vials were then sealed.

Studies were conducted under 3 different conditions: (i) 65° C., (ii) 25° C. and (iii) 65° C. initially with subsequent cooling to 25° C. The time for equilibration for the 65° C. & 25° C. conditioned samples was 2 days. The 65° C. to 25° C. conditioned samples were allowed to equilibrate for 24 hours at 65° C. followed by a further 24 hours at 25° C.

After this period, the clear supernatant of the 65° C. conditioned samples was carefully removed. The 25° C. and 65-25° C. conditioned samples typically had no clear supernatant and were therefore centrifuged in order to produce the supernatant for analysis. Sampled supernatant was in each case stored in clean soda-glass vials.

The concentration of polymer in the supernatant was determined using a Total Organic Carbon Analyser (TOC-VCSH, Shimadzu). A calibration curve relating total organic carbon content to known solution concentrations of each of the different polymer samples was previously prepared. The difference between the dosed concentrations and residual polymer concentration in the supernatant corresponds to the adsorption densities onto the alumina particles.

Figure 5:
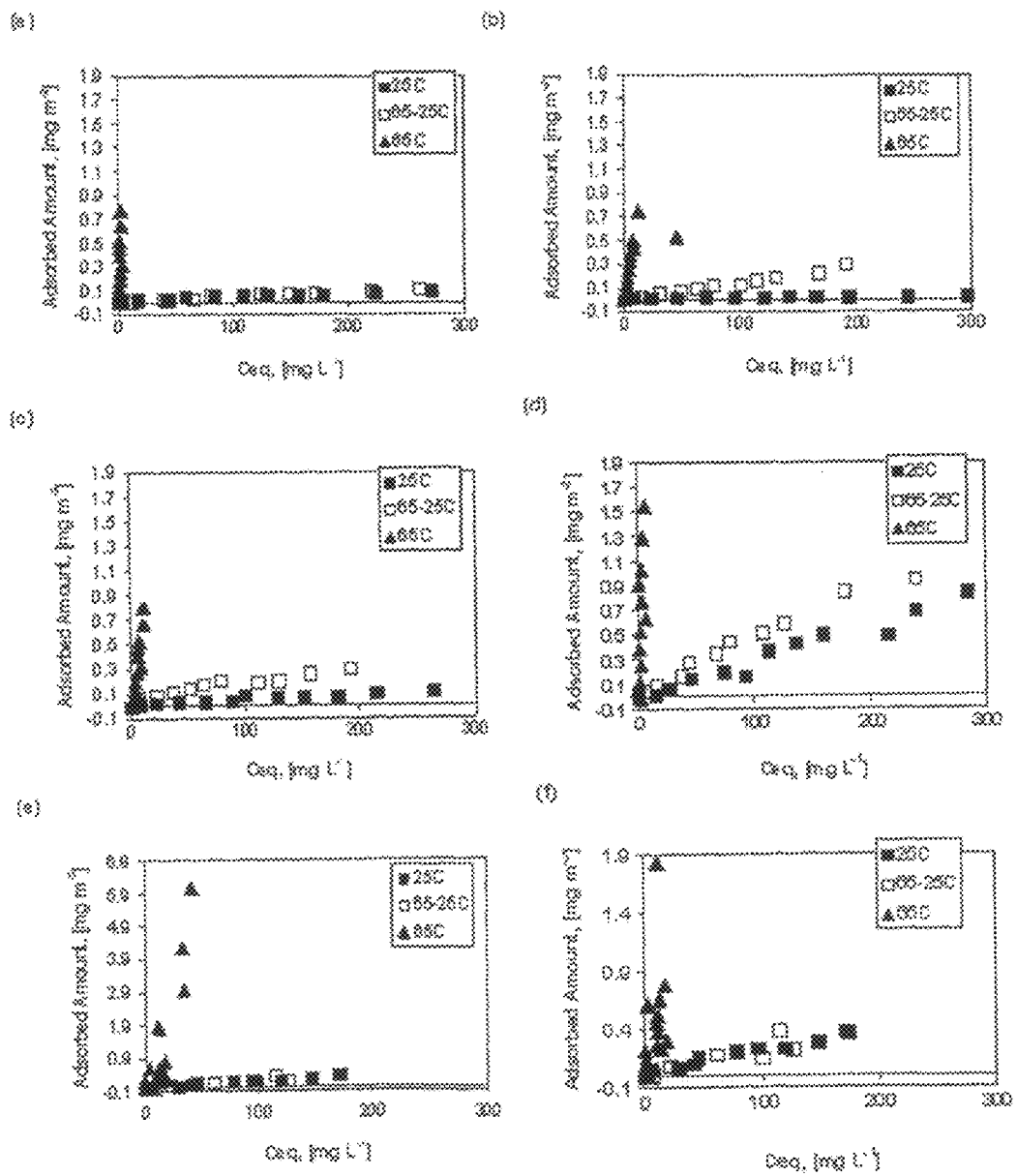
FIG. 5. Adsorption Isotherms of PNIPAM onto α-Alumina particles in $10^{-2}$ M NaCl at pH 5. PNIPAM molecular weights: (a) $2.3 \times 10^5$ Da, (b) $7.1 \times 10^5$ Da, (c) $1.32 \times 10^6$ Da (d) $2.0 \times 10^6$ Da, (e) $3.6 \times 10^6$ Da, (f) close up of (e).

The adsorption isotherms determined in such a manner are shown in FIG. 5 which indicates that for the molecular weight range investigated, PNIPAM adsorbs significantly more at 65° C., which is above the LCST, than at room temperature. Furthermore, samples that were equilibrated first at 65° C. and subsequently at 25° C. had reduced adsorption profiles compared to the 65° C. samples but still higher than the 25° C. conditioned samples. The marked decrease in adsorption on decreasing the temperature of equilibration (FIG. 5) indicates that the adsorption process is at least partially reversible. This suggests that the polymer could be reclaimed from solution after use as described in this patent disclosure for possible re-use thereby providing additional benefit.

The adsorption was shown to increase with temperature for all molecular weight samples. Above the LCST of PNIPAM, adsorption increased with molecular weight. For samples equilibrated firstly above the LCST and subsequently below it, adsorption behaviour approaching the profiles of the samples equilibrated solely below the LCST was observed for all molecular weights. This desorption suggests that after solid/liquid separation using PNIPAM, the polymer may be reclaimed from solution. Below the LCST, the adsorption was much reduced (compared to above the LCST) and there was no observable relationship between molecular weight variation and adsorption. These observations are supported by the results of polymer hydrophobicity presented in FIG. 4 in Example 3.

Example 5

Selective Adsorption to Surfaces

The adsorption of the 15% anionic co-polymer described in Example 1 (Poly(N-isopropylacrylamide-co-acrylic acid) (APNIPAM)) onto silica and hematite was investigated by the depletion technique described in Example 4 above. The silica was purchased from Sigma and was about 3 microns average diameter, has a BET surface area of 6.8 m$^2$ g$^{-1}$, density of 2.62 g cm$^{-3}$ with an isoelectric point (iep) at pH ~2 to 3. The hematite was purchased from Aldrich and was about 5 microns average diameter, has a BET surface area of 1.9 m$^2$ g$^{-1}$, density of 5.24 g cm$^{-3}$ with an isoelectric point (iep) at pH ~7 to 9.

The depletion technique was utilized to determine the experimental adsorption isotherms. This procedure involves a number of steps. A series of 5 wt % solids suspensions using reverse osmosis water (pH 5+/−0.1) were prepared in 15 mL soda-glass vials with NaCl to give a background electrolyte concentration of 0.01 M. These were dosed with the appropriate quantity of previously prepared 0.25 wt % APNIPAM solution (pH 5+/−0.1). The vials were then sealed, then either stored at 25° C. for 24 hours or heated to 50° C. and stored for 24 hours. After 24 hours, the suspensions were centrifuged in order to produce the supernatant for analysis. Sampled supernatant was in each case stored in clean soda-glass vials.

The concentration of polymer in the supernatant was determined using a Total Organic Carbon Analyser (TOC-VCSH, Shimadzu). A calibration curve relating total organic carbon content to known solution concentrations of the polymer was previously prepared. The difference between the dosed concentrations and residual polymer concentration in the supernatant corresponds to the adsorption densities onto the silica and hematite particles.

Figure 6:
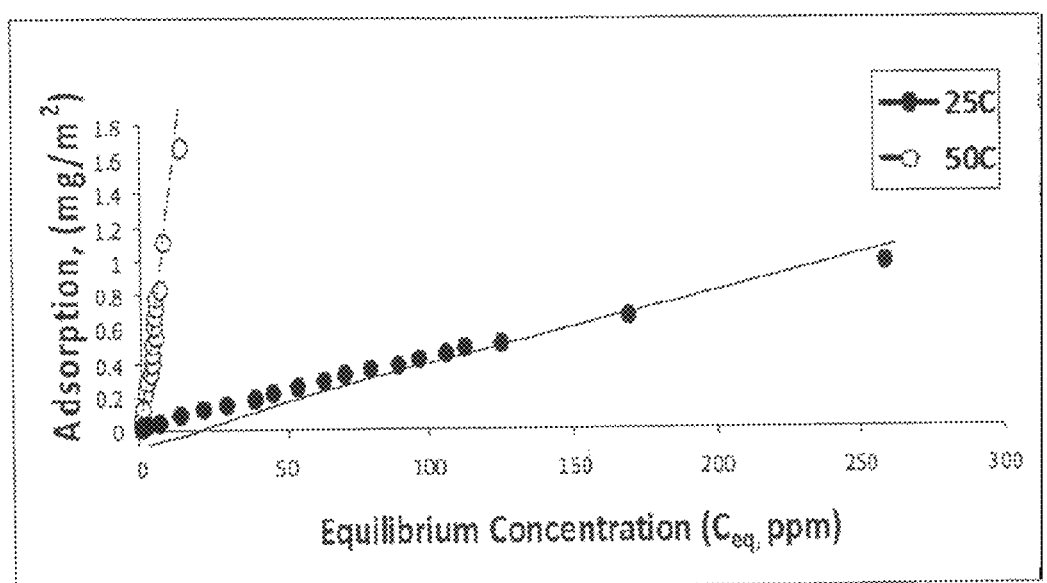
FIG. 6. Adsorption isotherms of 15% anionic co-polymer (APNIPAM) onto silica surface at 25 and 50° C. at pH=5.0.
Figure 7:
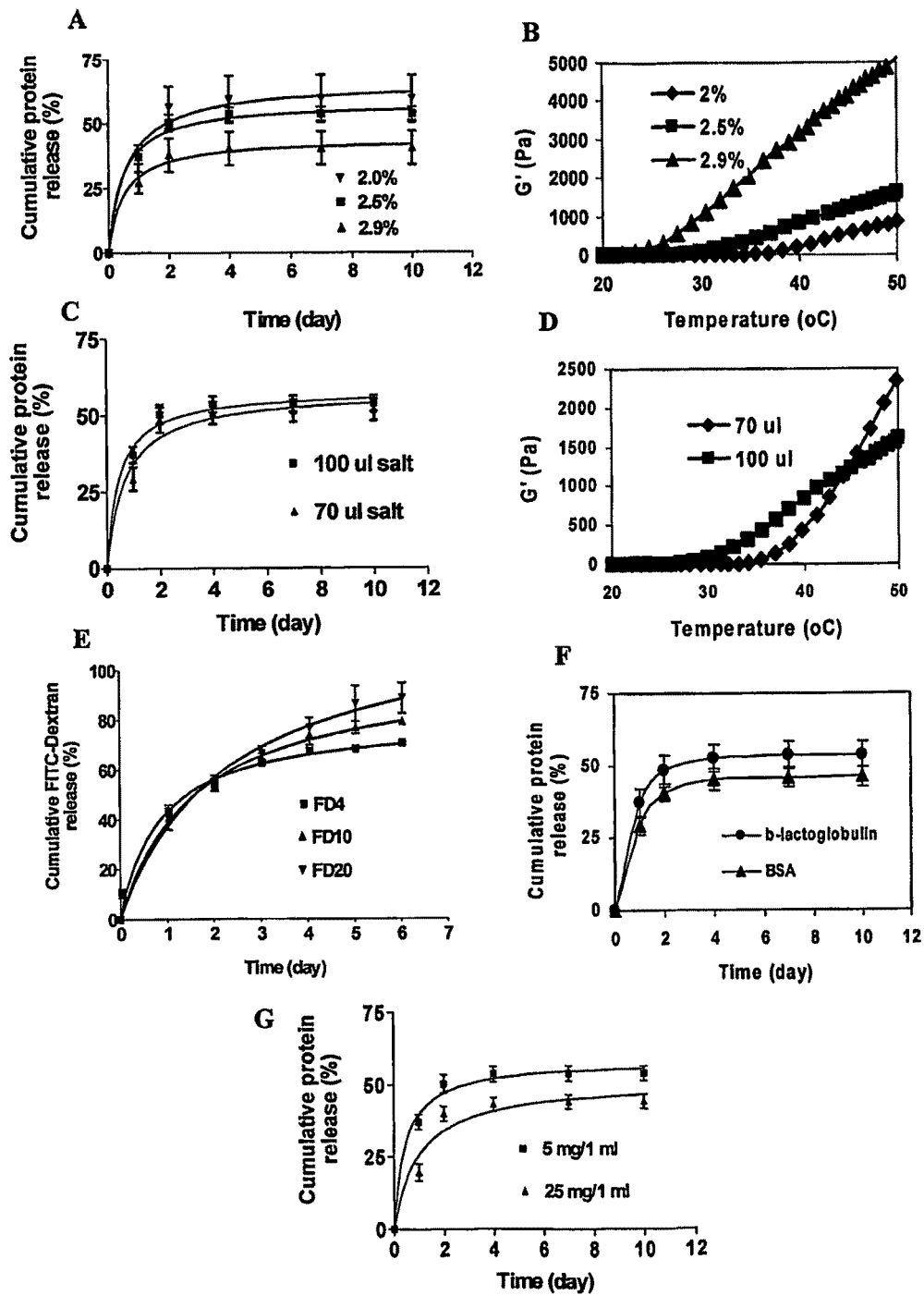
FIG. 7. Adsorption isotherms of 15% anionic co-polymer (APNIPAM) onto hematite surface at 25 and 50° C. at pH=5.0.

The adsorption isotherms determined in such a manner for silica are shown in FIG. 6 and for hematite in FIG. 7. The figures show that at both room temperature and elevated temperature the anionic co-polymer of Poly NIPAM adsorb much more strongly on to the positively charged hematite surface then the negatively charged silica surface. It has also been found that the cationic co-polymer described in Example 1 adsorbs more strongly on to negatively charged surfaces than onto positively charged surfaces. Thus by choosing the charge of the polymer to use in any particular application, one can either enhance or minimize adsorption onto a specific type of particle or surface.

Example 6

Suspension Stability and Sedimentation Rate as a Function of Polymer MW and Temperature Settling tests were carried out in 100-ml cylinders at a number of combinations of polymer molecular weight and dosage. A sample of silica powder (Silica 400G, >98% pure) was donated by Unimin Australia Limited. It has a density of 2.62 g/cm$^3$. The particle size distribution is about 80% minus 20 micron, 53% minus 10 micron, and 30% minus 5 micron. The temperature-sensitive polymers, poly(N-isopropylacrylamide) (PNIPAM), with four molecular weights were investigated. They are all non-ionic in surface charge density. PNIPAM with a low molecular weight of 2.3×10$^5$ Da was purchased from Sigma-Aldrich, Australia. Two PNIPAMs with medium molecular weights, 7.1×10$^5$ and 2×10$^6$ Da, were purchased from Polymer Source Inc., Canada. The PNIPAM with the highest molecular weight of 3.6×10$^6$ Da was synthesized in our lab as described in detail in Example 1. All polymers were dissolved in deionized water at room temperature at pH=6.0 as a 0.1 wt % solution. For each settling test, the solid suspension was prepared with 5 g silica and deionized water containing 0.01M NaNO$_3$. The appropriate amount of polymer solution (0.1 wt %) was added to make a final suspension concentration of 5 wt % solids. The pH value of the suspension was 6.0±0.2. Polymer dosages were chosen at 0, 4, 10 and 20 ppm to the total suspension volume. After filled with suspension, the cylinder was sealed by a sealing film and gently shaken upside down for several times to mix the suspension. As soon as the cylinder was placed on a flat solid surface, the settling test at room temperature began and no further disturbances were allowed. The descent of the solids-liquid interface (mud line) was carefully observed, recorded as a function of settling time. The slope of the settling curve at time zero was obtained as the initial settling rate. To investigate the performance of PNIPAM at temperatures below and above the critical transition temperature (CST at 32° C.), each settling test was conducted at two temperatures, room temperature (near 22° C.) and 50° C. The settling test was first conducted at room temperature for 24 hr. Then the cylinder was shaken again to disperse the particles and immersed into a water bath with controlled temperature at 50° C. for 5 min to warm up. After the cylinder was gently shaken upside down several times and was put back into the water bath and the settling test at 50° C. started immediately.

Figure 8:
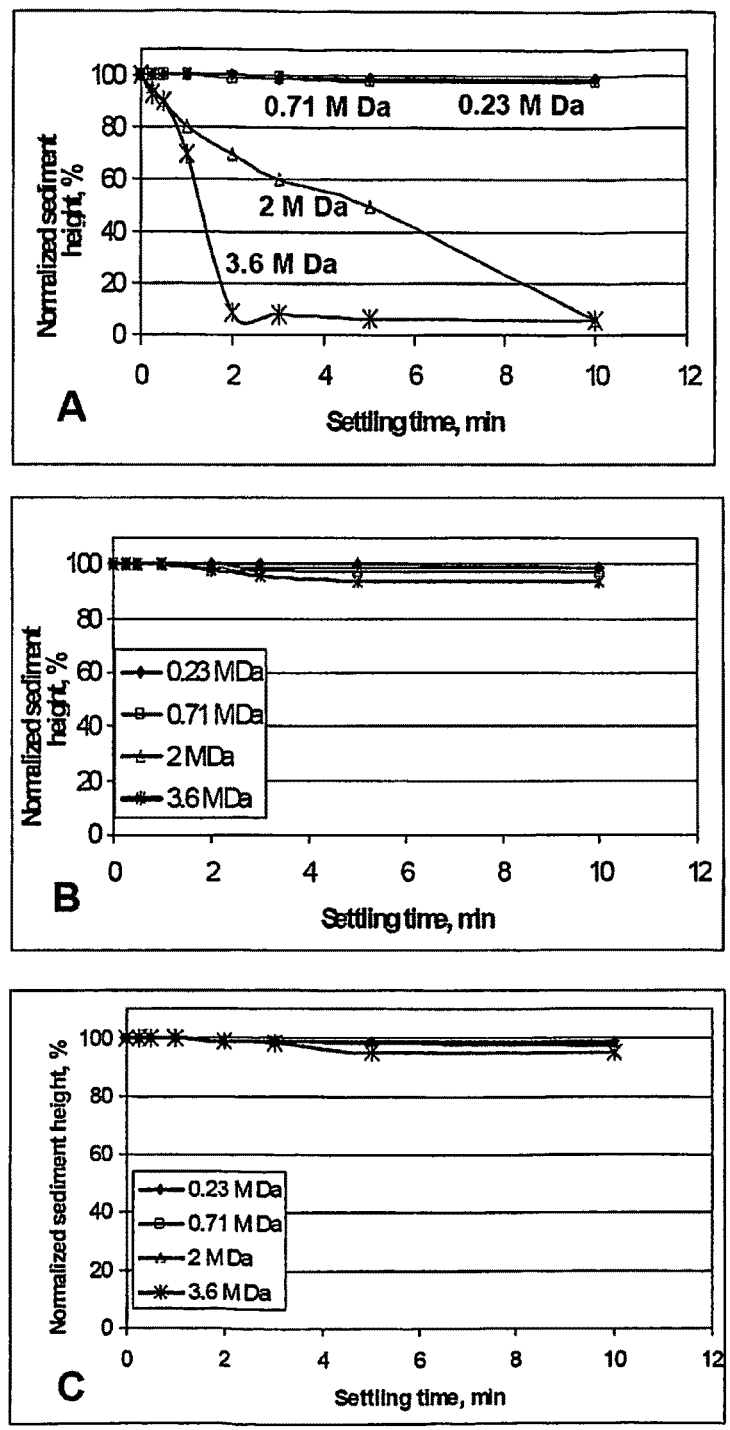
FIG. 8. The effect of PNIPAM molecular weight and dosage on silica settling at 22° C. (0.01M $NaNO_3$). Dosage: A: 4 ppm; B: 10 ppm; C: 20 μm FIG. 9. The effect of PNIPAM molecular weight and dosage on silica settling at 50° C. (0.01M NaNO$_3$). Dosage: A: 4 ppm; B: 10 ppm; C: 20 ppm.

FIG. 8 shows the height of the mud line as a function of time for settling results at 22° C. The initial settling rate results are presented in Table 5. Without any polymer the particles remained stable for extended periods and could not easily be separated from the water by gravity sedimentation. It can be seen that the two PNIPAMs with low MW of 2.3×10$^5$ and 7.1×10$^5$ Da acted as a dispersant for the silica particles at room temperature at all concentrations investigated. However, silica flocculation was observed by the two PNIPAMs with high MW (2 and 3.6M Da) for 4 ppm dose. The PNIPAM with 3.6M Da MW induced much faster silica settling than the one with 2M Da MW at 4 ppm. It seems easier for the high MW PNIPAM to induce good silica aggregation because commonly the aggregate settling depends on its size and density. This performance of high MW PNIPAMs at room temperature agrees well with that of conventional polyacrylamide flocculants, i.e., large molecular weight polymer (>1 million Da) would induce solid flocculation at low dosage addition (Baklouti et al., 2003; Yoon and Deng, 2004). At room temperature and 4 ppm the high MW PNIPAM acts as a conventional bridging flocculant.

TABLE 5

Results of settling rates

|  | 22° C. | 50° C. |
| --- | --- | --- |
| No polymer | <0.01 m/hr | <0.01 m/hr |
| 2.3 × 10$^5$ PNIPAM, 4 ppm | 0.04 m/hr | 0.02 m/hr |
| 2.3 × 10$^5$ PNIPAM, 10 ppm | 0.04 m/hr | 0.06 m/hr |
| 2.3 × 10$^5$ PNIPAM, 20 ppm | 0.04 m/hr | 2.10 m/hr |
| 7.1 × 10$^5$ PNIPAM, 4 ppm | 0.06 m/hr | 0.06 m/hr |
| 7.1 × 10$^5$ PNIPAM, 10 ppm | 0.06 m/hr | 1.10 m/hr |
| 7.1 × 10$^5$ PNIPAM, 20 ppm | 0.06 m/hr | 5.10 m/hr |
| 2 M PNIPAM, 4 ppm | 2.20 m/hr | 1.60 m/hr |
| 2 M PNIPAM, 10 ppm | 0.06 m/hr | 2.10 m/hr |
| 2 M PNIPAM, 20 ppm | 0.06 m/hr | 19.90 m/hr |
| 3.6 M PNIPAM, 4 ppm | 3.40 m/hr | 8.90 m/hr |
| 3.6 M PNIPAM, 10 ppm | 0.11 m/hr | 19.90 m/hr |
| 3.6 M PNIPAM, 20 ppm | 0.06 m/hr | 20.10 m/hr |

At room temperature, at the higher doses of 10 and 20 ppm PNIPAM additions, all of the four PNIPAMs acted as dispersants. The higher dose is likely sufficient to create steric repulsion between the particles. This is again similar to the conventional PAM flocculants which can re-disperse suspensions if over dosed. Therefore, the tested PNIPAMs can be divided into two groups based on their molecular weight around 1M Da. The first group is that the PNIPAM dispersing ability is independent on PNIPAM dosage when the PNIPAM MW is smaller than 2M Da, whereas the second group is that it is strongly dependent on its dosage when its MW is higher than 2M Da. If the PNIPAM is used only for dispersing purpose at 22° C., the best range of its molecular weight should be smaller than 2M Da. However, to be used for both settling and consolidation, it is necessary to further study its aggregating ability at 50° C. before any further conclusions can be made.

Figure 9:
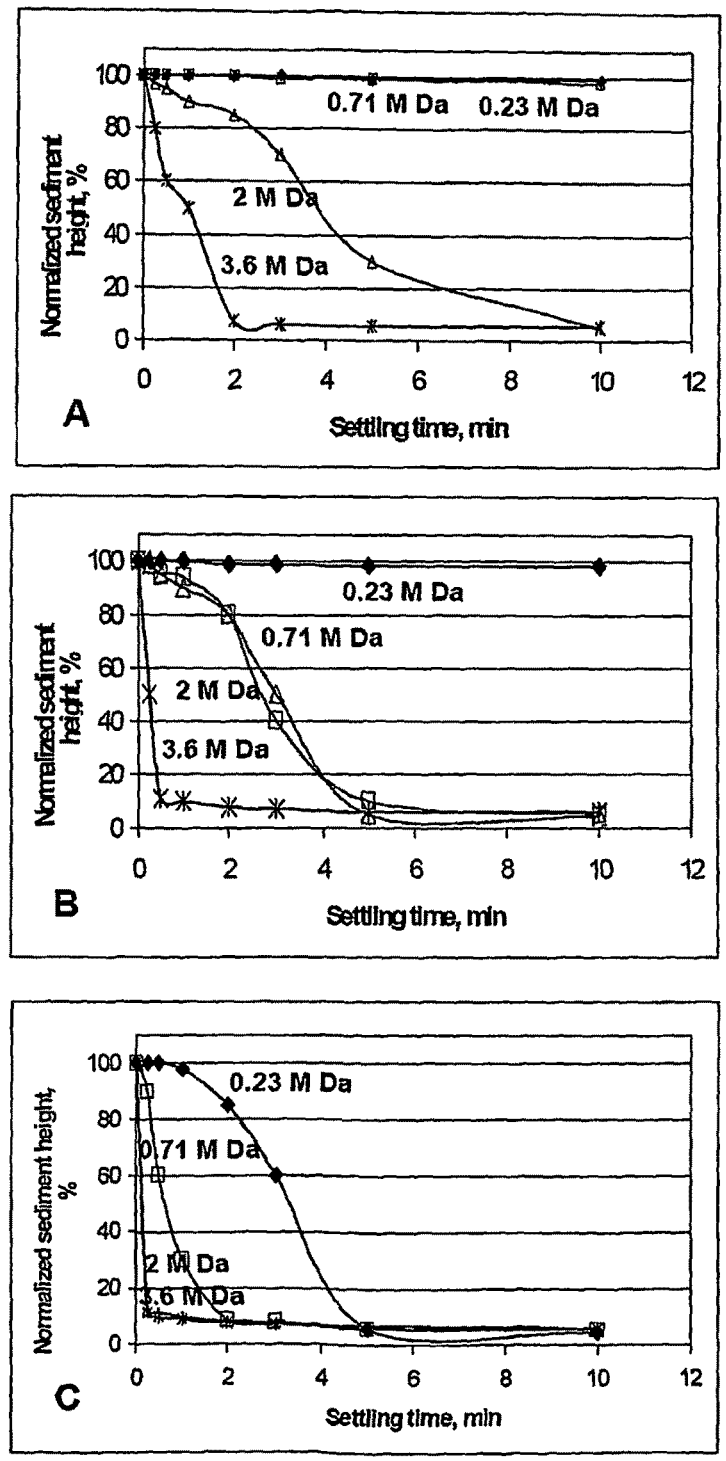

FIG. 9 shows the height of the mud line as a function of time for settling results at 50° C. Table 5 also shows the effect of PNIPAM molecular weight on silica settling at 50° C. The same three PNIPAM dosages were adopted as they were used in the settling tests at 22° C. At 4 ppm, only the high MW PNIPAMs (2 and 3.6M Da) induced observable silica settling (aggregation). Much better settling was obtained with 3.6M Da PNIPAM than with 2M Da, indicating that larger aggregates were formed by higher MW PNIPAM. No obvious aggregation was observed from the settling tests done with the low MW PNIPAMs (2.3×10$^5$ and 7.1×10$^5$ Da). To allow these lower MW PNIPAMs to induce aggregation, their dosage needs to be increased. At 10 ppm, the PNIPAM with 7.1×10$^5$ Da MW induced almost the same settling as the 2M Da PNIPAM. The PNIPAM with the smallest MW (2.3×10$^5$ Da) still does not induce any silica settling even at this high dosage. Only when its dosage was increased to 20 ppm, slow silica settling was observed with the smallest MW PNIPAM at 50° C.

Although all of the four PNIPAMs induced solid aggregation after 20 ppm addition, their performances are quite different. It was found from the above results that the PNIPAM aggregating ability is strongly dependent on its molecular weight. The performances starting from the best to the poorest can be ranked: 3.6M, 2M, 0.71M and 0.23M Da. The PNIPAMs having high MWs (3.6M and 2M Da) induced very quick solid settling and approached a minimum sediment volume in less than 1 min at 20 ppm PNIPAM addition. It took about 2 min for the 0.71M Da PNIPAM and 5 min for the 0.23M Da PNIPAM. These results clearly demonstrate that the ability for a PNIPAM to perform efficient solids aggregation at 50° C. is determined by its molecular weight and dosage. The higher the molecular weight, the lower the dosage needed for solids aggregation.

Figure 10:
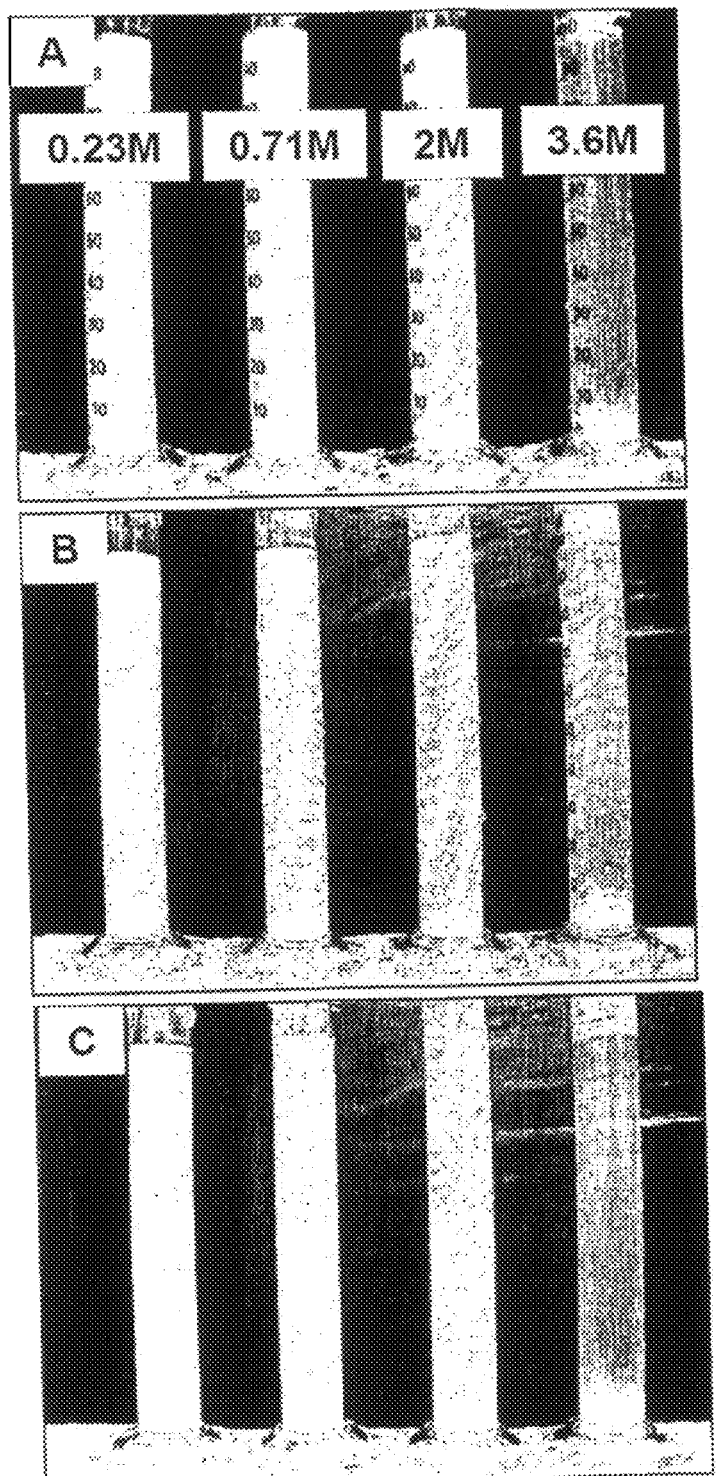
FIG. 10. Photos showing the effect of PNIPAM MW on supernatant clarity at 50° C. and 120 min. A. 4 ppm, B. 10 ppm, C. 20 ppm (0.01M NaNO$_3$).

It was also observed during the settling tests that the PNIPAM MW has an effect on the supernatant clarity as shown in FIG. 10. In FIG. 10A, only the PNIPAM having 3.6M Da MW produced an almost clear supernatant at 4 ppm. The other three PNIPAMs did not produce clear supernatants. They appeared opaque even at 10 ppm PNIPAM addition (FIG. 10B). When the PNIPAM dosage was increased to 20 ppm, the only improvement in supernatant clarity was obtained with the 2M Da PNIPAM. The other two low MW PNIPAMs still did not produce clear supernatants (FIG. 10C). These observations reflect the same MW-dependent performance as the settling tests with different molecular weight PNIPAM. These phenomena can be explained by knowledge that the PNIPAMs with low MW have weak ability to produce inter-particle attractive forces that are strong enough to induce efficient solids aggregation. In order to produce a strong attraction with low MW PNIMAM, a large amount of PNIPAM dosage is likely to be needed, but it would not be practical for industrial application.

Example 7

Selective Adsorption and Sedimentation Using Charged Co-polymers of NIPAM

Adsorption isotherms were measured and settling tests of alumina and silica were carried out to compare the influence of neutral, anionic and cationic PNIPAM based polymers. The silica was purchased from Sigma and was about 3 microns average diameter, has a BET surface area of 6.8 $m^2$ $g^{-1}$, density of 2.62 g $cm^3$ with an isoelectric point (iep) at pH ~2 to 3. The alumina powder was AKP-15 purchased from Sumitomo Chemical Japan. It has an average diameter about 700 nm and has a BET surface area of 7 $m^2$ $g^{-1}$, density of 3.97 g $cm^{-3}$ and an isoelectric point (iep) at pH ~9.2.

The temperature-sensitive polymers, poly(N-isopropylacrylamide) homopolymer with Mw about 1.0 MDa, 15% anionic co-polymer (APNIPAM) about 1.84 MDa and 15% cationic co-polymer (CPNIPAM) 1.2 MDa were synthesized in our lab as described in detail in Example 1. All polymers were dissolved in reverse osmosis treated water at room temperature at pH=5.0 as a 0.1 wt % solution.

The depletion technique as described in Example 4, was utilized to determine the experimental adsorption isotherms of the homopolymer, anionic co-polymer and cationic co-polymer on to silica and alumina. This procedure involves a number of steps. A series of 5 wt % solids suspensions in reverse osmosis water (pH 5+/−0.1) were prepared in 15 mL soda-glass vials with NaCl to give a background electrolyte concentration of 0.01 M. These were dosed with the appropriate quantity of previously prepared 0.25 wt % PNIPAM homopolymer, anionic APNIPAM polymer or cationic CPNIPAM solution (pH 5+/−0.1). The vials were then sealed and heated to 50° C. and stored for 24 hours. After 24 hours, the suspensions were centrifuged in order to produce the supernatant for analysis. Sampled supernatant was in each case stored in clean soda-glass vials. The concentration of polymer in the supernatant was determined using a Total Organic Carbon Analyser (TOC-VCSH, Shimadzu). A calibration curve relating total organic carbon content to known solution concentrations of the polymers was previously prepared. The difference between the dosed concentrations and residual polymer concentration in the supernatant corresponds to the adsorption densities onto the silica and alumina particles.

Figure 11:
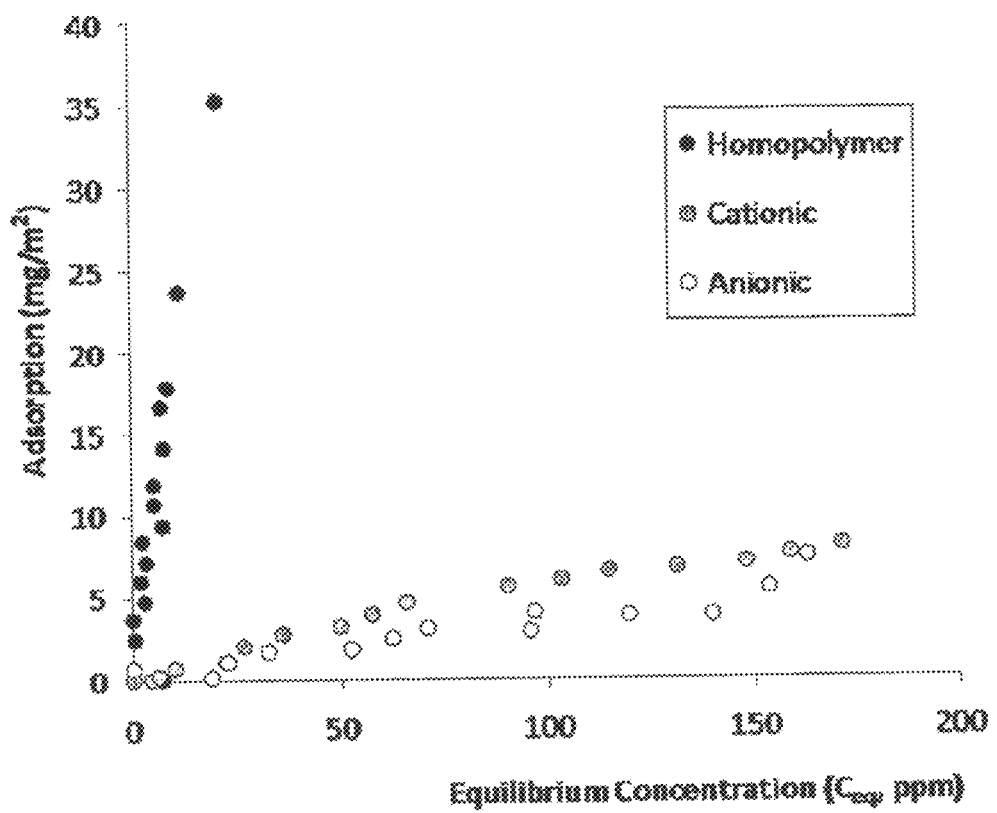
FIG. 11 Adsorption isotherms of 1.0 MDa homopolymer of PNIPAM, 1.84 MDa 15% anionic co-polymer (APNIPAM) and 1.2 MDa 15% cationic co-polymer (CPNIPAM) onto silica surface after addition of polymer at 25° C. at pH 5 in 0.01 M NaCl solution followed by heating to 50° C. and holding for 24 hours.
Figure 12:
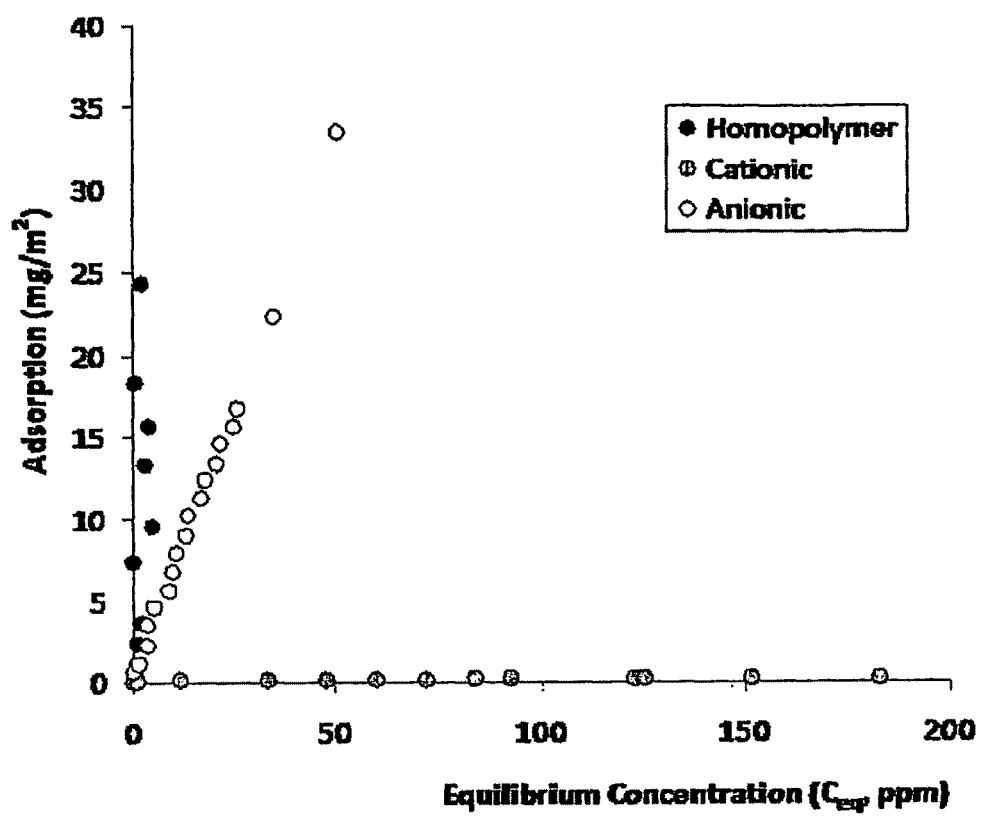
FIG. 12 Adsorption isotherms of 1.0 MDa homopolymer of PNIPAM, 1.84 MDa 15% anionic co-polymer (APNIPAM) and 1.2 MDa 15% cationic co-polymer (CPNIPAM) onto alumina surface after addition of polymer at 25° C. at pH 5 in 0.01 M NaCl solution followed by heating to 50° C. and holding for 24 hours.

The adsorption isotherms determined in such a manner for silica are shown in FIG. 11 and for alumina in FIG. 12. The homopolymer adsorbs to both negatively charged surface (silica) and positively charged surface (alumina). The anionic polymer adsorbs more strongly on the positively charged surface and the cationic polymer adsorbs more strongly on to the negatively charged surface. Polymer adsorption may be minimized or prevented when the polymer and surface have the same sign of charge.

Figure 13:
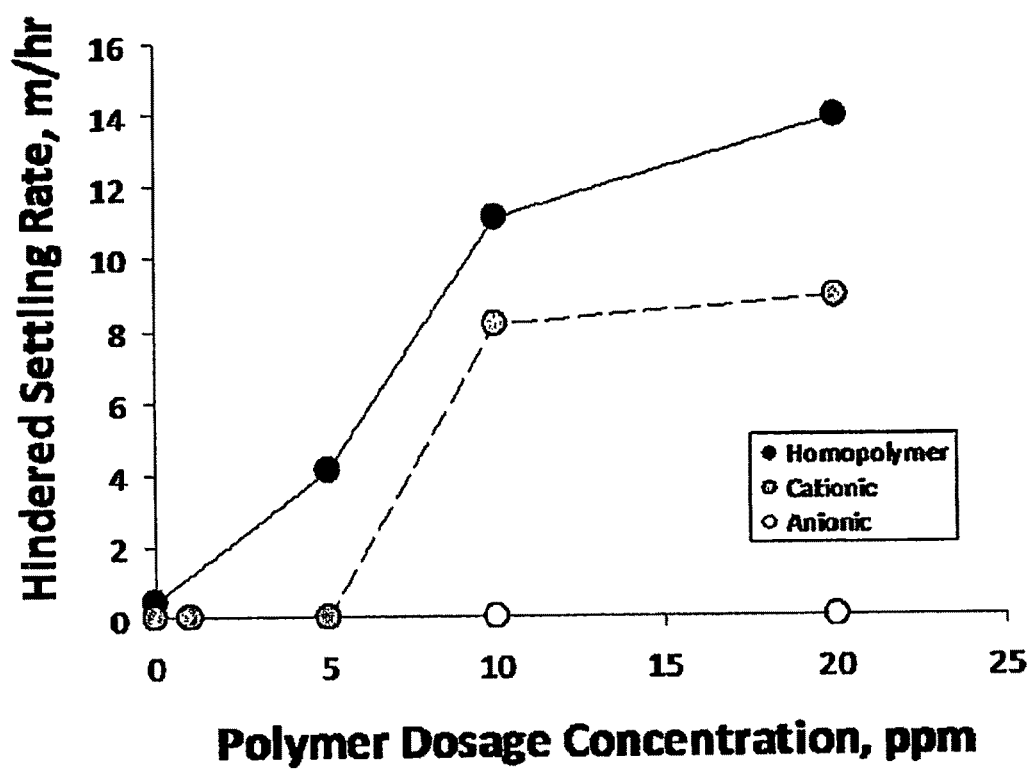
FIG. 13 Initial sedimentation rate of 5 wt % silica suspensions after addition of 1.0 MDa homopolymer of PNIPAM, 1.84 MDa 15% anionic co-polymer (APNIPAM) and 1.2 MDa 15% cationic co-polymer (CPNIPAM) at 25° C. at pH 5 in 0.01 M NaCl solution followed by heating to 50° C.

A 10 wt/wt % stock mineral suspension (silica or alumina) is prepared from 111.11 g powder and 1 L reverse osmosis water which is subsequently pulse-sonicated at 45 watts for 10 minutes to homogenise. This suspension is titrated with 1 M HCl or NaOH solution to pH 5 (+/−0.1). A batch of reverse osmosis water is similarly titrated to pH 5. To 100-mL measuring cylinders, appropriate volumes of stock mineral suspension, pH 5 reverse osmosis water, 0.25 wt/wt % polymer solution and 1 M NaCl, are added to make a final suspension concentration of 5 wt/wt % solids at pH 5.0 (+/−0.1) and 0.01 M NaCl. Polymer dosages were chosen between 0 and 20 ppm to the total suspension volume for the silica and between 0 and 1000 ppm to the total suspension volume for the alumina. The cylinders filled with suspension were sealed with parafilm and gently shaken upside down several times to mix the suspension. The cylinder was then immersed into a temperature controlled bath at 50° C., at which time the settling test was started immediately. The descent of the solids-liquid interface (mud line) was carefully observed and recorded as a function of settling time. The slope of the settling curve at time zero was obtained as the initial settling rate FIG. 13 shows the initial sedimentation rate of the silica suspensions for the 1.0 MDa homopolymer of PNIPAM, the 1.84 MDa 15% anionic co-polymer (APNIPAM) and the 1.2 MDa 15% cationic co-polymer (CPNIPAM) at 50° C. The homopolymer produced the fastest sedimentation rates, the cationic co-polymer produced nearly as fast settling rates while the anionic polymer did not cause any significant aggregation. The settling rates for the silica at 50° C. dosed with the anionic co-polymer were less than 0.01 m/hr.

Figure 14:
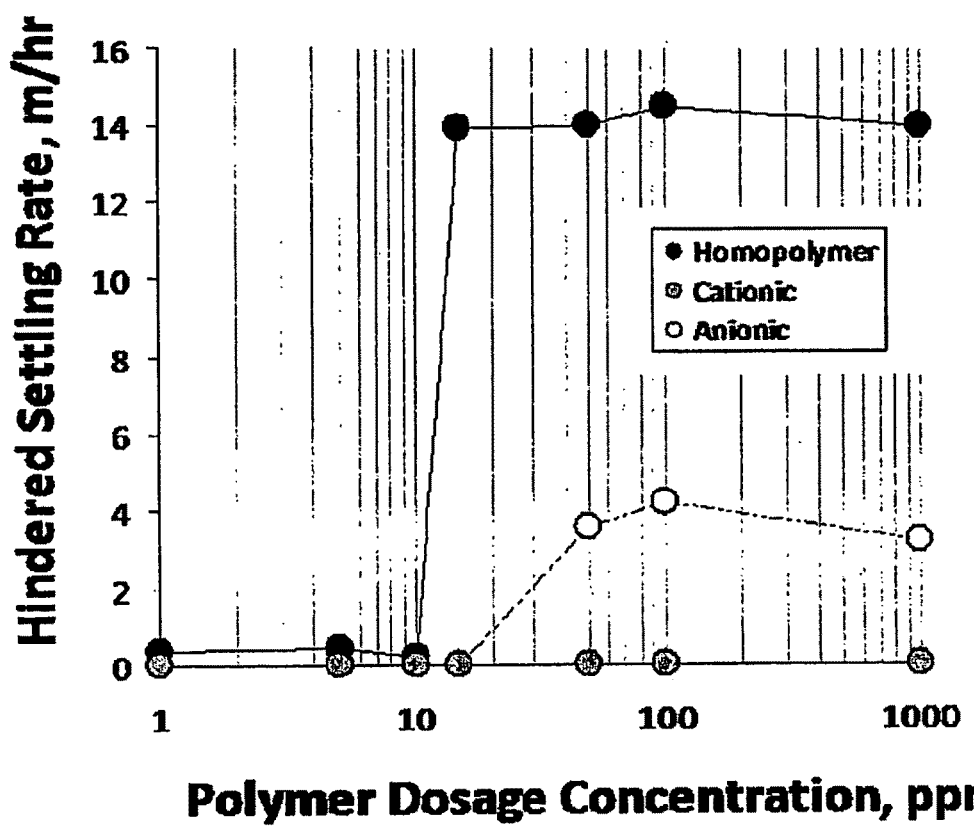
FIG. 14 Initial sedimentation rate of 5 wt % alumina suspensions after addition of 1.0 MDa homopolymer of PNIPAM, 1.84 MDa 15% anionic co-polymer (APNIPAM) and 1.2 MDa 15% cationic co-polymer (CPNIPAM) at 25° C. at pH 5 in 0.01 M NaCl solution followed by heating to 50° C.

FIG. 14 shows the initial sedimentation rate of the alumina suspensions for the 1.0 MDa homopolymer of PNIPAM, the 1.84 MDa 15% anionic co-polymer (APNIPAM) and the 1.2 MDa 15% cationic co-polymer (CPNIPAM) at 50° C. Again the homopolymer produced the fastest sedimentation rates. The anionic polymer produced about half the sedimentation rate as the homopolymer and the cationic polymer produced less than 0.01 m/hr sedimentation in the alumina suspensions. The cationic polymer was not able to cause any significant aggregation in the alumina suspension.

The use of polymer with the same charge sign as the surface charge of the particles can be used when aggregation and sedimentation of that particular type of particle is not desired even at elevated temperature. The polymer will adsorb onto particles with charge which is the opposite sign to the charge on the polymer and cause these particles to aggregate and settle out at temperature above the LCST.

Example 8

Sediment Consolidation Enhancement: Influence of Polymer MW and Dose

Figure 15:
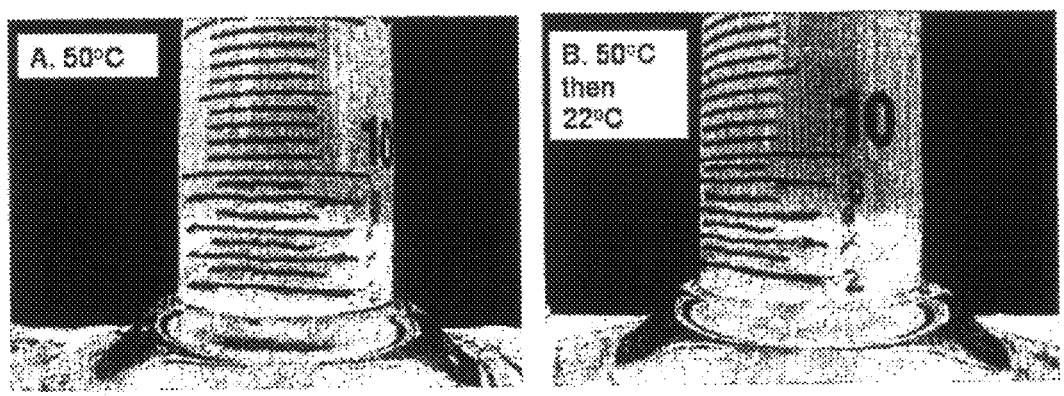
FIG. 15. Photos showing final sediment volume for PNIPAM (3.6 M MW, 20 ppm) A.) flocculated at 50° C. and B.) Temperature cycled between 50° C. and 22° C., flocculation and additional consolidation.

Silica suspensions containing 4, 10 and 20 ppm polyNIPAM of 0.23 M Da, 0.71 M Da, 2M Da and 3.6M Da were prepared as described in Example 6. The temperature of the suspensions was increased to 50° C. After 2 hrs settling test at 50° C., the sediment bed volume reached an apparent equilibrium and did not further consolidate with time. The volume of the sediment after 2 hours at 50° C. ($V_{50}$) was recorded. Then the cylinder was taken out from the water bath and allowed to cool down at room temperature for 24 hrs until the sediment volume did not change. This sediment bed volume ($V_{22}$) at 24 hr was also recorded. FIG. 15 is an example of the resulting differences in sediment bed height for suspensions treated at 50° C. only (flocculation) compared to treatment at 50° C. and 22° C. (flocculation and re-dispersion).

Figure 16A:
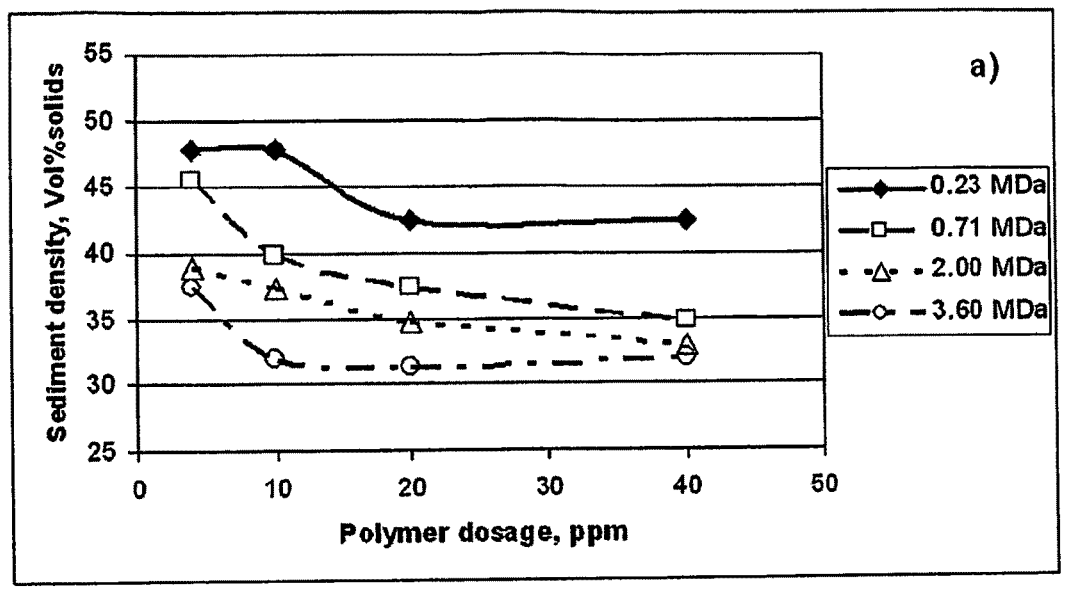
FIG. 16. (a) The volume fraction of solids in sediments after 2 hours settling at 50° C. for Unimin silica suspensions flocculated with various molecular weight PNIPAMs as indicated. (b) The volume fraction of solids in sediments after 2 hours settling at 50° C. followed by 24 hours of consolidation at 22° C. for Unimin silica suspensions flocculated with various molecular weight PNIPAMs as indicated.
Figure 16B:
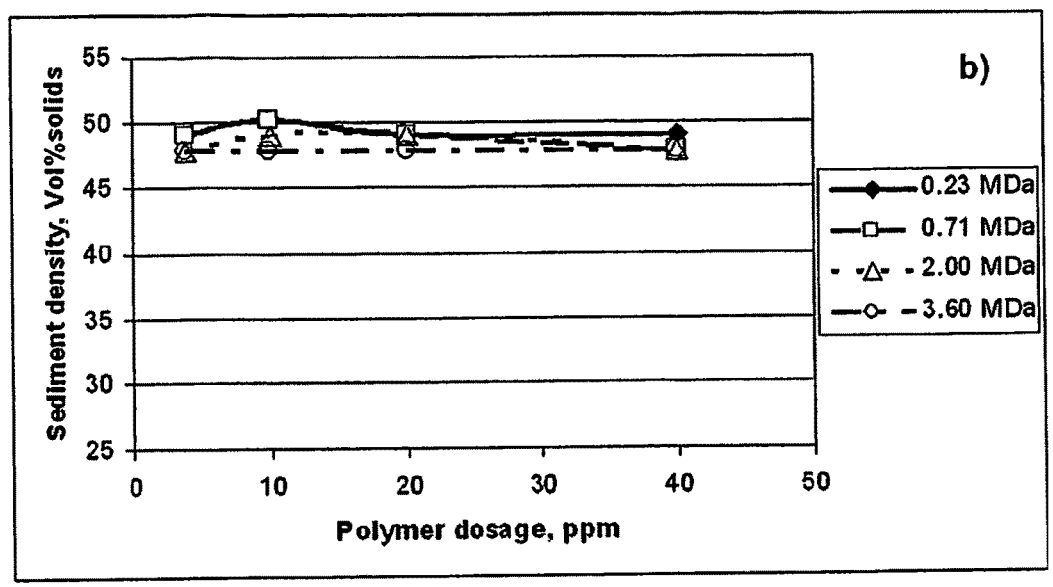
Figure 17:
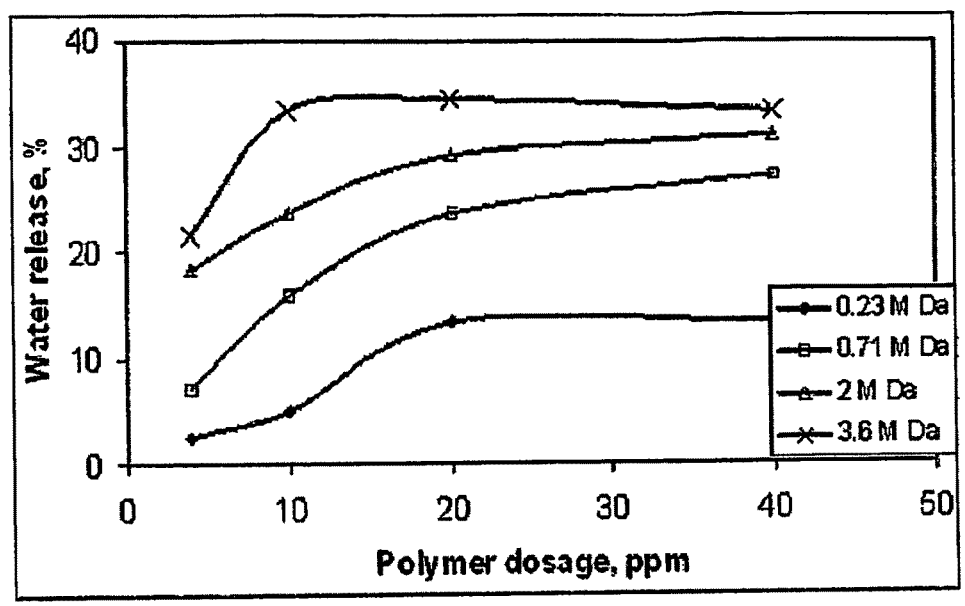
FIG. 17. The effect of PNIPAM molecular weight and dose on sediment water release. Temperature was used as a stimulus to induce the water release as temperature was reduced from 50° C. to 22° C.

FIG. 16a shows the equilibrium solids volume fractions after 2 hours sedimentation time at 50° C. as a function of polymer dose and MW. The larger MW polymers which produce the faster sedimentation rates also produced the least dense sediments. This result is consistent with the behaviour observed with conventional flocculants, where strong attraction produced both large rapidly settling aggregates and difficult to densify sediments. (Zhou and Franks, 2006) After the silica aggregation and settling (induced by PNIPAM at 50° C.) which has resulted in the final sediment densities shown in FIG. 16a, the temperature was reduced to below the PNIPAM CST to change the inter-particle interactions from attractive to repulsive. This results in more water release and sediment consolidation over a period of time. The final sediment solids volume fractions after sediment consolidation tests conducted at 22° C. for 24 hours are presented in FIG. 16b. In this case the sediments for all polymer doses and molecular weights consolidate to between 47 and 50 volume percent solids. The highly dense sediments are a result of the repulsion between particles at room temperature which leads to sediments that are easy to consolidate. The highest molecular weight polymers investigated appear to have the best combination of behaviours such as fast sedimentation, low required dose and dense sediments after consolidation.

The polymer performance in sediment water release was evaluated in terms of water release percentage, which was calculated based on the recorded sediment bed volumes $V_{50}$ and $V_{22}$.

$$\text{Release} = \frac{(V_{50} - V_{22})}{V_{50}} \times 100 \quad (1)$$

where, $V_{50}$ is the sediment bed volume at 50° C. and $V_{22}$ is the volume at 22° C.

FIG. 17 shows the results of water release percentage with the four PNIPAMs and at various dosages of 4, 10 and 20 ppm. Temperature was used as a stimulus to induce the water release from 50° C. to 22° C. One can see that generally the PNIPAM with a higher MW induced more sediment water release at a fixed dosage. Also for any particular PNIPAM, increasing dosage induced more sediment water release. For example, the water released by a low MW PNIPAM (0.23 M Da) is below 2.5% at 4 ppm, which is almost insignificant. However, the PNIPAM with a high MW (3.6 M Da) can release about 23% water at same dosage, which is about ten times of the amount induced by the low MW PNIPAM. Moreover, the interesting findings on sediment consolidation are about the addition of a PNIPAM with 3.6 M Da MW. At 10 ppm addition, the water released by this PNIPAM has already reached its maximum amount and no more increase was obtained even the PNIPAM dosage was increased. In the cases of the other three PNIPAMs, the water released is still in a increasing trend with the increase of their dosages from 10 to 25 ppm, indicating that much higher dosages are required for the low MW PNIPAMs to achieve the same water release level as the PNIPAM with 3.6 M Da MW, say 30-100 ppm.

Example 9

Comparison of Conventional Poly Acrylamide Flocculant to Stimulant Responsive Flocculant In order to compare the dewatering performance of stimulant responsive polymers such as PNIPAM with conventional flocculants such as poly acrylamide (PAM), the following experiments were conducted. A cationic PAM flocculant, Zetag7570 with medium MW, was obtained from Ciba Specialty Chemicals. It was prepared in a 0.1 wt % solution with deionized water at pH=6.0. The same 3.6 M Da PNIPAM used in Examples 6 and 8 was prepared as in those Examples. The settling rates of the two polymers were compared at same dosage of 10 ppm at 50° C. and 22° C. As shown in Table 6, the 3.6 M Da poly(NIPAM) at 50° C. produced comparable settling rates to conventional PAM at either room temperature or 50° C.

TABLE 6

Results of additional settling tests

|  | 22° C. | 50° C. |
| --- | --- | --- |
| No polymer | <0.01 m/hr | <0.01 m/hr |
| PAM, 10 ppm | 17.70 m/hr | 17.20 m/hr |
| 3.6 M PNIPAM, 10 ppm | 0.11 m/hr | 19.90 m/hr |

Figure 18:
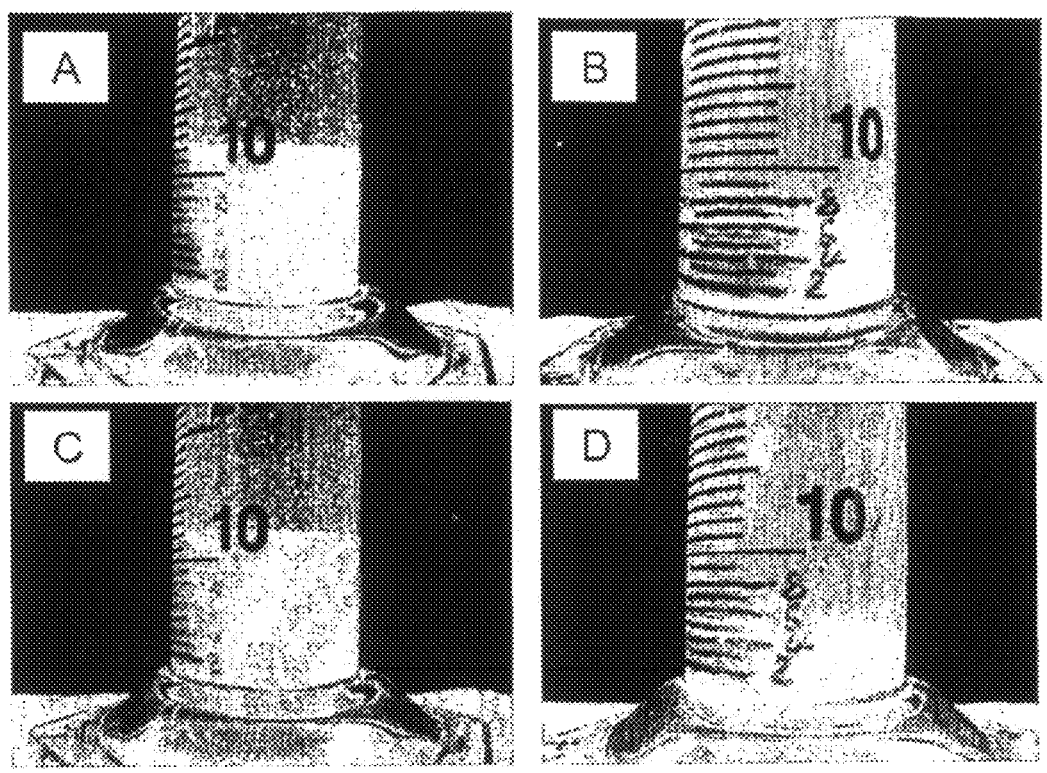
FIG. 18. Comparison of sediment volume of silica with 10 ppm dosage of polymers A.) conventional PAM after two hours at 50° C. and B.) 3.6 M Da PNIPAM after two hours at 50° C. C.) conventional PAM after additional 24 hours at 22° C. and D.) 3.6 M Da PNIPAM after additional 24 hours at 22° C.

Although both flocculants PNIPAM and PAM, produced high sedimentation rates, their action mechanisms as described below are different. It is known that PAM molecules do not response to the changes of environmental stimulants such as temperature. They play their role in solids flocculation mainly via bridging (Besra et al., 2004; Zhou and Franks, 2006). Once the PAM molecules adsorb on the solid surface, they produce inter-particle attractive forces by adsorbing on to more than one particle and bond solid fines together to form flocs. As a result, the floc properties are determined by this type of inter-particle attractive force and the flocs do not release more water in sediment consolidation. FIG. 18 indicates this difference in behavior of PNIPAM compared to PAM. The final sediment volume of the conventional poly acrylamide polymer is 12 ml which remains unchanged as temperature is cycled between 50 and 22° C. The stimulus responsive polymer PNIPAM produces a sediment of only 6 ml (50% of the conventional polymer) when settling occurs at 50° C. After additional consolidation at 22° C. the stimulant responsive polymer sediment volume further reduces to 4.5 ml, only 37.5% of the volume of the sediment when conventional polymer is used.

Example 10

Flotation of Hydrophobic Aggregates Induced by the Stimulant Responsive Polymer PNIPAM A 5 wt % suspension of Unimin 400G silica with between 0 and 80 ppm of PNIPAM of 3.6 M Da MW was prepared as in Example 6. The temperature was increased to 50° C. in order to induce the formation of hydrophobic flocs. After the formation of hydrophobic flocs in a 100-ml cylinder, the slurry was transferred to a flotation cell to conduct a flotation test. Flotation tests were conducted in a laboratory flotation column designed in our lab. It consisted of a glass cylinder (ϕ35×145 mm) and a magnetic stirrer. A magnetic stirring bar (20 mm in length) was used to mix the slurry. Air bubbles were produced in the slurry by a wooden air diffuser (50 mm in length) which was supplied with compressed air. The air flow rate was controlled by a rotameter at 100 ml/min under a pressure of 40 psi. The flotation was conducted at 50° C. for a period of 5 minutes. The samples of froth product were collected, filtrated and dried in an oven and the weight was used for the calculation of flotation recovery.

Figure 19:
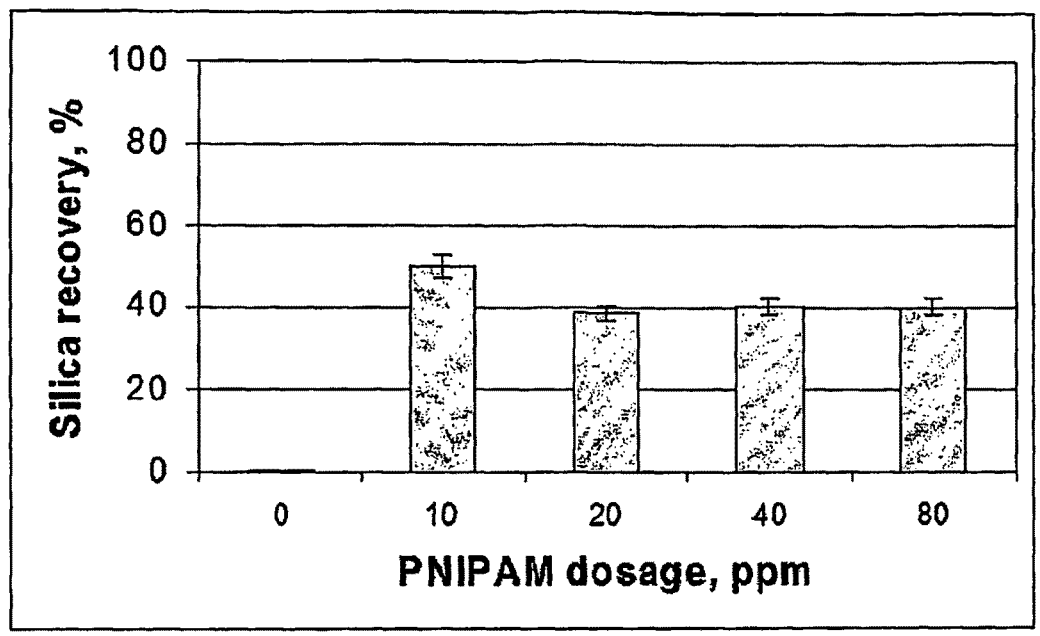
FIG. 19. Silica flotation recovery at various PNIPAM (3.6M Da MW) dosages at 50° C. The PNIPAM played roles as flotation collector and frother.

FIG. 19 presents the results of flotation recovery of Unimin 400G silica under various PNIPAM dosages from 0 to 80 ppm at 50° C. The effect of dosage on silica recovery is obvious. First, near zero recovery was obtained without PNIPAM addition, due to the naturally hydrophilic surface property of the silica particles. However, the silica recovery was dramatically increased to 50% at 10 ppm PNIPAM addition, reflecting the fact that the silica particles' surfaces were activated into hydrophobic condition and the floc size became much larger than a single particle. Larger size particles (flocs) usually have higher collision probability with air bubbles in flotation than smaller ones (Nguyen, 1998) and consequently have quicker flotation kinetics. Also, the results indicate that PNIPAM has frothing ability to some extent as no frother was added in these flotation tests. Furthermore, when more flotation tests were conducted with increased PNIPAM dosages at 20, 40 and 80 ppm, the expected higher flotation recovery was not obtained. Instead, the recovery was only about 40% which is lower than the recovery obtained at 10 ppm PNIPAM. This reduction in recovery due to increased PNIPAM dosage is not related to surface hydrophobicity, instead, the observed phenomena during the flotation tests was that the flocs formed were too big in size to be carried up to the froth layer by the small air bubbles.

Figure 20:
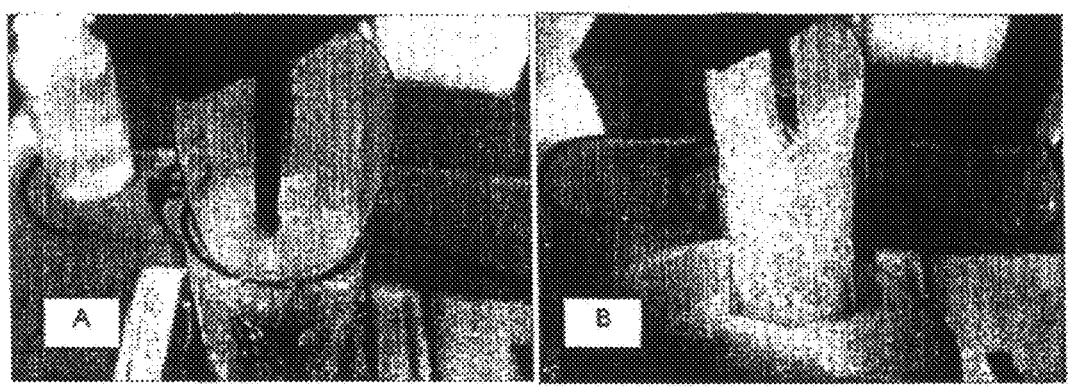
FIG. 20, Photos showing the frothing ability of PNIPAM in silica flotation (3.6M Da MW). A.) No PNIPAM addition; B.) 10 ppm PNIPAM.

FIG. 20 shows that stimulant responsive polymers can act as effective frothers at 50° C. FIG. 20-A shows air bubbling without any PNIPAM addition at a rate of ~30 ml/min. Note the bubbles are large and low in number. Also note there is no stable froth. FIG. 20-B shows air bubbling at a rate of ~30 ml/min when 10 ppm 3.6 M MW polyNIPAM has been added. Note the increased number and reduced size of bubbles when poly NIPAM is present at 50° C. Also note the thick layer of stable froth on the surface. This example shows that stimulant responsive polymers such a poly NIPAM may be used as frothers.

Figure 21:
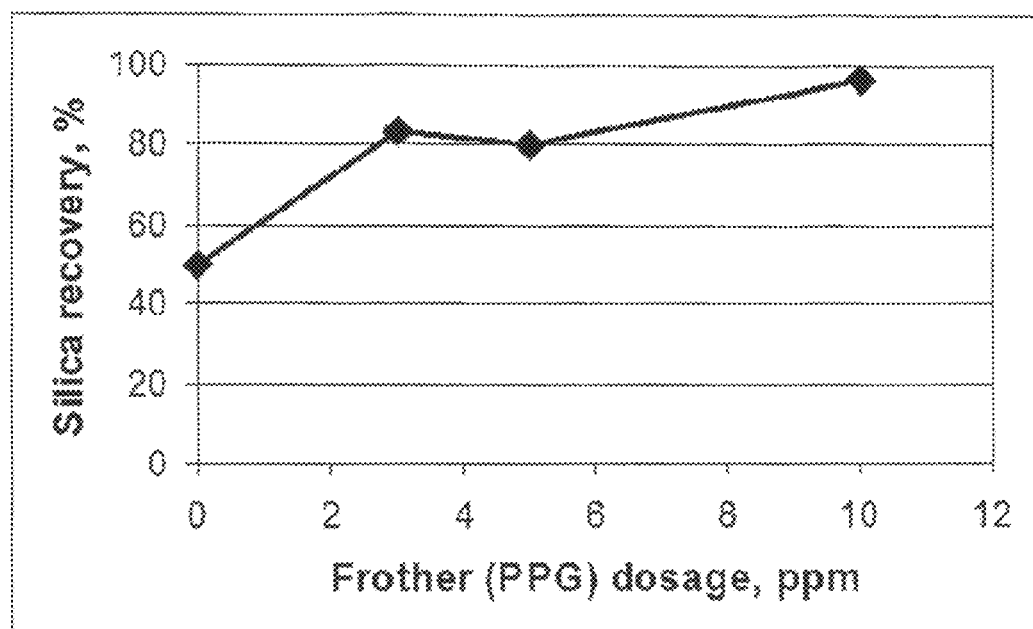
FIG. 21. Silica flotation recovery after 5 minutes at various frother dosages and 10 ppm PNIPAM addition at 50° C.
Figure 22:
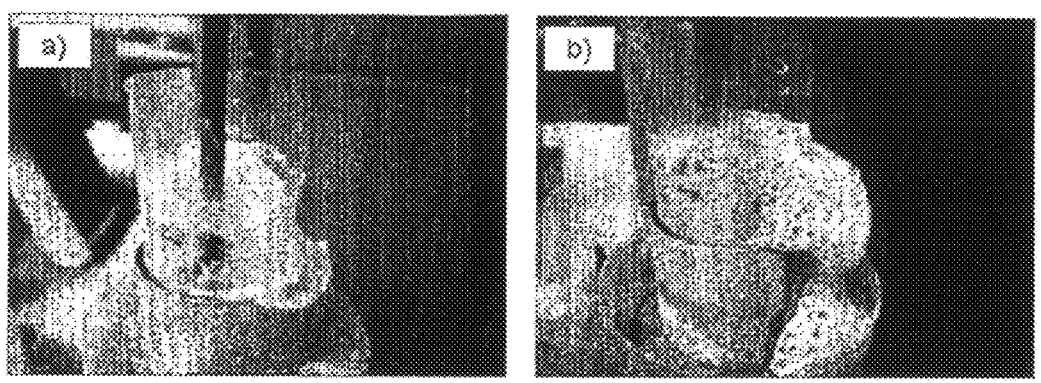
FIG. 22. Photo of silica suspension froths for a) 10 ppm PNIPAM and b) 10 ppm PNIPAM plus 10 ppm PPG frother both at 50° C. slurry temperature.

Although PNIPAM worked very well as a flotation collector its frothing ability was found to be somewhat limited. Therefore more flotation tests were conducted in which some frother was added together with PNIPAM. The frother used was poly(propylene) glycol (PPG). FIG. 21 presents the flotation results with PPG added at various dosages and fixed PNIPAM dosage at 10 ppm. It can be seen that the recovery was increase to 80% at 3 and 5 ppm PPG addition from 50% at zero PPG addition. Once the PPG dosage was added at 10 ppm, a much higher recovery of 96% was obtained, which is almost double of the value without PPG addition. These results indicate that the silica particles have been activated to have a strong hydrophobic surface and are easier to attach to the bubbles' surface. Also, it may be possible to achieve good silica recovery without frother addition just by increasing the air flow rate into the slurry producing more air bubbles. The two photos in FIG. 22 compare the froths in the absence and presence of PPG. Clearly, the addition of PPG frother leads to a formation of thicker and more stable froth layer compared with no PPG addition. The data here demonstrates that PNIPAM worked very well as a collector and as somewhat of a frother.

Example 11

Flotation and Sedimentation of Kaolinite with PNIPAM

A pure kaolinite (Snobrite 55) sample (kaolinite 98%) was obtained from Unimin Australia. It was determined to have a median particle size of 0.7 micron or 94.5% minus 10 micron. The particle density is 2.60 and the surface area is 16 m²/g. The 3.6 MDa PNIPAM synthesized as in Example 1 was dissolved into distilled, reverse osmosis treated water and added to the mineral suspension as a multiple function reagent. Poly(propylene) glycol (PPG) was used as a flotation frother. To compare the performance of PNIPAM with a conventional flocculant, a weak anionic poly acrylamide (PAM) (Magnafloc 336) with high molecular weight (from Ciba) was also used as a flocculant. Dodecylamine hydrochloride (DDA) was used as a flotation collector. HCl was used to adjust suspension pH. In addition, Calgon (sodium hexametaphosphate) was used as a dispersant. Sodium nitrate (0.01 M) was used as electrolyte background in water. Distilled, reverse osmosis treated water was used in all the tests. Flotation tests with PNIPAM were carried out at natural pH of 5.7 and pH 5.0 for the flotation with DDA.

Flotation tests were conducted in a laboratory flotation column designed in our lab. It consisted of a glass cylinder (ϕ35×145 mm) and a magnetic stirrer. A magnetic stirring bar (20 mm in length) was used to mix the slurry. Air bubbles were produced in the slurry by a wooden air diffuser (50 mm in length) which was supplied with compressed air. The air flow rate was controlled by a rotameter at 100 ml/min under a pressure of 40 psi. For each flotation test, the mineral suspension was prepared by adding 2.5 g of minerals to 100 ml of solutions in a 100-ml cylinder with distilled, reverse osmosis treated water. The pH of the mineral suspension was first adjusted to a desired value by adding HCl solutions in case of DDA used as a collector. No pH was controlled in case of PNIPAM addition; the natural pH was about 5.7. Then the PNIPAM solution was added to the desired concentration and shaken upside down for several times. Once the slurry in the cylinder was heated up to 55° C., it was poured into the flotation cell and agitated. (In the case of conventional PAM the suspension was maintained at room temperature.) The agitation rate was adjusted to be as low as possible to avoid breaking flocs but to maintain the solids in suspension. After slurry conditioning for 1 minute, the air flow was initiated and the flotation test started. The froth product was collected for 5 minutes, then filtered and dried in an oven then weighed to calculate flotation recovery. The recovery was calculated based on their solid weights of the two products.

Flocculation tests with PNIPAM were carried out in 100-ml cylinders. For each test, the solid suspension was prepared with 2.5 g kaolinite and distilled, reverse osmosis treated water containing 0.01M NaNO₃. The appropriate volume of PNIPAM solution (0.1 wt %) was added to make a final suspension concentration of 2.5 wt % solids. The pH value of the suspension was measured at 5.7±0.2. After being filled with suspension, the cylinder was sealed with a wax parafilm sealing film and gently shaken upside down several times to mix the suspension. As soon as the cylinder was placed on a flat solid surface, the test began and no further disturbances were allowed. The descent of the solid/liquid interface (mud line) was carefully observed, recorded as a function of settling time. The slope of the settling curve at time zero was obtained as the initial settling rate. Each test was conducted at room temperature (near 22° C.).

Figure 23:
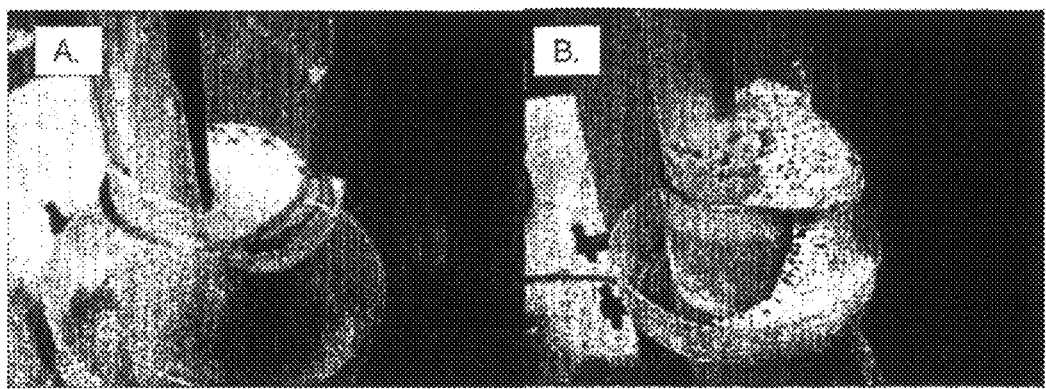
FIG. 23. Photos of kaolinite suspension during flotation that show PNIPAM flotation performance at 50° C. A. No PNIPAM addition, B. 20 ppm PNIPAM FIG. 24. Effect of PNIPAM dosage on flotation recovery of kaolinite at 50° C. with 10 ppm Calgon added as dispersant.

Once the kaolinite suspension was dispersed by calgon at 10 ppm, it was flocculated by adding PNIPAM solution in the desired amount. Then the suspension was heated to 55° C. Frother was added at 10 ppm followed and the flotation process started. The two pictures shown in FIG. 23 demonstrate the froth situations in the presence and absence of the PNIPAM. From FIG. 23A, it can be noted that in the absence of PNIPAM, the flotation of kaolinite can not be induced by the addition of frother alone as no stable froth layer was formed. This is because the kaolinite surface still remains in a hydrophilic condition so that these mineral particles have little driving force for attachment to air bubbles. However, when 20 ppm PNIPAM was added as seen from FIG. 23B, a thick and stable froth layer was formed and the kaolinite mineral particles floated, indicting the PNIPAM role as a flotation collector to induce hydrophobicity on solid surface. Due to the enhanced hydrophobicity, it is easier for the particles to attach on the surface of air bubbles.

Figure 24:
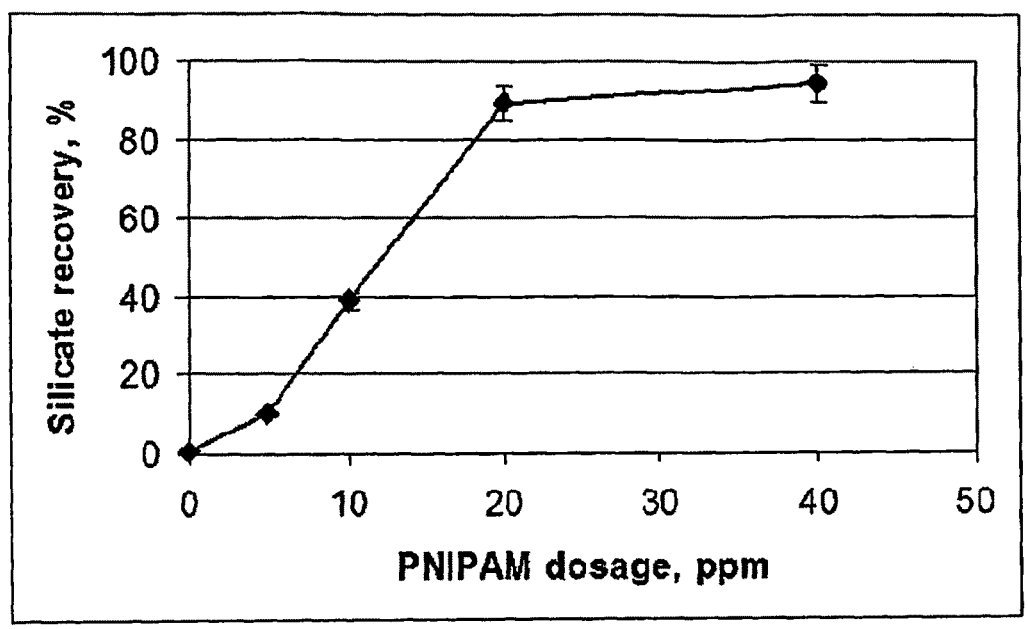

As efficient mineral flotation is dependent on its surface hydrophobicity, the added amount of collector, here the PNIPAM, should be a key factor to achieve good flotation recovery. FIG. 24 shows the results of kaolinite flotation at various PNIPAM dosages when 10 ppm Calgon dispersant is present. Starting from zero PNIPAM addition at which the recovery is below 1%, the flotation of kaolinite was enhanced significantly over a tested PNIPAM dosage range from 5 to 40 ppm. The flotation recovery of kaolinite at 5 ppm to 20 ppm, for example, was dramatically increased from 10% to 90%. From 20 ppm to 40 ppm, a small additional recovery increase of about 3% was obtained, indicating nearly full surface adsorption of PNIPAM on the solid surface. It is also to be noted that the PNIPAM dosage at 20 ppm is equal to 0.8 kg/ton pure kaolinite in the feed, which is practical to be applied in industrial operations.

A comparison between PNIPAM-assisted and PAM-assisted kaolinite flotation was conducted with following test conditions:
a. PNIPAM 20 ppm plus frother 10 ppm at natural pH 5.7 and 50° C.;
b. PAM 10 ppm plus collector DDA 20 ppm at pH 5.0 (HCl) and 22° C. (Note DDA also acts as a frother in this situation.)

Figure 25:
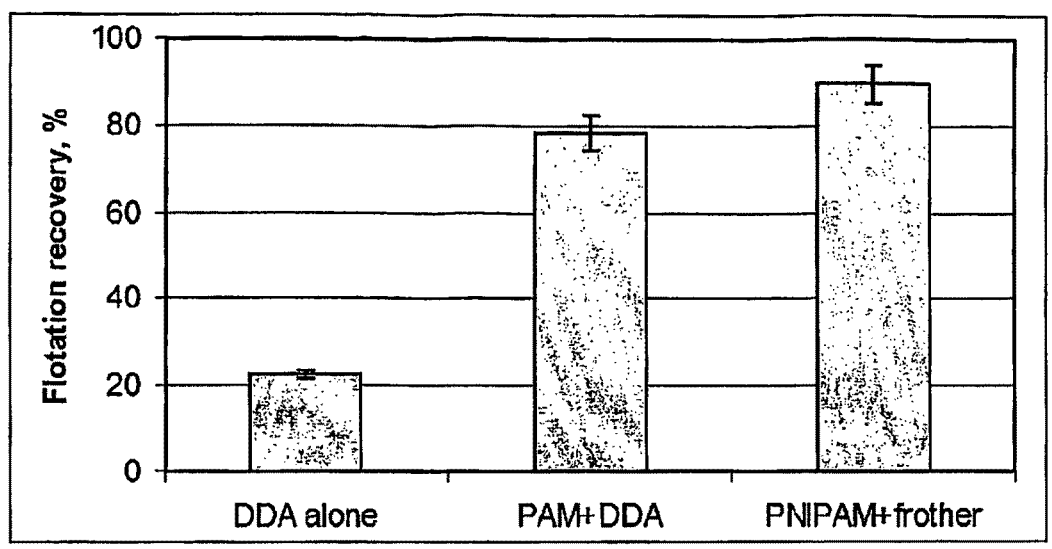
FIG. 25. Flotation recovery comparison between kaolinite suspension with a) 20 ppm DDA (Dodecylamine hydrochloride) only, b) 20 ppm PNIPAM with 10 ppm frother and c) 10 ppm PAM with 20 ppm DDA.

FIG. 25 presents the flotation results at above conditions plus the one with DDA addition alone as control point. First when DDA was used as a collector at 20 ppm in the absence of any polymer, either PAM or PNIPAM, the kaolinite flotation recovery was 22%, which is quite low and unsatisfactory. Low flotation kinetics of fine particles flotation and low surface hydrophobicity at this collector dosage should account for this low recovery value. With the method of PAM-assisted kaolinite flotation in which the PAM was added to flocculate the fine particles and then 20 ppm DDA was added as collector for the flotation, the flotation recovery was greatly increased to 78%, which is a 56% increase compared to the result of DDA added alone. These results are consistent with the results flocculation-flotation concept presented by Hu and co-workers (Hu et al., 2004). Using the novel method presented in the current disclosure, (PNIPAM-assisted flocculation-flotation) in which PNIPAM was added as a flocculant and flotation collector, the kaolinite flotation recovery was obtained at 90%, which is a 12% increase compared to the PAM-assisted flotation method. This is mainly because the addition of PNIPAM induced not only solid flocculation but also the strong hydrophobicity, which induced a hydrophobic flocculation-flotation procedure.

Figure 26:
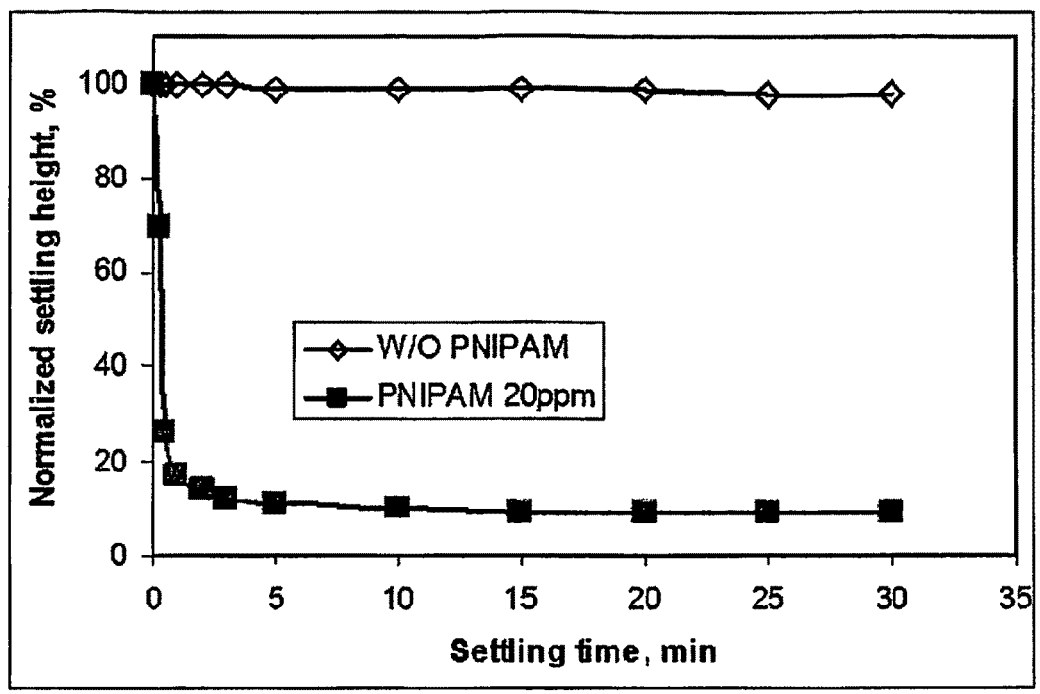
FIG. 26. Sedimentation rates of kaolinite suspensions at 22° C. compared a) without PNIPAM (dispersed) and b) with 20 ppm PNIPAM (bridging flocculated).
Figure 27:
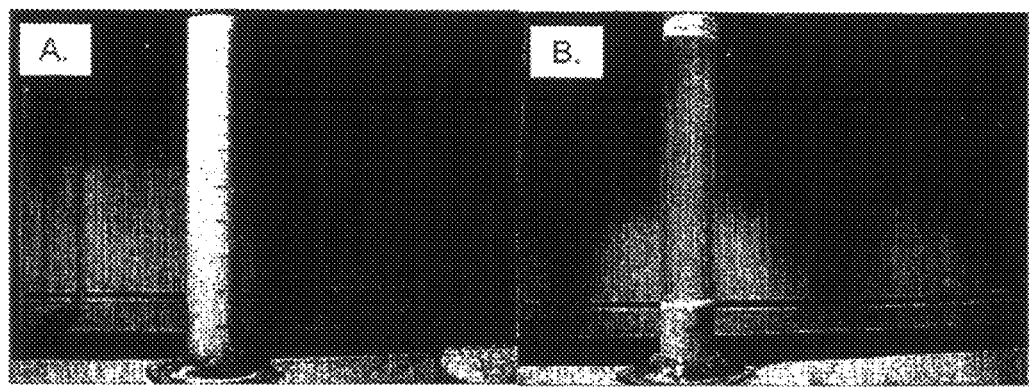
FIG. 27. Photos taken at 30 min showing PNIPAM flocculation performance (sediment bed and suspension clarity) at 22° C. A. No PNIPAM addition, B. 20 ppm PNIPAM.

In order to confirm the PNIPAM flocculation role, the sedimentation tests were also conducted. FIG. 26 shows that settling is dramatically improved when the kaolinite flocculation induced by PNIPAM at 20 ppm even at room temperature. Under these conditions, the PNIPAM acts as a typical bridging flocculant. In the absence of PNIPAM, the solids were actually in a dispersed state as they displayed a very slow settling curve against settling time in a period of 30 min. However, the formation of flocs by PNIPAM produced a quick settling curve as we can see from the figure, which is totally different from that with no PNIPAM addition. In fact, the settling difference between PNIPAM addition and no addition was found to be almost the same for settling tests conducted at both temperatures of 22° C. and 50° C. at this polymer dose. Furthermore, from the pictures shown in FIG. 27, it can be observed that the PNIPAM addition produced a clear supernatant after 30 min compared to no PNIPAM addition. It means that a very good solid flocculation was completed by the PNIPAM that has a large molecular weight.

Figure 28:
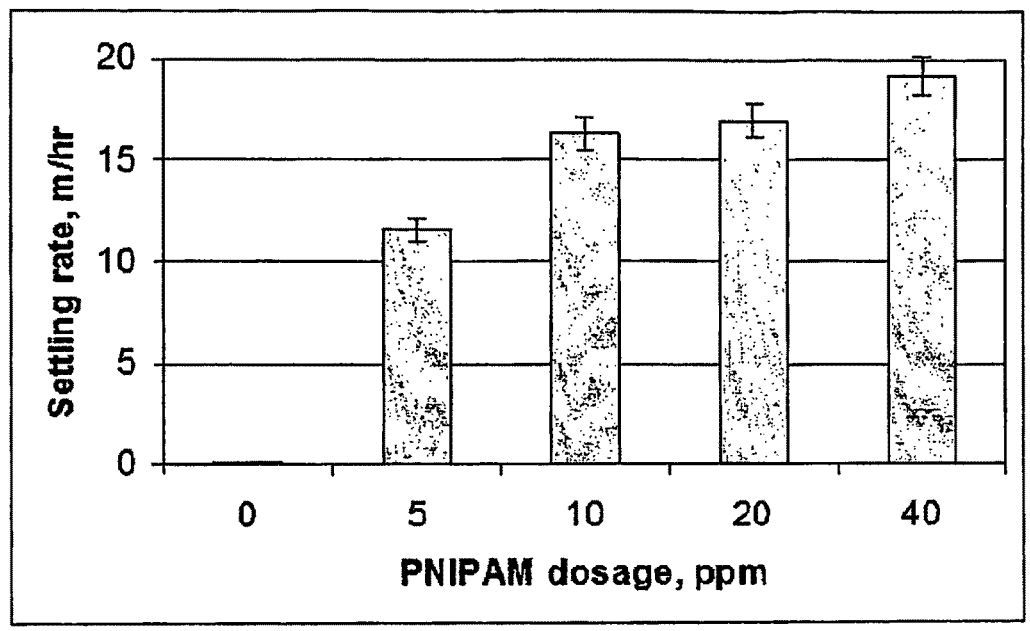
FIG. 28. Effect of PNIPAM dosage on settling rate at 22° C. with 10 ppm Calgon
Figure 29:
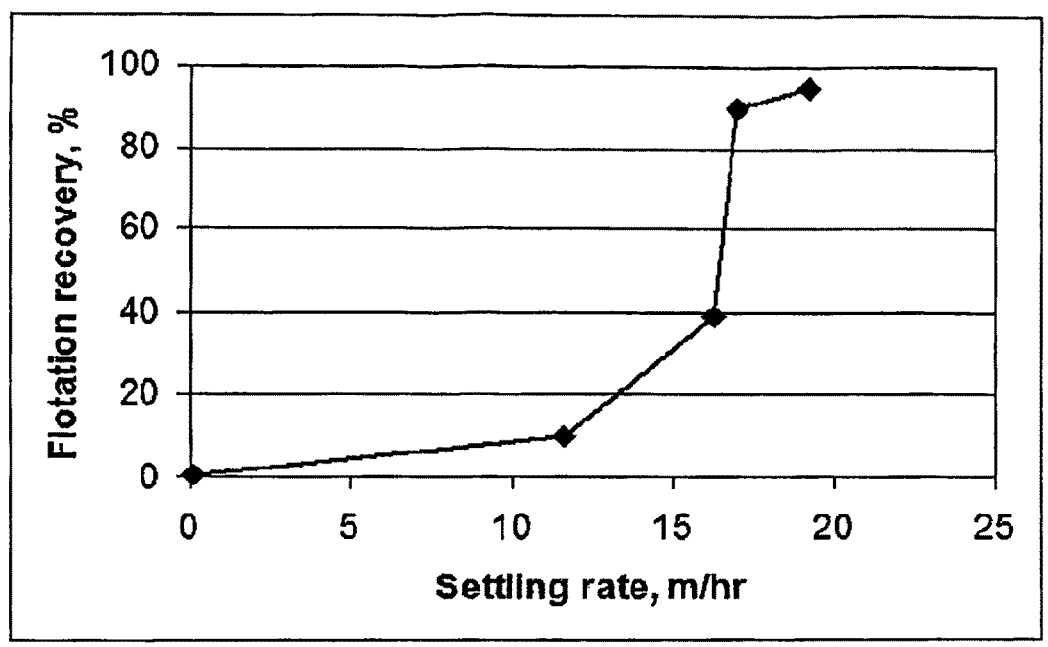
FIG. 29. Relationship between flotation recovery and settling rate induced by PNIPAM.

To explain the flotation results at various PNIPAM dosages, the effect of PNIPAM dosage on settling rate was studied and the results were presented in FIG. 28. Over the range of PNIPAM dosage from 0 to 40 ppm, it can be seen that the initial settling rate was considerably increased from 0.1 m/hr at zero PNIPAM addition to 17 m/hr at 20 ppm and 19 m/hr at 40 ppm. The results here indicate that PNIPAM induced flocculation is strongly dependent upon dosage. There is a good correlation between the PNIPAM induced flocculation results (settling rate) and PNIPAM assisted-kaolinite flotation recovery as shown in FIG. 29. With the increase of PNIPAM dosage, the solid settling rate was increased and so was the flotation recovery. It appears that the increased PNIPAM dosage brought the benefits of both increased particle apparent size via flocculation and also flocs hydrophobicity. And it was also found that this PNIPAM flocculation performance is not sensitive to the addition of dispersant Calgon at 10 ppm.

Example 12

Selective Flotation of Hematite from Hematite-Silica Mixture with Anionic PNIPAM Co-polymer The selective flotation of hematite form hematite-silica mixtures using the 15% anionic co-polymer described in Example 1 (Poly(N-isopropylacrylamide-co-acrylic acid) (APNIPAM)) was investigated. The silica was purchased from Sigma and was about 3 microns average diameter, has a BET surface area of 6.8 $m^2 g^{-1}$, density of 2.62 $g cm^{-3}$ with an isoelectric point (iep) at pH ~2 to 3. The hematite was purchased from Aldrich and was about 5 microns average diameter, has a BET surface area of 1.9 $m^2 g^{-1}$, density of 5.24 g $cm^{-3}$ with an isoelectric point (iep) at pH ~7 to 9. The 15% anionic co-polymer synthesized as described in Example 1 (Poly(N-isopropylacrylamide-co-acrylic acid) (APNIPAM)) has been shown to selectively (or preferentially adsorb on to hematite as opposed to silica as shown in Example 5.

Individual suspensions of 2.5 wt % hematite and 2.5 wt % silica was prepared in 100 ml volumetric cylinders in reverse osmosis treated water at pH 4.5 adjusted with 1M $HNO_3$ or 1M NaOH. The particles were dispersed in the suspension with an ultrasonic horn homogeniser. The suspension was gently mixed for 5 minutes conditioning time. The 15% anionic co-polymer (APNIPAM)) was prepared as a 1 wt % solution in reverse osmosis water. Appropriate amount of PNIPAM 1 wt % solution was added to produce a final polymer concentration between 0 and 250 ppm by weight of solution. 10 ppm frother (POLYFROH H$_2$O, Huntsman Australia Corp. Pty. Ltd.) was added to make up the 100 ml of suspension in the cylinder. The suspension was gently shaken to ensure that all the contents were well mixed.

Figure 30:
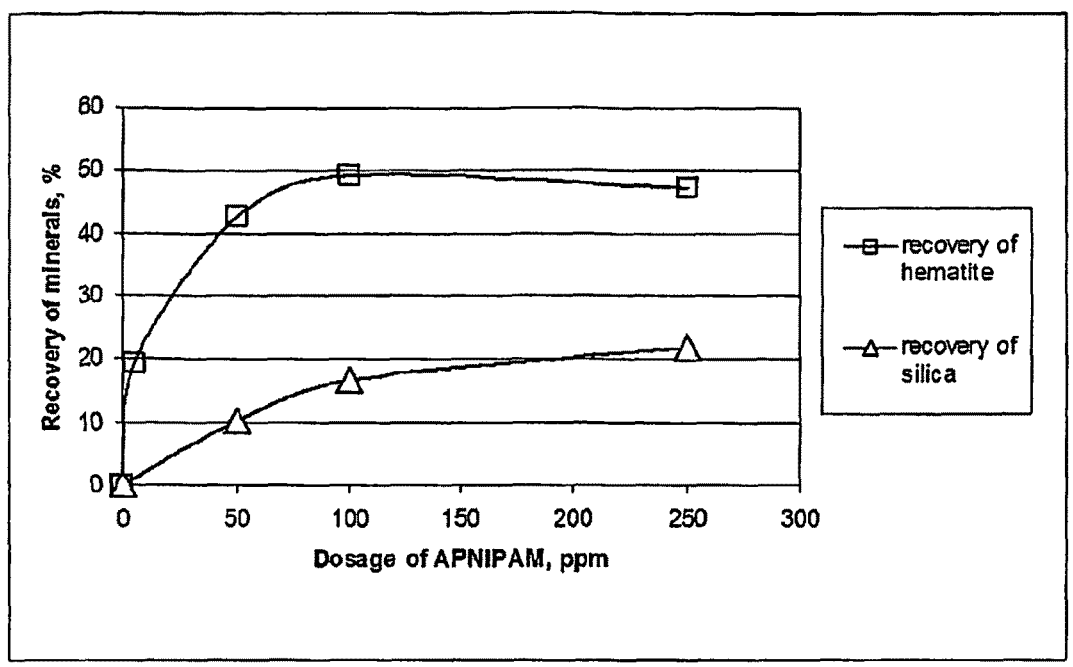
FIG. 30. Recovery of silica and hematite from individual suspensions as a function of 15% anionic PNIPAM co-polymer (APNIPAM) dosage for flotation at 20° C.

Flotation experiments were conducted in the laboratory scale column flotation cell described in Examples 10 and 11. The suspension was transferred into flotation cell and kept mixed with a magnetic stir bar rotating at a speed of 550 rpm. The air diffuser was dipped into the suspension until it was 2 cm away from the magnetic bar. Air flow rate was controlled at 65 ml/min at 40 psi. An additional 25 ml of reverse osmosis water (pH=4.5) was added to flotation cell in order to keep the level of the suspension just 5 mm under the edge of cell. This produces an overall pulp solids concentration of 2 wt %. During the flotation additional reverse osmosis water was added to keep the suspension level constant as suspension is removed from the cell as froth. The froth and residue of the suspension were collected, dried and weighed to determine the recovery of the minerals. Experiments were conducted at 20° C. and 50(±5)° C. Flotation experiments were conducted for 5 minutes Initial experiments were conducted to determine the influence of the amount of polymer on the recovery of the individual minerals. Two different suspensions containing either 2.5 wt % silica or 2.5 wt % hematite were investigated. The results of flotation recovery of minerals floated individually from 2.5 wt % suspensions at 20° C. are shown in FIG. 30. The flotation recoveries at 50° C. for the individual minerals is shown in FIG. 31.

FIG. 30 shows that the increase in dosage of anionic PNIPAM from 0 ppm to 250 ppm increases the recovery of hematite from 0% to 47 wt % at room temperature (20±5° C.). The recovery of silica increases from 0% to 22 wt % at room temperature (20±5° C.) as the APNIPAM dose increases form 0 to 250 ppm. At room temperature, the anionic PNIPAM is soluble in water and both minerals surfaces are hydrophilic. As shown in Example 5 the polymer adsorbs more onto hematite than silica. Since both types of particles sizes are around 1 μm to 5 μm, they both can easily become entrained by air bubbles. The stronger adsorption of APNIPAM onto hematite causes the hematite to weakly aggregate and become weakly hydrophobic. Some hematite can thus be recovered by flotation at room temperature, but the recovery is low. The silica particles can become entrained in the froth since no wash water is used. Therefore the recovery of hematite is higher than silica at room temperature.

Figure 31:
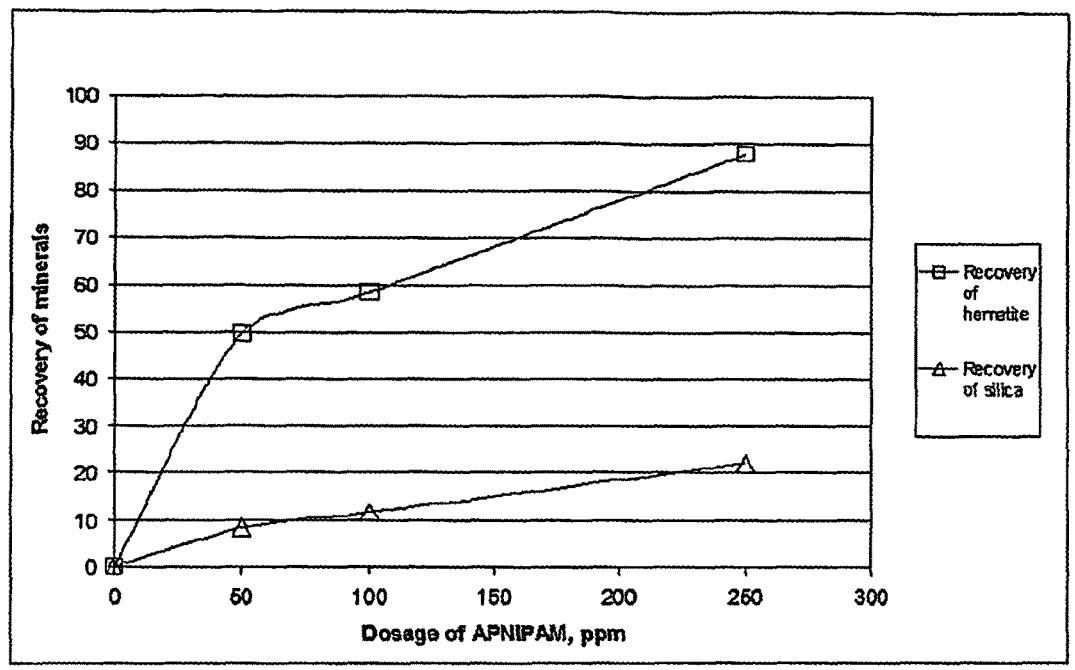
FIG. 31. Recovery of silica and hematite from individual suspensions as a function of 15% anionic PNIPAM co-polymer (APNIPAM) dosage for flotation at 50° C.

FIG. 31 shows the recovery of minerals by anionic PNIPAM at 50±5° C. When the temperature is increased to 50° C., the anionic PNIPAM molecules switch from hydrophilic to hydrophobic. They also strongly adsorb to hematite, but only very weakly to silica as shown in FIGS. 6 and 7. The hematite becomes hydrophobic and aggregates as well. The hydrophobic surface and larger size of hematite aggregates enables the hematite to attach to the raising air bubbles and be recovered in the froth. The recovery of hematite increased from 47 wt % to 88 wt % at (250 ppm dosage of anionic PNIPAM) as temperature was increased form 20 to 50° C. The recovery rate of silica at 50° C. was almost the same as the rate at room temperature (22% for 250 ppm polymer dose). The silica was likely recovered by entrainment at both temperatures.

Another suspension, this time containing a mixture of 2.5 wt % hematite and 2.5 wt % silica was prepared in a 100 ml volumetric cylinder in reverse osmosis treated water at pH 4.5 adjusted with 1M HNO$_3$ or 1M NaOH. The particles were dispersed in the suspension with an ultrasonic horn homogeniser. The suspension was gently mixed for 5 minutes conditioning time. The 15% anionic co-polymer (APNIPAM)) was prepared as a 1 wt % solution in reverse osmosis water. Appropriate amount of PNIPAM 1 wt % solution was added to produce a final polymer concentration of 250 ppm by weight of solution. 10 ppm frother (POLYFROH H20, Huntsman Australia Corp. Pty. Ltd.) was added to make up the 100 ml of suspension in the cylinder. The suspension was gently shaken to ensure that all the contents were well mixed.

Flotation experiments were conducted in the laboratory scale column flotation cell described in Examples 10 and 11. The suspension was transferred into flotation cell and kept mixed with a magnetic stir bar rotating at a speed of 550 rpm. The air diffuser was dipped into the suspension until it was 2 cm away from the magnetic bar. Air flow rate was controlled at 65 ml/min at 40 psi. An additional 25 ml of reverse osmosis water (pH=4.5) was added to flotation cell in order to keep the level of the suspension just 5 mm under the edge of cell. This produces an overall pulp solids concentration of 4 wt %. During the flotation additional reverse osmosis water was added to keep the suspension level constant as suspension is removed from the cell as froth. The froth and residue of the suspension were collected, dried and weighed to determine the recovery of the minerals. The dried froth and residue were also analysed with X-ray powder diffraction as described below in order to determine the composition of the minerals collected in the froth and the residue remaining in the flotation cell. Experiments were conducted at 20(±5)° C. and 50(5)° C. Flotation experiments were conducted for several times including 5, 9, 15 and 20 minutes X-ray powder diffraction (XRD) was used to semi-quantatively determine the amount of silica and hematite in both the recovered froths and the residue in the flotation cell. Standards of known concentrations of silica and hematite were prepared and analysed by XRD. The standard compositions are 100 wt % silica; 20 wt % silica and 80 wt % hematite; 40 wt % silica and 60 wt % hematite; 60 wt % silica and 40 wt % hematite; 80 wt % silica and 20 wt % hematite and 100 wt % hematite. The XRD patterns of these standards are shown in FIG. 32. The amounts of silica and hematite in a mixture can be estimated by comparing the measured XRD pattern from the unknown composition mixture to the known standards. The dried samples of the recovered froth and residue were ground by mortar and pestle for the XRD analysis. Since the compositions of the feed (50% silica and 50% hematite), the mass of the feed, the mass of the residue and froth and the compositions of the residue and froth (from XRD analysis) are known, one can determine the recovery of the individual components (hematite and silica) using a simple mass balance.

The results of the flotation experiments using the 15% anionic co-polymer with PNIPAM (APNIAPM) in the mixed hematite and silica suspensions are as follows.

At room temperature the total recovery of solids with 50 ppm polymer was only 5% after 5 minutes flotation. This is considered poor performance and such low overall recovery would usually not be economically useful in industry. At room temperature the total recovery of solids after 5 minutes flotation increased to 33% when 250 ppm polymer is used. FIG. 33a and b show the XRD patterns of the recovered froth and the residue respectively. By comparing FIG. 33a to the standards in FIG. 32, the composition of the froth appears to be about 60% silica and 40% hematite. Likewise, the composition of the residue appears to be about 70% hematite and 30% silica. In fact more silica was recovered than hematite and the recovery of hematite was only about 29%. The recovery of both silica and hematite in the froth at room temperature with 250 ppm polymer are mainly due to weak hydrophobicity of the weakly aggregated hematite and entrainment of the silica. At room temperature the flotation is non-selective and overall recovery relatively poor.

At 50° C. the total solids recovery with 50 ppm polymer increased to 20% after 5 minutes flotation (still low by industry standards). The total recovery after 5 minutes flotation at 50° C. with 250 ppm polymer remained around 30% but the recovery of hematite increased to about 55%. The higher temperature enhances the selectivity of the flotation operation because now the hematite with adsorbed polymer is more hydrophobic.

Figure 35:
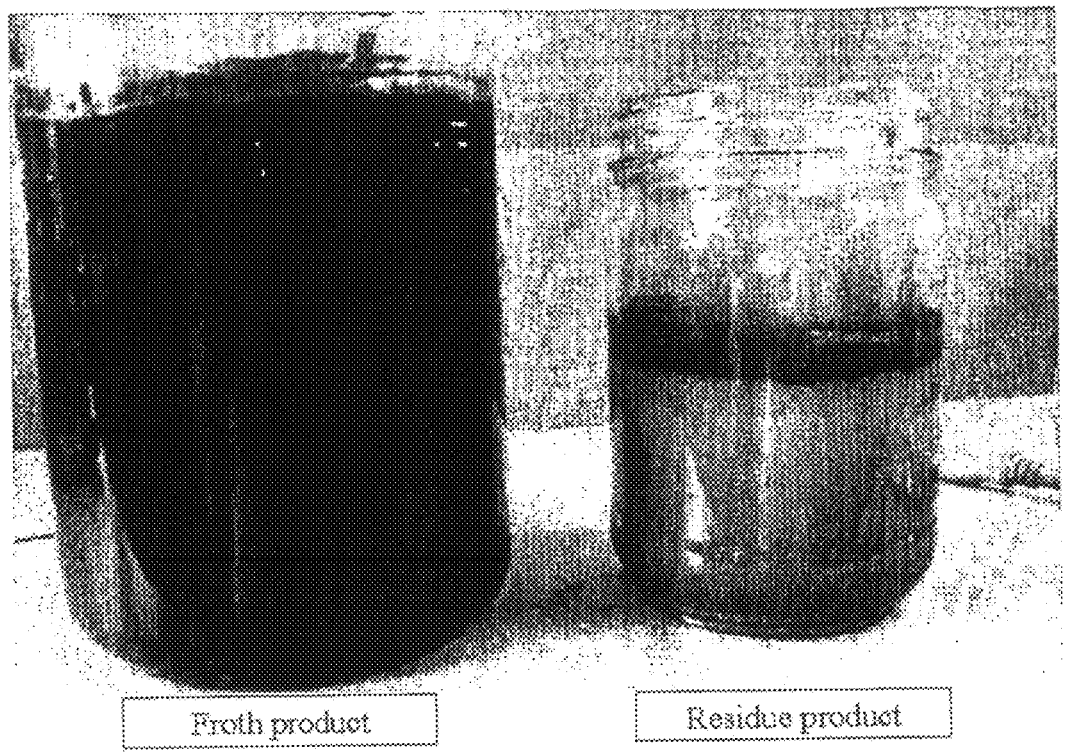
FIG. 35. Photo of froth (left side) containing mainly hematite (dark red color) and residue (right side) containing mainly silica (white color) taken 10 minutes after 15 mins flotation at 50° C., 250 ppm APNIPAM of mixture of hematite and silica.

Based on the promising results for 250 ppm APNIPAM at 50° C. after 5 minutes flotation, longer flotation times of 9 mins, 15 mins and 20 mins were tried. FIGS. 34*a* and 34*b* show the XRD patterns of the collected froth and residue respectively after 20 minutes flotation. The froth contains about 80% hematite and 20% silica as judged by comparison of FIG. 34*a* with the standards presented in FIG. 32. Similar comparison of FIG. 34*b* to the standards indicates that the residue contains about 90% silica and only about 10% hematite. One can clearly see that the froth is mainly hematite and the residue is primarily silica. FIG. 35 is a photo of the froth and residue suspensions collected taken 10 minutes after 15 minutes of flotation at 50° C. when 250 ppm 15% anionic co-polymer (APNIPAM) is used. The photo clearly shows that the residue is white indicating high concentration of silica in the residue and the froth is red (dark) indicating the high concentration of hematite in the froth. Thus selective flotation separation of hematite and silica is possible with high recovery with the invention disclosed in the present application.

Figure 36:
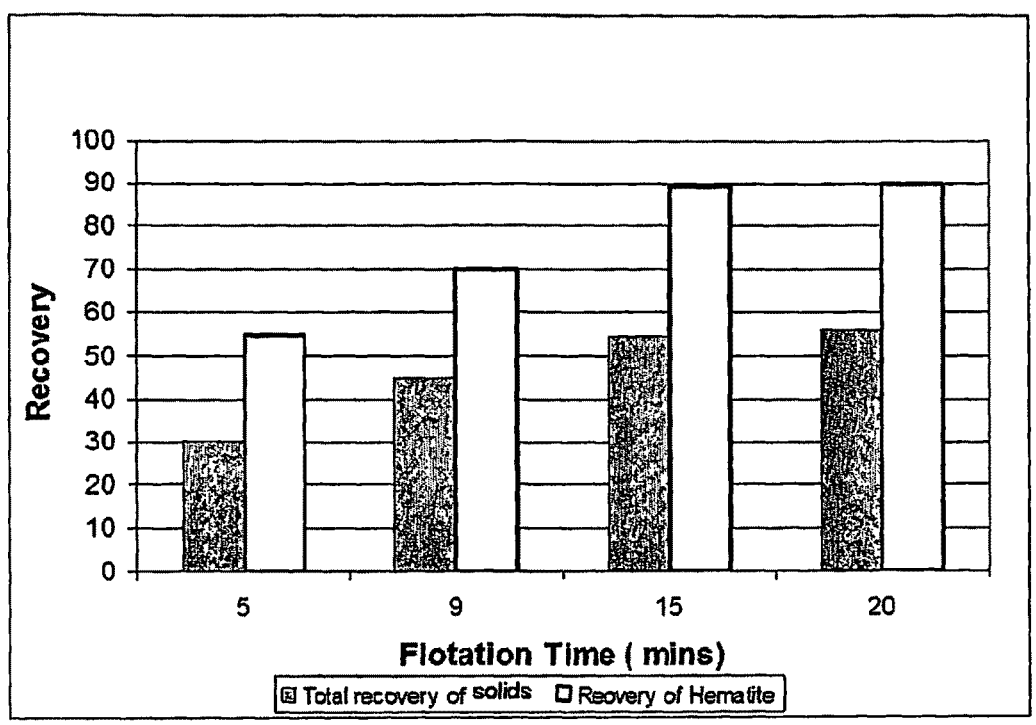
FIG. 36 Total recovery of solids and recovery of hematite for flotation at 50° C. with 250 ppm APNIPAM after 5, 9, 15 and 20 mins.

FIG. 36 shows the total recovery of minerals and the recovery of hematite at different flotation times when 250 ppm of anionic PNIPAM at 50° C. at pH 4.5 is used. By increasing the flotation time from 5 mins to 20 mins the total recovery of mineral jumped from around 30 wt % to 55 wt % and the hematite recovered in the froth increased from 54 wt % after 5 mins flotation to 90 wt % after 20 mins flotation. Thus at temperature above the LCST for appropriate dose (such as 250 ppm in this example) both high recovery of a valuable mineral and high selectivity can be obtained with the use of a stimulus responsive polymer as taught in the invention presented in the current disclosure.

Example 13

Control of Surface Wetting with the Stimulant Responsive Polymer PNIPAM

Figure 37:
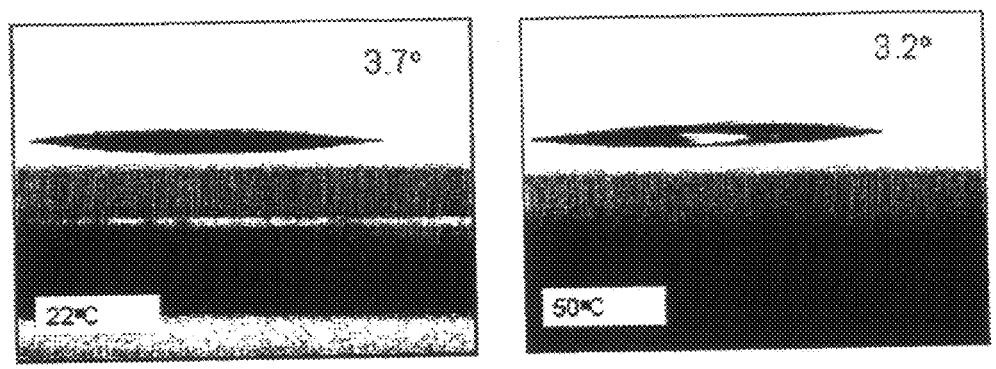
FIG. 37. Photos of contact angles measured on glass slides without PNIPAM coating at 22° C. and 50° C. to demonstrate the control of surface wetting with the stimulant responsive polymer PNIPAM.

Three clean glass slides (26×76 mm) were coated with 0.1 wt % PNIPAM solutions (with four different MW) at 0.1, 0.25 and 0.5 g/m$^2$, respectively. The slides were dried at 80° C. for 30 minutes. The contact angles of water in air were measured at both 22 and 50° C. for each of the surfaces. The results were presented in Table 7 and FIGS. 37 and 38. FIG. 37 shows the photos of contact angles without PNIPAM coatings and FIG. 38 shows photos of contact angles with 0.5 g/m$^2$ coatings. The results clearly demonstrate that the contact angle on the glass slide without PNIPAM coating did not change with the change of temperature (22 and 50° C.). Its value is measured quite low (3.7 and 3.2°), indicating a naturally hydrophilic surface no matter how the temperature changes. However, the contact angles on the glass slides coated with PNIPAMs were measured to be different at 22 and 50° C. The contact angle values at 50° C. were much higher than that at 22° C. under the same PNIPAM MW and coating. These results indicate that the glass surface is responsive to the temperature stimulation and is capable of hydrophilic/hydrophobic transition after coated by the PNIPAM. Moreover, this transition ability is increased with higher PNIPAM MW and higher PNIPAM dosage.

TABLE 7

Results of contact angle measurements.

|  | 22° C. | 50° C. |
|---|---|---|
| No polymer | 3.7 | 3.2 |
| 0.23 M Da PNIPAM, 0.10 g/m$^2$ | 17.4 | 49.3 |
| 0.23 M Da PNIPAM, 0.25 g/m$^2$ | 29.5 | 63.0 |
| 0.23 M Da PNIPAM, 0.50 g/m$^2$ | 36.6 | 69.9 |
| 0.71 M Da PNIPAM, 0.10 g/m$^2$ | 26.2 | 56.9 |
| 0.71 M Da PNIPAM, 0.25 g/m$^2$ | 34.6 | 66.2 |
| 0.71 M Da PNIPAM, 0.50 g/m$^2$ | 54.8 | 94.3 |
| 2 M Da PNIPAM, 0.10 g/m$^2$ | 27.5 | 71.8 |
| 2 M Da PNIPAM, 0.25 g/m$^2$ | 37.8 | 78.6 |
| 2 M Da PNIPAM, 0.50 g/m$^2$ | 57.3 | 98.1 |
| 3.6 M Da PNIPAM, 0.10 g/m$^2$ | 41.5 | 85.9 |
| 3.6 M Da PNIPAM, 0.25 g/m$^2$ | 46.3 | 94.2 |
| 3.6 M Da PNIPAM, 0.50 g/m$^2$ | 58.8 | 104.1 |

The claims defining the invention are as follows:

1. A process for separating finely divided particulate matter and/or liquid droplets from a liquid containing the same including:
   (i) a flocculation and flotation step in which an amount of a stimulus-sensitive polymer is added to the liquid containing the finely divided particulate matter and/or liquid droplets for a time and under conditions sufficient to partition a portion of the finely divided particulate matter;
   (ii) a separation step in which a portion of the partitioned finely divided particulate matter and/or liquid droplets is separated from step (i), wherein the flotation step is conducted under first conditions such that the stimulus-sensitive polymer is substantially hydrophilic and then second conditions such that the stimulus-sensitive polymer is substantially hydrophobic, whereby the substantially hydrophilic stimulus-sensitive polymer minimises heterocoagulation between two different types of finely divided particulate matter and/or liquid droplets.

2. A process according to claim 1 wherein the second conditions are such that the substantially hydrophobic stimulus-sensitive polymer absorbs preferentially to one type of finely divided particulate matter or liquid droplets to induce hydrophobic aggregation of said one type of finely divided particulate matter or liquid droplets.

3. A process according to claim 1 wherein the flotation step is conducted at a first temperature such that there is repulsion between particles of the finely divided particulate matter or liquid droplets and then at a second temperature such that there is attraction between some particles of the finely divided particulate matter or liquid droplets said second temperature being different from said first temperature.

4. A process according to claim 1 wherein the stimulus-sensitive polymer is sensitive to temperature.

5. A process according to claim 4 wherein the temperature sensitive polymer is selected from one or more of the following homopolymers and co-polymers: poly(N-isopropylacrylamide) (polyNIPAM), N-alkyl(meth)acrylamides such as N-isopropyl(meth)acrylamide, N-propyl(meth)acrylamide, N,N-diethyl(meth)acrylamide, N-cyclopropyl(meth)acrylamide, N,N-ethylmethyl(meth)acrylamide, and copolymers thereof with monomers containing functional groups such as carboxyl, amino, hydroxysuccimido, thiol, imino and epoxy groups; polyethylene oxide, poly propylene oxide, methylcellulose, ethyl hydroxyethyl cellulose, carboxymethyl cellulose, hydroxy propyl cellulose, hydrophobically modified ethyl hydroxyethl cellulose, poly dimethylacrylamide/N-4-phenylazophenylacrylamide (DMAAm) and poly dimethylacrylamide/4-phenylazophenylacryate (DMAA), co-polymers of poly NIPAM with other polymers such as polyacrylic acid, poly(dimethylamino ethyl acrylate quaternary chloride), poly(dimethylaminopropylacrylamide) or poly(diallyldimethylammoniurn chloride) (DADMAC), and co-polymers containing xanthate functionality.

6. A process according to claim 5 wherein the temperature sensitive polymer is substantially soluble in aqueous solution at elevated temperatures and forms a gel upon cooling.

7. A process according to claim 5 wherein the temperature sensitive polymer is selected from one or more of the following: gelatin, agarose, amylase, agar, pectin, carragenan, xanthan gum, guar gum, locust bean gum, hyaluronate, dextran, starches, and alginic acid.

8. A process according to claim 1 wherein the finely divided particulate matter is a finely divided mineral ore selected from a sulphide, silicate, or oxide ore.

9. A process according to claim 8 wherein the mineral ore is a non-sulphide ore selected from fluorite, tungsten, lithium, tantalum, tin, and coal.

\* \* \* \* \*